(12) United States Patent
Huntington et al.

(10) Patent No.: US 10,794,228 B2
(45) Date of Patent: Oct. 6, 2020

(54) SYSTEM AND METHOD FOR THE GENERATION OF HEAT AND POWER USING MULTIPLE LOOPS COMPRISING A PRIMARY HEAT TRANSFER LOOP, A POWER CYCLE LOOP AND AN INTERMEDIATE HEAT TRANSFER LOOP

(71) Applicant: XYZ Energy Group, LLC, Spring, TX (US)

(72) Inventors: Richard Alan Huntington, Spring, TX (US); Frank F. Mittricker, Jamul, CA (US); Loren K. Starcher, Sugar Land, TX (US)

(73) Assignee: XYZ ENERGY GROUP, LLC, Spring, TX (US)

( * ) Notice: Subject to any disclaimer, the term of this patent is extended or adjusted under 35 U.S.C. 154(b) by 0 days.

(21) Appl. No.: 16/370,415

(22) Filed: Mar. 29, 2019

(65) Prior Publication Data
US 2019/0301309 A1 Oct. 3, 2019

Related U.S. Application Data

(60) Provisional application No. 62/729,105, filed on Sep. 10, 2018, provisional application No. 62/650,150, filed on Mar. 29, 2018.

(51) Int. Cl.
*F01K 3/18* (2006.01)
*F01K 13/00* (2006.01)
*F01K 7/16* (2006.01)

(52) U.S. Cl.
CPC .............. *F01K 13/006* (2013.01); *F01K 3/18* (2013.01); *F01K 7/165* (2013.01)

(58) Field of Classification Search
CPC ........... F01K 13/006; F01K 7/165; F01K 3/18
See application file for complete search history.

(56) References Cited

U.S. PATENT DOCUMENTS 3,029,197 A * 4/1962 Untermyer ............... G21C 7/02
376/209
3,756,023 A * 9/1973 Berman ................ F01K 23/108
60/665

(Continued)

OTHER PUBLICATIONS

"Fluoride-Salt-Cooled High Temperature Reactor (FHR) Materials, Fuels and Components White Paper"; FHR Materials, Fuels and Components White Paper; Integrated Research Project Workshop 3; Department of Nuclear Engineering and Engineering Physics, University of Wisconsin, Madison; Jul. 2013.

(Continued)

*Primary Examiner* — Shafiq Mian
(74) *Attorney, Agent, or Firm* — Edmonds & Cmaidalka, P.C.

(57) ABSTRACT

Methods and systems for generating power (and optionally heat) from a high value heat source using a plurality of circulating loops comprising a primary heat transfer loop, several power cycle loops and an intermediate heat transfer loop that transfers heat from the high-temperature heat transfer loop to the several power cycle loops. The intermediate heat transfer loop is arranged to eliminate to the extent practical the shell and tube heat exchangers especially those heat exchangers that have a very large pressure difference between the tube side and shell side, to eliminate shell and tube, plate type, double pipe and similar heat exchangers that transfer heat directly from the primary heat transfer loop to the several power cycle loops with very high differential pressures and to maximize the use of heat transfer coils similar in design as are used in a heat recovery steam generator commonly used to transfer heat from gas turbine flue gas to steam or other power cycle fluids as part of a combined cycle power plant.

17 Claims, 24 Drawing Sheets

(56) References Cited

U.S. PATENT DOCUMENTS

| | | | |
|---|---|---|---|
| 4,362,149 A | 12/1982 | Thomson | |
| 4,668,494 A | 5/1987 | Van Hook | |
| 4,768,345 A | 9/1988 | Kardas | |
| 5,242,563 A | 9/1993 | Stern et al. | |
| 5,862,800 A | 1/1999 | Marko | |
| 6,041,588 A * | 3/2000 | Bruckner | F02C 7/224 |
| | | | 60/772 |
| 6,701,711 B1 | 3/2004 | Litwin | |
| 6,957,536 B2 | 10/2005 | Litwin et al. | |
| 7,051,529 B2 | 5/2006 | Murphy et al. | |
| 8,365,529 B2 | 2/2013 | Litwin et al. | |
| 8,594,268 B2 | 11/2013 | Shu | |
| 9,368,244 B2 | 6/2016 | Woolley | |
| 9,624,912 B2 | 4/2017 | Shim et al. | |
| 2004/0250998 A1* | 12/2004 | Charron | B01D 53/1475 |
| | | | 165/104.11 |
| 2004/0251006 A1* | 12/2004 | Marin | C03B 37/02718 |
| | | | 165/157 |
| 2005/0126170 A1 | 6/2005 | Litwin | |
| 2009/0090111 A1* | 4/2009 | Tomlinson | F01K 23/106 |
| | | | 60/783 |
| 2012/0285167 A1* | 11/2012 | Horek | F28D 9/00 |
| | | | 60/618 |
| 2013/0139509 A1* | 6/2013 | Berti | F01K 13/00 |
| | | | 60/648 |
| 2013/0180520 A1 | 7/2013 | Raade et al. | |
| 2014/0033676 A1* | 2/2014 | Pang | F03G 6/00 |
| | | | 60/39.182 |
| 2014/0075939 A1 | 3/2014 | Aga et al. | |
| 2018/0003085 A1* | 1/2018 | Uechi | F01K 23/10 |
| | | | 60/772 |

OTHER PUBLICATIONS

"Alloys for Molten-Salt Reactors"; V.M. Azhazha et al.; National Science Center "Kharkov Institute of Physics and Technology"; Kharkov, Ukraine; pp. 40-47; 2005.

Generation IV International Forum, Proceedings, GIF Symposium; Paris, France; Sep. 9-10, 2009.

"Corrosion behavior of Hastelloy-N alloys in molten salt fluoride in Ar gas or in air"; Ken-ichi Fukumoto et al.; Journal of Nuclear Science and Technology, 52:10; pp. 1323-1327; 2015.

"Corrosion testing of nickel alloy for molten salt reactors"; P. Slama et al.; Journal of Achievements in Materials and Manufacturing Engineering, vol. 70, Issue 2; pp. 78-85; Jun. 2015.

"Corrosion Aspects of Compatible Alloys in Molten Salt (FLINAK) Medium for Indian MSR Program in the Temperature Range of 550-750 °C Using Electrochemical Techniques"; S.J. Keny et al.; Thorium Energy Conference 2015; Mumbai, India; Oct. 12-15, 2015.

"Materials and Metals in MSR"; Presented by Victor Ignatiev; National Research Center "Kurchatov Institute"; Lecco, Italy; MSR Summer school, Jul. 2-4, 2017.

"Construction Materials for Molten-Salt Reactors"; W. D. Manly et al.; Fluid Fuel Reactors, Chapter 13, pp. 595-625; 1958.

"Material Corrosion in Molten Salt Reactors"; Joe Sundae; Submitted as coursework for PH241, Stanford University, Winter 2017; Feb. 21, 2017.

"Molten salt reactor research develops class of alloys"; World Nuclear News; http://www.world-nuclear-news.org/NN-Molten-salt-reactor-research-develops-class-of-alloys-08021701.html; Feb. 8, 2017.

"Molten Salt Reactors"; Yousif Kelaita; Submitted as coursework for PH241, Stanford University, Winter 2015; Feb. 18, 2015.

"Molten Salts for High Temperature Reactors: University of Wisconsin Molten Salt Corrosion and Flow Loop Experiments—Issues Identified and Path Forward"; Piyush Sabharwall et al.; Idaho National Laboratory; Mar. 2010.

"Compatibility Studies of Potential Molten-Salt Breeder Reactor Materials in Molten Fluoride Salts"; J.R. Keiser; Oak Ridge National Laboratory; ORNL/TM-5783; May 1977.

"Technical Description of the "Mark 1" Pebble-Bed Fluoride-Salt-Cooled High-Temperature Reactor (PB-FHR) Power Plant"; Charalampos "Harry" Andreades et al.; Mark-1 PB-FHR Technical Description; Department of Nuclear Engineering, University of California, Berkeley; Sep. 30, 2014.

"Molten salts database for energy applications"; R. Serrano-Lopez et al.; Preprint submitted to Chemical Engineering & Processing: Process Intensification; Sep. 17, 2013.

"Components and Systems Development for Molten-Salt Breeder Reactors"; Dunlap Scott et al.; Oak Ridge National Laboratory; ORNL-TM-1855; Jun. 30, 1967.

"Industrial Use of Molten Nitrate/Nitrite Salts"; R. W. Carling et al.; Sandia National Laboratories Energy Report; Albuquerque, New Mexico; Dec. 1981.

"Assessment of Candidate Molten Salt Coolants for the Advanced High-Temperature Reactor (AHTR)"; D. F. Williams et al.; Oak Ridge National Laboratory; ORNL-TM-2006/12; Mar. 2006.

"Molten Salt Storage"; John Dorado; Submitted as coursework for PH240, Stanford University, Fall 2015; Dec. 15, 2015.

"Engineering Database of Liquid Salt Thermophysical and Thermochemical Properties"; Manohar S. Sohal et al.; Idaho National Laboratory; Mar. 2010.

"Corrosion in Very High-Temperature Molten Salt for Next Generation CSP Systems"; Brenda Garcia Diaz et al.; Savannah River National Laboratory; Apr. 1, 2013.

"Molten Salt Coolants for High Temperature Reactors: A Literature Summary of Key R&D Activities and Challenges"; David Samuel; IAEA Internship Report; INPRO Cool; May 2009.

"Molten-Salt Reactor Experiment"; Wikipedia; https://en.wikipedia.org/wiki/Molten-Salt_Reactor_Experiment; May 18, 2017.

"HITEC Heat Transfer Salt"; Coastal Chemical Co., L.L.C.; Brenntag Company; Houston, TX.

"Experience with the Molten-Salt Reactor Experiment"; Paul Haubenreich et al.; Nuclear Applications & Technology, vol. 8; pp. 118-136; Feb. 1970.

ORNL Summary of the properties of candidate coolants.

"Design and Operation of Forced-Circulation Corrosion Testing Loops with Molten Salt"; J. L. Crowley et al.; Oak Ridge National Laboratory; ORNL-TM-528; May 1963.

"Design Study of a Heat-Exchange System for One MSBR Concept"; C. E. Bettis et al.; Oak Ridge National Laboratory; ORNL-TM-1545; Sep. 1967.

"Assessment of Candidate Molten Salt Coolants for the NGNP/NHI Heat Transfer Loop"; D. F. Williams.; Oak Ridge National Laboratory; ORNL-TM-2006/69; Jun. 2006.

"Estimated Cost of Adding a Third Salt-Circulating System for Controlling Tritium Migration in the 1000-MW(e) MSBR"; Roy C. Robertson; Oak Ridge National Laboratory; ORNL-TM-3428; Jul. 1971.

"Heat Transfer Salt for High Temperature Steam Generation"; E G. Bohlmann; Oak Ridge National Laboratory; ORNL-TM-3777; Dec. 1972.

"Corrosion and Mass Transfer Characteristics of NaBF4-NaF (92-8 mole %) in Hastelloy N"; J. W. Koger; Oak Ridge National Laboratory; ORNL-TM-3866; Oct. 1972.

"Status of Tellurium-Hastelloy N Studies in Molten Fluoride Salts"; J. R. Keiser; Oak Ridge National Laboratory; ORNL-TM-6002; Oct. 1977.

"Conceptual Design Characteristics of a Denatured Molten-Salt Reactor with Once-Through Fueling"; J. R. Engel et al.; Oak Ridge National Laboratory; ORNL-TM-7207; Jul. 1980.

"An Account of Oak Ridge National Laboratory's Thirteen Nuclear Reactors"; Murray W. Rosenthal; Oak Ridge National Laboratory; ORNL-TM-2009/181; Published Aug. 2009, Revised Mar. 2010.

"Revised Phase Diagram of the System NaF-NaBF4"; Jarmila Mlynarikova et al.; Monatshefte fuer Chemie/Chemical Monthly, 139, pp. 77-80 (2008); Springer-Verlag 2007; Published online Dec. 10, 2007.

"Surface tensions of some binary fused salt systems"; June Lomnes Dahl; Dissertation, Physical Chemistry; Iowa State college; 1957.

"High-Efficiency Thermodynamic Power Cycles for Concentrated Solar Power Systems"; Marc T. Dunham et al.; BYU ScholarsArchive; All Faculty Publications; Paper 1585; 2014.

(56) References Cited

OTHER PUBLICATIONS

"Supercritical Carbon Dioxide Brayton Cycle"; Quadrennial Technology Review 2015; Chapter 4: Advancing Clean Electric Power Technologies; U.S. Department of Energy.
"Review of Supercritical CO2 Power Cycle Technology and Current Status of Research and Development"; Yoonhan Ahn et al.; Nuclear Engineering and Technology 47, pp. 647-661; 2015.
"Critical thinking: Ultra and supercritical technology focus"; Paul Breeze; Power Engineering International; Mar. 23, 2017.
"Welcome to Presentation on Supercritical Boiler"; C. P. Sahoo; Adani Power Maharashtra LTD.
"Gas-Cooled Reactor Coolant Circulator and Blower Technology"; Proceedings of a Specialists Meeting Organized by the International Atomic Energy Agency; International Working Group on Gas-Cooled Reactors; IWGGCR/17; San Diego; Nov. 30-Dec. 2, 1987.
"Description of the Advanced Gas Cooled Type of Reactor (AGR)"; Erik Nonbol; Riso National Laboratory; Roskilde, Denmark; Nov. 1996.
"How an AGR power station works"; British Energy Group plc; 2006.
"High Temperature Issues in Advanced Gas Cooled Reactors (AGR)"; M. P. O'Donnell et al.; TAGSI/FESI Symposium 2013: Structural Integrity of Nuclear Power Plant.

\* cited by examiner

```
┌─────────────────────────────────────────────────────────┐
│  Start Sub System 1 – Primary Heat Transfer System      │
│         Startup to PHTF Standby Mode                    │
└─────────────────────────────────────────────────────────┘
                            │
┌─────────────────────────────────────────────────────────┐
│ Establish Minimum Pump Starting Conditions of Primary   │
│ Heat Transfer Fluid (E.g. Temperature, Pressure,        │
│ Viscosity, Enthalpy) Within the Tank 301 by Operation   │
│ of the Tank Heater and/or Mixer 350                     │
└─────────────────────────────────────────────────────────┘
                            │
┌─────────────────────────────────────────────────────────┐
│ Start Circulation of Tank with Pump or Pumps 302        │
│ Via Lines 320, 321, 327, 328 and 329. If Needed, Heat   │
│ Primary Heat Transfer Fluid to Minimum Operating        │
│ Conditions Using Heater 304.                            │
└─────────────────────────────────────────────────────────┘
                            │
┌─────────────────────────────────────────────────────────┐
│ Circulate Primary Heat Transfer Fluid Via Lines         │
│ 320, 321, 330, 324, 325 and 326.                        │
└─────────────────────────────────────────────────────────┘
                            │
┌─────────────────────────────────────────────────────────┐
│ Circulate Primary Heat Transfer Fluid Via Lines 320,    │
│ 321, 322, 323, 324, 325 and 326. Establish Circulation  │
│ Through Heat Collector 303.                             │
└─────────────────────────────────────────────────────────┘
                            │
┌─────────────────────────────────────────────────────────┐
│ Modulate Flow Via the Several Flow Circuits with        │
│ Control Valves 305, 306 and 307 and/or Adjustable       │
│ Characteristics of Pump 302 to Maintain Circulation in  │
│ PHTF Standby Mode.                                      │
└─────────────────────────────────────────────────────────┘
```

FIG. 12

Operating Procedures

Start Power Generation System 100, 200, 700, 800, 900, 1400, 1800, 1900 and/or 2000

Status: Sub System 1 In PHTF Standby Mode Circulation, IHTF Fan/Compressor/Blower 7 Stopped or at Idle, and/or Damper 6 in Closed or Minimum Position Start Circulation of PHTF Through at Least One of Lines 101 to 112 and Connected Heat Exchangers or Heating Coils. Modulate Flow with Control Valves 8a-x, as Needed.

Start Circulation of PCF with Pump 11 Through the Various Heat Exchangers and/or Heating Coils and through Turbine Bypass Lines and Back to the Condenser 12 and Pump 11.

Minimize Transfer of Heat from the PHTF to PCF by Minimizing Circulation of IHTF and/or Natural Convection of the IHTF to Hold Power Generation System in Cold Standby Mode, as Needed.

Enter Hot Standby Mode by Establishing Circulation of IHTF to Transfer Heat and Energy from the PHTF to the PCF. Maintain PCF Via Turbine Bypass Lines (not Shown) and Increase IHTF Flow Rates Via 6 and/or 7 To Reach Minimum PCF Conditions for Turbine Operation to Establish Hot Standby Mode.

Enter Power Generation Mode by Modulating the Turbine Bypass Valves (not Shown) to Admit PCF to the Associated Turbines. Synchronize Generator as Necessary. Modulate the Flow of PHTF, IHTF and PCF to Regulate Power Production and to Maintain the Various Systems within their Acceptable Operating Range. Establish Turbine Bleeds to Accommodate Sub Systems 810 and/or 910 as Needed.

FIG. 12 (Cont..)

```
┌─────────────────────────────────────────────────────────────┐
│           Controlled Stop of Power Generation Mode          │
└─────────────────────────────────────────────────────────────┘
                              │
┌─────────────────────────────────────────────────────────────┐
│ Reduce Flow Rate of PHTF, IHTF and PCY while Maintaining    │
│  Operating Conditions of Each within Acceptable Operating   │
│ Ranges to Reach a Minimum Power Generation or Spinning      │
│ Reserve Mode. Modulate Turbine Bypass Controls as Needed.   │
└─────────────────────────────────────────────────────────────┘
                              │
┌─────────────────────────────────────────────────────────────┐
│  Desynchronize the Generator while Continuing to Modulate   │
│  the Flow of PHTF, IHTF and PCF and the Turbine Bypasses    │
│                 to Enter Hot Standby Mode.                  │
└─────────────────────────────────────────────────────────────┘
                              │
┌─────────────────────────────────────────────────────────────┐
│    Continue to Reduce and then Stop IHTF Circulation by     │
│   Modulating Fan/Blower 7 and/or Damper 6 to Enter Cold     │
│                        Standby Mode.                        │
└─────────────────────────────────────────────────────────────┘
                              │
┌─────────────────────────────────────────────────────────────┐
│      Stop Circulation of PCF by Modulating or Stopping      │
│     Pump 11 and Modulating or Closing Control Valves        │
│             8a-x to Enter PHTF Standby Mode.                │
└─────────────────────────────────────────────────────────────┘
                              │
┌─────────────────────────────────────────────────────────────┐
│  Modulate Flow Via the Several Flow Circuits with Control   │
│  Valves 305, 306 and 307 and/or Adjustable Characteristics  │
│    of Pump 302 to Maintain Circulation in Standby Mode.     │
└─────────────────────────────────────────────────────────────┘
                              │
┌─────────────────────────────────────────────────────────────┐
│              Fast Stop of Power Generation Mode             │
└─────────────────────────────────────────────────────────────┘
                              │
┌─────────────────────────────────────────────────────────────┐
│     Trip PCF Turbine Valves and Desynchronize Generator.    │
└─────────────────────────────────────────────────────────────┘
                              │
┌─────────────────────────────────────────────────────────────┐
│  When Possible / Practical, Open Turbine Bypass Valve to    │
│ Dump Energy to the Condensor. Establish Minimum PCF Flow.   │
└─────────────────────────────────────────────────────────────┘
                              │
┌─────────────────────────────────────────────────────────────┐
│  Modulate IHTF And PHTF to Minimum to Enter Hot Standby,    │
│     Cold Standby or PHTF Standby Modes as Required.         │
│      Start Operation of System 910 as a Startup Heater.     │
└─────────────────────────────────────────────────────────────┘
```

FIG. 12 (Cont..1)

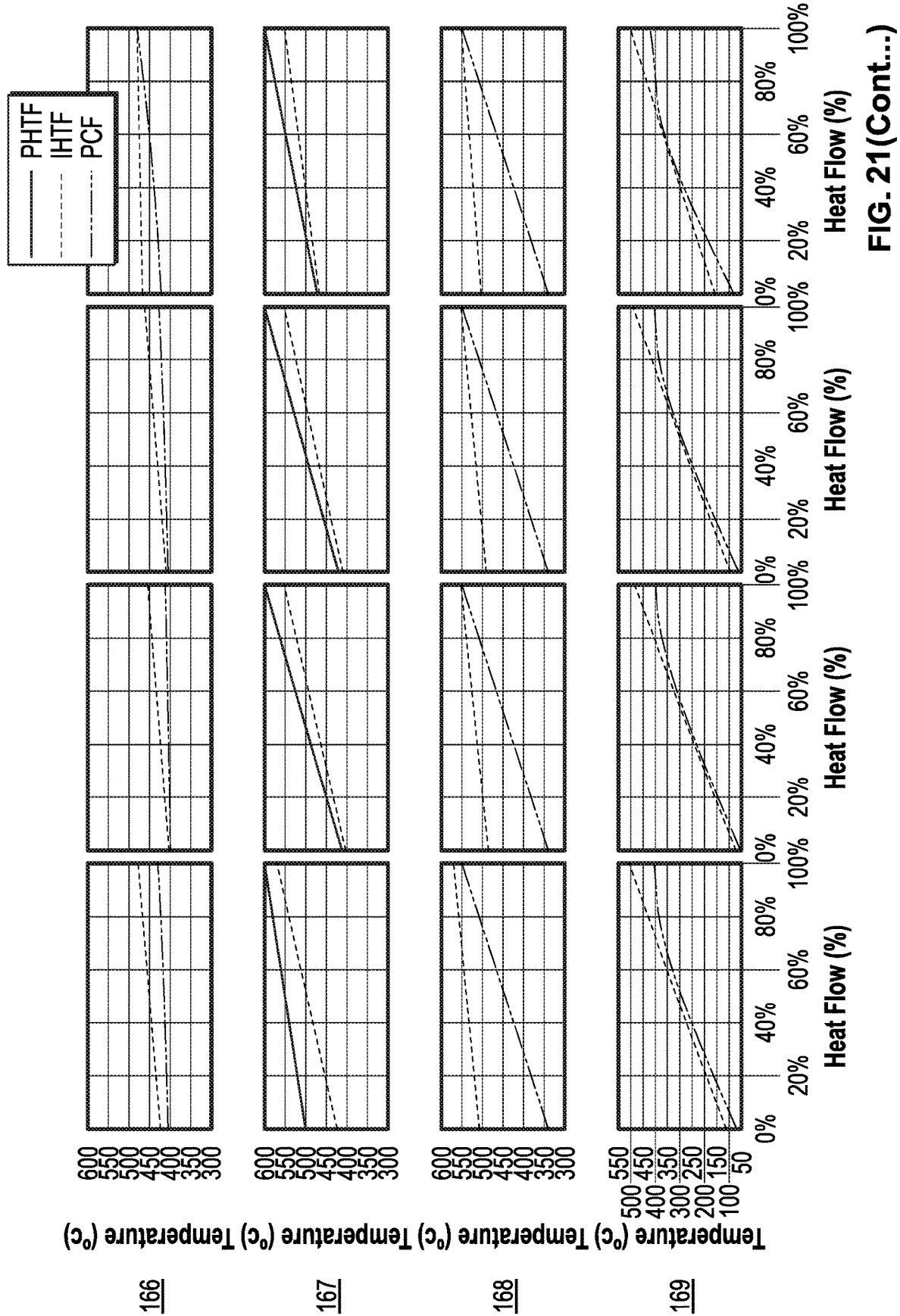
FIG. 21(Cont...)

SYSTEM AND METHOD FOR THE GENERATION OF HEAT AND POWER USING MULTIPLE LOOPS COMPRISING A PRIMARY HEAT TRANSFER LOOP, A POWER CYCLE LOOP AND AN INTERMEDIATE HEAT TRANSFER LOOP

CROSS-REFERENCE TO RELATED APPLICATIONS

This application claims priority to U.S. Provisional Patent Application having Ser. No. 62/650,150, filed on Mar. 29, 2018, and U.S. Provisional Patent Application having Ser. No. 62/729,105, filed on Sep. 10, 2018. The entirety of which are both incorporated by reference herein.

BACKGROUND OF THE INVENTION

Field of the Invention

Embodiments of the present disclosure generally relate to systems and methods to convert high value heat to useful work and power. More particularly, embodiments of the present disclosure relate to systems and methods to transfer and convert heat energy wherein the high value heat is transferred to a power cycle using a plurality of heat transfer fluids, loops and heat exchange devices or systems.

Description of the Related Art

The generation of power can be accomplished in various methods, including water turbines, wind turbines, and solar photovoltaic, which in general do not involve a thermal power cycle, and other methods that do involve a thermal power cycle based on a thermodynamic cycle, such as the Rankine cycle, Brayton cycle, Air-Brayton cycle, Kalina cycle and many others.

Thermal power plants typically combust a fuel to produce the high value heat necessary to produce useful power (and potentially useful lower value heat) using conventional thermal power cycles. Some thermal power plants use external combustion, such as with a gas, fuel-oil or coal fired steam (e.g. Rankine or Kalina cycles) and transfer the heat of combustion to a power cycle fluid (e.g. water/steam) via some type of heat transfer device, such as, boiler tubes, super-heater tubes, economizer tubes or other devices. In such external combustion power plants, the heat of combustion is directly transferred from a hot flue gas formed by the combustion process to the power cycle, with no intermediate fluids or heat transfer devices.

Other thermal power plants have used internal combustion engines to generate power cycle. Examples of this class of engines include gas turbines, diesel engines, and Otto-cycle engines. These types of internal combustion engines do not require heat transfer from a source of heat to the motive fluid of the power cycle. Again, no intermediate fluids or heat transfer devices are required for this class of thermal power plants. In fact, with such engines, the hot flue gas formed by the combustion process is also the power cycle fluid.

Another group of thermal power plants can use external combustion or a non-combustion high-value heat source but without a direct transfer of the heat to the power cycle fluid. Examples of such non-combustion heat sources can include solar thermal (not to be confused with solar photovoltaic), nuclear, and geothermal sources. A power plant using such heat sources can be designed to directly transfer heat to the power cycle fluid (e.g. water/steam) from the heat source, but in practice another heat transfer fluid, such as a molten salt, liquid metal, oil or inert gas, is used to absorb heat energy from the concentrated solar collector, nuclear reactor or geothermal source.

Thomson (U.S. Pat. No. 4,362,149) describes a heat storage system and method in which a heat transfer fluid is circulated through a thermal energy source. The thermal energy source is solar. A liquid alkali metal is the heat transfer fluid. The system transfers heat to and from a mass of rocks that were heated and cooled by a circulating air stream. The high-value heat is transferred from the heat transfer fluid to the power cycle fluid (e.g. water/steam) via a steam generator to generate useful work and power.

Van Hook (U.S. Pat. No. 4,668,494) describes a method to use high-value solar energy for chemical synthesis processes to manufacture ammonia, steam reform hydrocarbons and to gasify hydrocarbons. Van Hook uses a heat transfer fluid, such as a molten inorganic salt, to transport heat from the various solar receivers to the chemical synthesis reactors and related equipment and from the heat transfer fluid to this equipment. High temperature nickel-based alloys are required due to the operating conditions of the molten salt and reactor equipment.

Karda (U.S. Pat. No. 4,768,345) describes a solar thermal power plant that incorporates thermal energy storage and uses two fluids. The first fluid is a phase change fluid that is statically resident within the solar thermal collector and serves as the solar heat collector and thermal storage medium. The second fluid is the power cycle fluid that circulates through the solar heat collector, absorbs heat from the solar heat collector and then passes through the energy utilization section to generate useful work and power from the absorbed heat.

Litwin (U.S. Pat. No. 6,957,536B2, U.S. Pat. No. 8,365, 529B2) describes a solar thermal power plant where high-value heat is absorbed from a solar collector and converted to work and power via an open air-Brayton cycle. Ambient air is compressed and heated using the heat transfer fluid that is described as a liquid metal or molten salt within a heat exchanger. The heat transfer fluid flows variously through pathways, pipes, conduits and storage tanks to absorb heat from a solar collector.

Aga (US2014/0075939A1) describes a solar thermal power plant where high-value heat is absorbed from a solar collector and converted to work and power via a steam Rankine cycle. The steam of the Rankine cycle is directly heated by a solar energy collector or by a thermal storage fluid that is separately heated by the solar energy collector.

Woolley (U.S. Pat. No. 9,368,244B2) describes a molten salt nuclear power plant where the high value heat is absorbed from a nuclear fission reactor and is converted to useful work and power via a Brayton cycle. In this configuration, the Brayton cycle is a closed helium cycle or an open air-Brayton cycle or even a closed Rankine cycle. Heat from the molten salt is transferred to an intermediate heat transfer fluid and then to the power cycle to isolate the power cycle from potential contamination from the nuclear reactor.

Shim (U.S. Pat. No. 8,365,529B2) discloses a geothermal power plant that uses molten salt as the primary heat transfer fluid to collect geothermal heat and heat exchangers to transfer heat directly to the working fluid of either a Rankine cycle or Brayton cycle power plant.

In these examples, thermal energy is transferred from a solar collector, nuclear reactor or geothermal source or from a heat transfer fluid or thermal storage fluid. In each of these examples, contamination of the various heat transfer fluids by the power cycle fluid (e.g. air, steam, hydrocarbons) or contamination of the various power cycle fluids by a heat transfer fluid is possible if there is a leak of some kind within a heat transfer device. Further, where a large pressure difference exists between a heat transfer fluid and a power cycle fluid, higher stress levels are imposed on the various components of the of the heat exchange devices.

SUMMARY OF THE INVENTION

Methods and systems for generating power using an intermediate heat transfer loop (IHTL) are provided. In one embodiment, the method includes: providing four or more discreet heat transfer devices, arranged in series, and confined within a contained housing; circulating an intermediate heat transfer fluid (IHTF) through the housing and about the four or more discreet heat transfer devices; heating a primary heat transfer fluid (PHTF) using an external heat source to provide a heated primary heat transfer fluid; circulating a first portion of the heated primary heat transfer fluid through a first of the four or more discreet heat transfer devices within the housing and circulating a second portion of the heated primary heat transfer fluid through a second of the four or more discreet heat transfer devices within the housing, whereby the intermediate heat transfer fluid is indirectly heated by the heated primary heat transfer fluid from both the first and second discreet heat transfer devices; circulating at least a portion of a power cycle fluid (PCF) through a third of the four or more discreet heat transfer devices within the housing and circulating the at least a portion of the power cycle fluid through a fourth of the four or more discreet heat transfer devices within the housing to provide a heated power cycle fluid, whereby the power cycle fluid is indirectly heated within the third and fourth discreet heat transfer devices by the intermediate heat transfer fluid; and generating power using the heated power cycle fluid exiting the housing.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. It is to be noted, however, that the appended drawings illustrate only typical embodiments of this invention and are therefore not to be considered limiting of its scope, for the invention can admit to other equally effective embodiments.

FIG. 12 depicts a flow chart showing certain operating procedures for Systems 100, 200, 700, 800, 900, 1400, 1800, 1900 and/or 2000, according to one or more embodiments provided herein.

DETAILED DESCRIPTION

Figure 1:
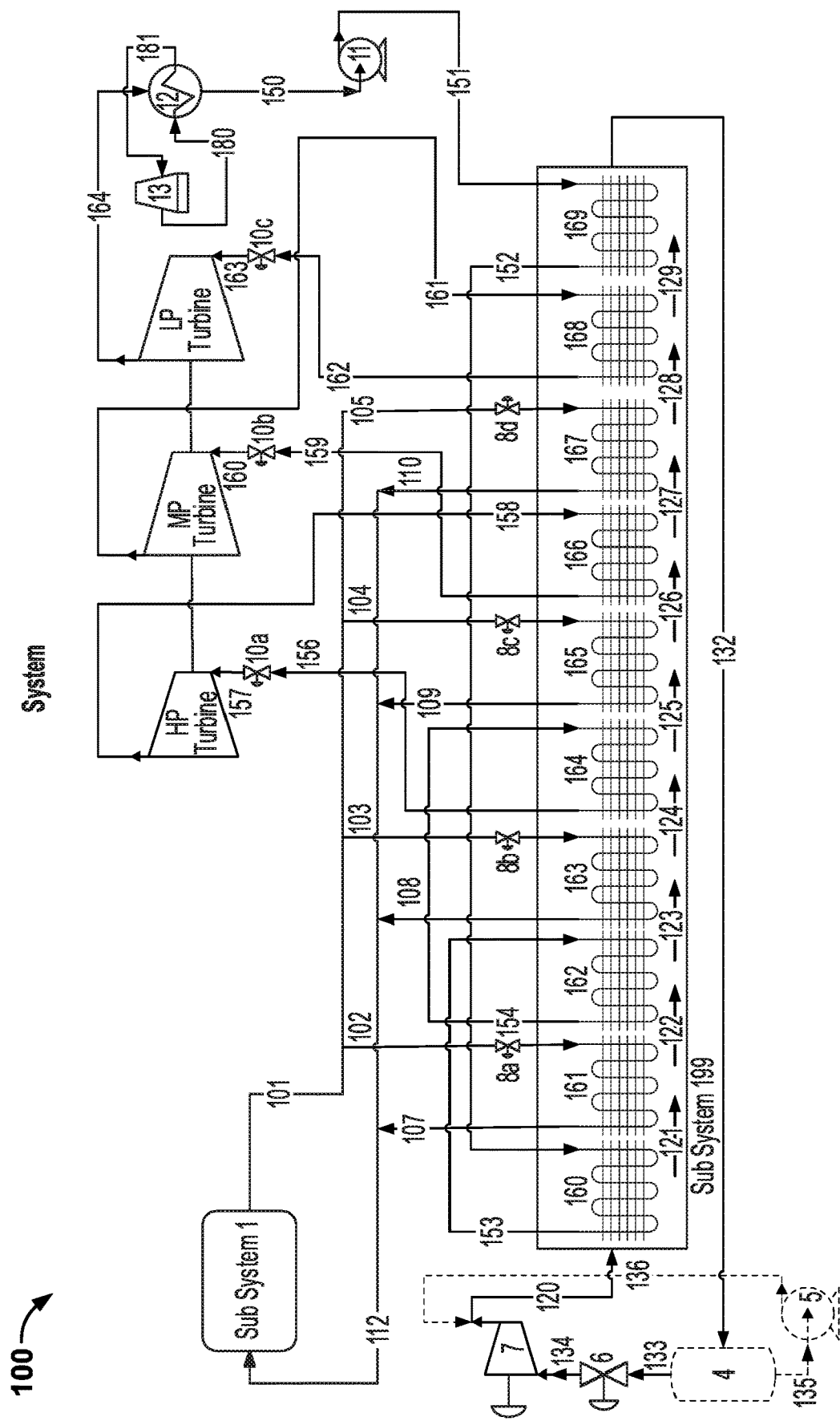
FIG. 1 depicts a schematic representation of an illustrative System 100 for generating power, according to one or more embodiments provided herein. System 100 further depicts a system in which the IHTF is substantially recirculated by use of a blower or similar device.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows can include embodiments in which the first and second features are formed in direct contact and can also include embodiments in which additional features can be formed interposing the first and second features, such that the first and second features cannot be in direct contact. The exemplary embodiments presented below also can be combined in any combination of ways, i.e., any element from one exemplary embodiment can be used in any other exemplary embodiment, without departing from the scope of the disclosure. The figures are not necessarily to scale and certain features and certain views of the figures can be shown exaggerated in scale or in schematic for clarity and/or conciseness Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure can be exact or approximate values ("about") unless otherwise specifically stated. Accordingly, various embodiments of the disclosure can deviate from the numbers, values, and ranges disclosed herein without departing from the intended scope.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same can be equally effective at various angles or orientations.

A detailed description will now be provided. Each of the appended claims defines a separate invention, which for infringement purposes is recognized as including equivalents to the various elements or limitations specified in the claims. Depending on the context, all references to the "invention" can in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

FIG. 1 depicts a schematic representation of an illustrative System 100 for generating power, according to one or more embodiments provided herein. System 100 can include a high-value heat source depicted as Sub System 1, a system to circulate a PHTF from Sub System 1 to a power plant, one or more heat exchange devices (four are shown 161, 163, 165, and 167) to transfer heat from the PHTF via streams 101, 102, 103, 104 and 105 to a circulating IHTF and return the PHTF to Sub System 1 via streams 107, 108, 109, 110, and 112, one or more heat exchange devices (six are shown 160, 162, 164, 166, 168, and 169) to transfer heat from the circulating IHTF to the circulating PCF at several points within the power cycle and three stages of a turbine generator system (e.g. HP Turbine, MP Turbine and LP Turbine) to generate useful work and power from the high-value heat. System 100 depicts a closed intermediate heat transfer loop wherein the intermediate heat transfer loop is substantially recirculated. System 100 can further include a pump, fan or blower or other compression device (7) to cause and/or control the circulation of the IHTF and can also include a valve or damper (6), separator (4) and pump (5).

The turbine generator system can also include an electric generator to convert the useful power of the several turbines to electrical energy that can be distributed to a local or distant power grid that consumes the useful power, a condenser system to cool and possibly condense the PCF, a pump to pressurize and cause the recirculation of the PCF back to the several heat exchange devices and the several turbines. The PCF system can also cool and/or condense the PCF through heat transfer to an external system that requires process heating for an industrial process. Such a use of external heat for process heating is generally known as Cogeneration. In addition, such cogeneration uses can include thermal desalination to produce fresh water from a saline water source. Suitable saline water sources can include, but are not limited to, sea water, saline aquifers, produced water from an oil & gas production facility.

Figure 2:
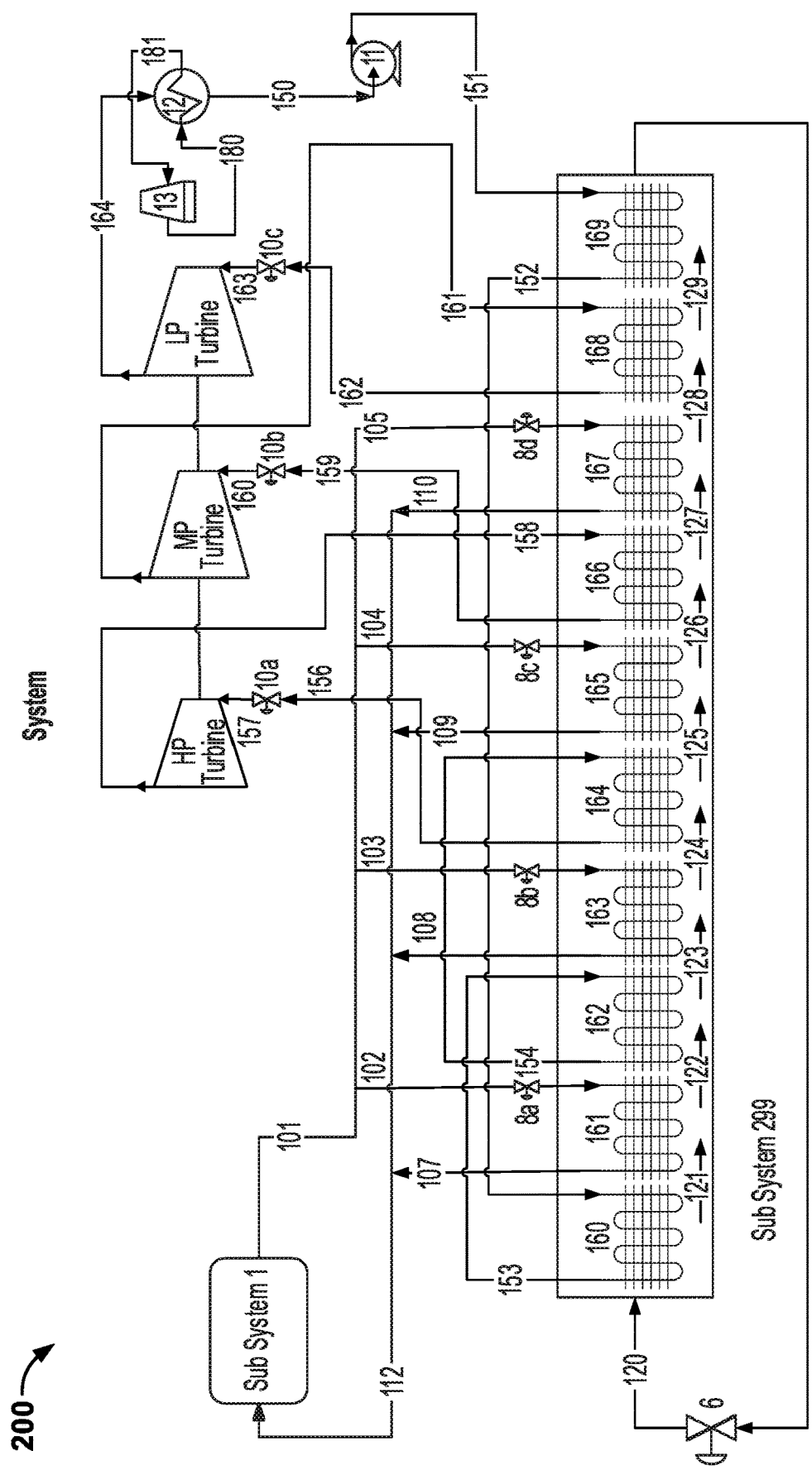
FIG. 2 depicts a schematic representation of another illustrative System 200 for generating power, according to one or more embodiments provided herein. System 200 is like System 100 except that the IHTF is recirculated by natural convection.

FIG. 2 is a diagrammatic illustration of System 200 that represents a power plant with a high-value heat source (Sub System 1), various heat exchange devices (e.g. 161, 163, 165, and 167) to transfer heat from the PHTF to the IHTF, various heat exchange devices (e.g. 160, 162, 164, 166, 168, and 169) to transfer heat from the IHTF to the PCF at several points within the power cycle and three stages of a turbine generator system (HP Turbine, MP Turbine and LP Turbine) to generate useful work and power from the high-value heat. System 200 depicts a closed intermediate heat transfer loop wherein the intermediate heat transfer loop is substantially recirculated. The equipment of System 200 is arranged to form hot and cold legs or sections with a vertical orientation within the intermediate heat transfer loop such that the circulation of the IHTF is substantially caused by the buoyancy difference between the said hot and cold legs of the loop.

Figure 3:
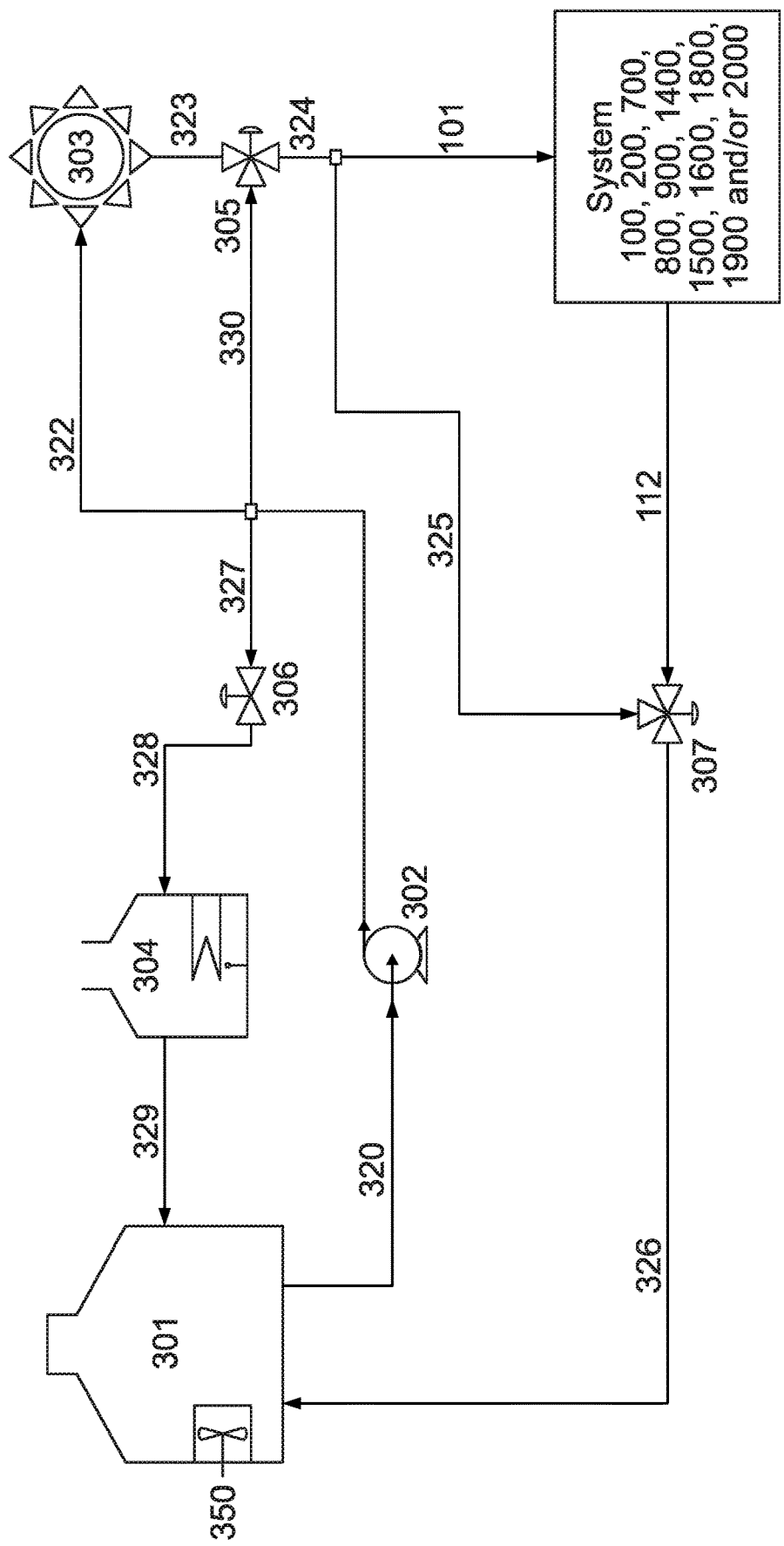
FIG. 3 depicts a schematic representation of the primary heat transfer loop having optional storage, at least one circulating pump and a high-value heat source, according to one or more embodiments provided herein.

FIG. 3 depicts an illustrative Primary Heat Transfer Loop (PHTL) used with the primary heat transfer system (Sub System 1). The Sub System 1 can include at least one circulating pump 302 and the high-value heat source 303. Referring to FIGS. 1, 2 and 3, the Primary Heat Transfer Loop (PHTL) can include a recirculating PHTF such as a molten salt, oil or other medium that remains in the liquid phase for all operating conditions of the process. The PHTL can also include one or more tanks (301), one or more circulating pumps (302) and at least three heat exchange devices to 1) raise the temperature of the PHTF by absorbing heat from the High-Value Heat Source (HVHS) (303) and 2) lower the temperature of the PHTF by releasing heat to the Intermediate Heat Transfer Loop (IHTL) through at least two heat exchange devices (e.g. at least two of Coils 160-169). The HVHS can include one or more solar heat collectors or receivers, concentrated solar heat collectors or receivers, nuclear reactors, geothermal heat collectors, heat sources associated with combustion of hydrogen, hydrocarbon or biomass fuels or other heat sources known to those skilled in the art.

The PHTF can be circulated through the PHTL to the high value heat source at a temperature as low as 200° C. and gain energy from the heat source as evidenced by an increase in the temperature of the PHTF of 50° C., 100° C., 150° C., 200° C., 300° C., 400° C., 500° C. or more to leave the HVHS at a temperature as high as 1000° C. or more.

The PHTL can operate at a minimum pressure of about 0.1 Bara and a maximum pressure of about 20 Bara although a much higher pressure can be possible but generally not needed to maintain the heat transfer fluid in a liquid phase. The maximum pressure of the PHTL can be substantially determined by the elevation difference between the HVHS (303) and the storage tank (301) or the heat transfer devices (for example coils 160-171) such that an acceptable margin between the operating pressure and the vapor pressure of the PHTF is maintained. The PHTL pressure can be about 1 to about 10 Bara.

The PHTL can also include further equipment, subsystems and devices including valves 305, 306 and 307 and supplemental heaters (304). These further equipment, subsystems and devices can be used to preheat the PHTF during periods when the plant can be idle or at low capacity. These can also be used to assist to startup of the PHTL or other portions of Systems 100, 200, 700, 800, 900, 1400, 1500, 1600, 1800, 1900 and/or 2000 or substantially change the plant load or temperature of the PHTF.

Sub System 1 can include one or more pumps (302). FIG. 3 illustrates a single pump (302) that can be used to circulate from the storage tank (301) to the HVHS (303) through a system of pathways, pipes, conduits and/or valves (305, 306, 307) to direct a first portion of the PHTF to 303 via pathway 322, direct a second portion of the PHTF to bypass 303 via pathway 330 under the control of valve 305. Valve 305 can be adjusted to control the temperature of the PHTF directed via pathway 324. If the temperature of the PHTF in pathway 324 is below the desired temperature, valve 305 can be modulated to direct more PHTF to 303 via pathway 322 and 323 and less PHTF via pathway 330. On the other hand, it the temperature of the PHTF in pathway 324 is above the desired temperature, valve 305 can be alternatively modulated to direct less PHTF to 303 via pathway 322 and 323 and more PHTF via pathway 330. From pathway 324, the PHTF can be directed either to pathway 101 to the power plant exemplified by Systems 100, 200, 700, 800, 900, 1400, 1500, 1600, 1800, 1900 and/or 2000 or via pathway 325 to be recirculated to tank 301 via valve 307 and pathway 326. The PHTF directed via pathway 101 can be returned via pathway 112 to valve 307 and returned to tank 301.

The PHTF can be directed to pathway 327 and valve 306 and pathway 326 to auxiliary heater 304 and then pathway 329 to return to tank 301 to heat the PHTF stored within tank 301. This means to heat the PHTF can be needed in times of low thermal production by 303, during a plant startup or shutdown procedure and/or to maintain a minimum acceptable temperature within the various pathways, tanks or equipment.

FIG. 3 is one example arrangement of Sub System 1. Many other arrangements can be provided to provide addition storage tanks, additional pumps and alternative control systems and methods. For example, while FIG. 3 illustrates a single pump service to both circulate PHTF from 301 to 303 and to the power plant, alternative arrangements could be used with a separate pump service to circulate the PHTF from the 301 to 303 and back to 301 and another pump service to circulate the PHTF from 301 to the power plant via pathway 101 and return it to 301 via pathway 112. Other arrangements could be used with separate hot and cold PHTF tanks such that the PHTF from a cold tank can be circulated to 303 with a first portion directed to a power plant and a second portion returned to the hot tank and a third portion circulated from the hot tank to the power plant and then returned to the cold tank.

Referring to FIGS. 1 and 2, the IHTL can include a recirculating IHTF such as atmospheric air, humidified air, water vapor, helium, argon, carbon dioxide, other constituents of air including xenon, neon, hydrogen and krypton, other liquids and gases or mixtures of the several gases or liquids. The IHTL can also include any one or more circulating fans (7), pumps (5) and/or compressors (7) and any one or more heat transfer devices (for example Coils 160 to 169) to transfer heat from the PHTF to the IHTF and then to the PCF that can be circulated within the several Power Cycle Loops (PCL). The IHTL can operate at a minimum pressure of about 0.1 Bara and a maximum pressure of about 10 Bara although a much higher pressure can be possible. The operating pressure can be close to, but somewhat greater, than the local atmospheric pressure. The operating pressure can be selected to minimize the pressure and/or vacuum rating of the structure enclosing the IHTL (for example Sub System 199). Increasing the pressure of the IHTL can improve the performance (i.e. heat transfer rate or reduce the size) of the various heat transfer devices (for example Coils 160 to 169) but can also increase at least the cost and complexity of the IHTL enclosure. A practical design can consider the potential size reduction of the IHTL enclosure (Sub System 199) and heat transfer devices (for example Coils 160 to 169) versus the pressure rating and structural complexity of that enclosure.

Further to again reduce the cost and complexity of the IHTL enclosure, it can include pressure relief and/or vacuum relief doors or panels. For example, dead weight safety valves, panels and doors are commonly installed on gas turbine air inlet plenums and exhaust plenums to prevent over and/or under pressure of these plenum enclosures. In a similar manner, similar device can be installed within the IHTL to prevent under pressure and/or over pressure of the IHTL enclosure. For example, under pressure can be caused by a cooling of the average temperature of the IHTF within the enclosure. Over pressure can be caused by an opposite increase of the average temperature of the IHTF within the enclosure or even a leak of the PCF or PHTF into the IHTL enclosure that can be caused by a failure of one of the several heat transfer devices (e.g. a tube leak or rupture of one or more of the Coils 160 to 169).

To avoid unplanned activation of such a under or over pressure device, a control system can be provided to routinely adjust the mass or moles of IHTF within the IHTL. For example, a control system can be used to add or remove IHTF to maintain the pressure of the ITHL within 1%, 2%, 3%, 5%, 10% or 20% of a pressure setpoint that is within the previously stated range of IHTL pressures. Specifically, if the pressure within the Sub System 199 (IHTL) is below the desired pressure, additional IHTF can be added to the IHTL from an external source, reservoir or even from the atmosphere via a valve and/or a pump or compressor (not shown). Alternatively, if the pressure within the IHTL is above the desired pressure, then a portion of the IHTF can be removed and returned to the external source, reservoir or even vented to the atmosphere via a similar valve and/or pump or compressor (not shown).

Further, the operating pressure of the IHTL can be selected to reduce the pressure difference between the IHTL and the PHTL. The PHTL can be assumed to require the highest operating temperature of the PHTL, IHTL and PCL. As a result, the PHTL can require special high temperature alloys for the construction of its components that can be subjected to metallurgical conditions such as creep deformation and/or corrosion. Minimizing the pressure difference between the pressures of the PHTL and the IHTL will reduce the stress of the PHTL components and allow either a less expensive metal alloy and/or the use of a lower pipe schedule (i.e. thinner wall in reference to the pipe or tube diameter or reduced plate thickness) for general piping and especially for the tubing, plates or similar components of heat transfer devices. Lowering the pipe schedule has the benefits to improve heat transfer coefficients within the heat transfer devices by reducing the heat conduction resistance of the piping or tubing or plates. Lowering the pipe schedule also reduces the material cost to construct the various components of the PHTL especially since in general, higher cost nickel, cobalt, molybdenum and chromium-based alloys can be required. The pressure of the IHTF can be somewhat above the local ambient pressure and below the minimum pressure of the PHTL at the various heat exchange devices that transfer heat from the PHTF to the IHTF. The lower pressure of the IHTF versus the PHTF can ensure that any leakage of the PHTF will be from the PHTL to the IHTL.

The PHTL can have a minimum pressure consistent with the elevation change from the highest portion of the PHTL that is in direct communication with the power plant to the location of these various heat exchange devices. As an example, if a molten salt with a specific gravity of 2.0 is used as the PHTF and the highest point of the PHTL can be 100 m higher than these heat exchange devices, then a maximum pressure difference of about 20 bar can be expected. For an application with a lesser elevation difference or one in which a storage tank is placed within the pathways between the HVHS (303) and the power plant, the maximum pressure difference can be 10 bar, or 5 bar or 2 bar. This can be contrasted to a pressure difference of several hundred bar or more if the PHTF is required to transfer heat directly to a PCF such as steam in a super-critical or ultra-super-critical Rankine cycle power plant. Further, in such a power plant, shell-and-tube heat exchangers would most likely be required and very likely multiple heat exchangers in parallel for a utility scale power plant. These multiple parallel shell-and-tube heat exchangers can require complex piping arrangements to overcome the potential thermal growth and movement of the piping during modes of plant operation from shutdown to startup to part-load to full-load operation.

The IHTL can incorporate a structure and flow path for the IHTF like the flow path of the gas turbine exhaust/flue gas of a gas turbine combined cycle Heat Recovery Steam Generator (HRSG) with heat transfer coils for the various heat transfer devices (for example Coils 160-169) supported to allow free thermal growth plus additional ducting to recirculate the IHTF. A configuration similar to HRSG construction provides for easy scaling of the heat transfer coil for small to utility scale power plants without the limitations of commercially available shell and tube since the structure of the HRSG-like flow path of the IHTL can be scaled to accommodate a larger cross-sectional area (flow path area) required of larger heat transfer coils that can be required for the PHTF and PCF as the IHTL can operate at pressures near, but generally slightly above, the local ambient pressure.

For a horizontal arrangement (FIG. 1), a circulating fan or blower or compressor (7) can be provided to maintain circulation and a damper or similar system (6) can be provided to regulate the recirculation rate. Alternatively, the operating characteristics (guide vanes and/or rotating blade/vanes position or operating speed), of the blower (7) can be adjusted to regulate the recirculation rate. In this arrangement with a circulating fan or blower (7) and with or without a damper (6), if the recirculation rate of the IHTF is less than the desired flow rate, then the blower (7) operating speed can be increased, the inlet guide vanes of the blower can be moved to a more open position or angle, the rotating blades or stator vanes can be moved to a more open position or angle or the damper (6) can be moved to a more open position or angle. Alternatively, if the recirculation rate of the IHTF is more than the desired flow rate, then the blower (7) operating speed can be decreased, the inlet guide vanes of the blower can be moved to a less open position or angle, the rotating blades or stator vanes can be moved to a less open position or angle or the damper (6) can be moved to a less open position or angle.

For a vertical arrangement (FIG. 2), the various heat transfer devices (Coils 160 to 169) can be arranged to create hot and cold legs or sections of the IHTL to facilitate a natural circulation from the differing buoyancies of the hot vs. cold IHTF within the IHTL. A blower (7) can be optionally used like FIG. 1 and/or a damper system (6) can be used to regulate the recirculation rate.

This natural circulation results from the differing densities of the hot vs. cold legs of the IHTL. The differential pressure driving such circulation can be estimated using the Archimedes Principle when applied to columns of fluids of different densities. The differential pressure that drives the circulation an be approximately equal to the average height of the hot and cold legs multiplied by the density difference of the hot and cold legs multiplied by the local gravity constant (e.g. 9.8 m/s/s). For example, dry air at near ambient pressure with a temperature difference of 400° C.

and a hot and cold leg heights of 100 m can create a differential pressure of about 0.5 kPa or about 50 mmWG. In some embodiments, a combination of natural circulation and forced circulation can be employed to reduce the differential pressure needed from the blower (7) and therefore reduce the power required to drive this recirculation blower (7).

The Power Cycle Loops (PCL) can include a recirculating PCF that can include water ($H_2O$), carbon dioxide ($CO_2$), other constituents of air, various hydrocarbon fluids, or other fluids that can undergo a phase change or a substantial density change within the range of pressures and temperatures experienced within the PCL. This specifically should be understood to include a PCF comprising $CO_2$ or similar fluids that can remain at conditions above their critical pressure and/or temperature throughout the PCL and therefore do not strictly undergo a phase change. The PCL can further include one or more heat transfer devices (for example at least one of Coils 160 to 169) to transfer heat from the IHTF to the PCF and in some embodiments also from at least a portion of the PCF to at least a portion of the IHTF and ultimately to reject heat not converted to power to one or several coolers (12) that can be condensers or to an external heat consumer for other external heating uses, including but not limited to industrial process heating, thermal desalination or similar uses. Heat transfer devices can also transfer heat from the PCF at one point in the cycle to another point in the cycle.

The power cycle can include the components and subsystems generally known to include a Rankine Cycle power plant, Super Critical Rankine Cycle power plant, Ultra Super Critical Rankine Cycle power plant or other description with the main distinction among these descriptions being the highest pressure and highest temperature within the power cycle with maximum pressures and temperatures of 100 bar to 400 bar and 350° C. to 750° C. for a steam Rankine Cycle plant. Future Rankine Cycle power plants can extend these conditions to 600 bar and 950° C. or higher. Other PCF can be restricted to other maximum pressures and temperatures based on fluid thermal stability, heat transfer, metallurgy of the power cycle components and similar effects.

Further, the power cycle can also be compression-type cycles other than one of the Rankine cycles above, including the Brayton Cycle, Kalina Cycle and other power cycles known to those skilled in the art. For a Brayton Cycle, the PCF would be selected without the need for a phase change within the ranges of pressures and temperatures of the PCL. Operating temperatures of a Brayton cycle can be as high as 1650° C. based on materials and systems generally known to those skilled in the art. However, future advances in metallurgy and non-metallic, ceramic, metal-ceramic hybrid materials can provide even higher temperatures for a Brayton cycle, perhaps as high as 2000° C.

An operating pressure of the PCF within a device that transfers heat from the IHTF to the PCF or from the PCF to the IHTF can be greater than that of the IHTF. The operating pressure of the PHTF within a device that transfers heat from the PHTF to the IHTF also can be greater than the IHTF. As such, in the event of a leak either in the PCL or the PHTL, the PCF and/or the PHTF would leak into the IHTL. Detectors can be provided to monitor and/or alarm in the event of contamination of the IHTL by either the PHTF or the PCF. Such detectors can include any known by those skilled in the art and can include but not limited to humidity sensors, conductivity sensors, dust sensors, mass spectrometers and gas chromatographs. As such, the risk of contamination of the PCF or the PHTF by the other fluid or the IHTF can be very low if not practically impossible.

To summarize the power cycle, the PCF can exit a cooler or condenser (12) at about the lowest pressure and temperature of the cycle. The PCF can be in a liquid phase (e.g. water) or a dense-phase fluid (e.g. supercritical $CO_2$) and can be pumped or compressed to a high pressure with one or more pumps or compressors (11). This high pressure can be above or below the critical pressure of the PCF. The PCF can then be initially heated with a combination of heat transfer devices to transfer heat from the IHTF (for example at least one of Coils 160 to 169), the PCF from another part of the power cycle, direct contact with PCF from another part of the power cycle and/or a combination of these. Following such initial heating, the PCF can be further heated to either vaporize the liquid or substantially increase the temperature to a desired temperature X° C., for example 350° C., 400° C., 450° C., 500° C., 550° C. 600° C., 650° C. or as much as 750° C. or more, by exchanging heat with the IHTF and thus reducing the temperature of the IHTF, for example using at least one of Coils 160, 162 and 164 of FIGS. 1 and 2. After which, the IHTF can be reheated to a desired temperature Y° C., for example, about 550° C., 600° C., 650° C., 700° C. or as much as 800° C. or more, by exchanging heat with a portion of the PHTF, for example with at least one of Coils 161, 163, and 165 of FIGS. 1 and 2.

After heating of the PCF to a desired temperature, the PCF can be reduced in pressure to an intermediate pressure level through a turbine (e.g. HP Turbine) which causes power to be generated and delivered in a useful manner to an electrical generator or similar power conversion device. The now intermediate pressure level PCF can be reheated to a similar high temperature or a different temperature by exchanging heat with the IHTF, for example via Coil 166 of FIGS. 1 and 2, and thus again reducing the temperature of the IHTF. The IHTF can again be reheated by exchanging heat with the PHTF, for example via Coil 167 of FIGS. 1 and 2.

After reheating of the PCF, the PCF can again reduce in pressure to an even lower pressure level through another turbine (e.g. MP Turbine) which again causes power to be generated and delivered in a useful manner.

This sequence of heating the IHTF to a desired temperature Y° C. by exchanging heat with a portion of the PHTF, in turn heating the PCF to a desired temperature, for example X° C., and reducing the pressure of the PCF through a turbine device (e.g. HP Turbine, MP Turbine and/or LP Turbine) to generate and deliver power in a useful manner can be repeated several times until the desired low pressure is reached and the PCF is cooled in a heat transfer device (e.g. 12) by rejecting the residual heat to an external system, for example, ambient air, a cooling tower (13) or similar system. At this point, the PCF again flows to the pump or compressor (11) to be recirculated again.

The IHTF can be recirculated and in sequence can be heated by absorbing heat from the PHTF and then cooled by releasing heat to the PCF at a plurality of points within the power cycle process. The temperature of the IHTF can be about A° C., where A° C. is about 20° C., 40° C., 60° C., 80° C., 100° C. or as much as 200° C., before the IHTF enters the at least one recirculating fan, blower or compressor (7). Even higher temperatures are acceptable, but it is recognized by those skilled in the art that the power required to increase the pressure of the IHTF via such a recirculating fan, blower or compressor is proportional to the absolute temperature of the IHTF entering this fan, blower or compressor and so a lower temperature can be used unless another potential benefit outweighs this increased power requirement.

In some embodiments, the IHTF can undergo a phase change or partial phase change (e.g. if the IHTF is water vapor, or a humidified gas) after cooling to temperature A. Optionally, a separator (4) and condensate pump (5) can be used to pump the condensed portion of the IHTF in parallel with (7) and mix the vapor and liquid portions prior to entering Sub System 199 or alternatively to inject or spray the liquid portion after the vapor portion enters the first heat exchange device within Sub System 199 to ensure that the liquid portion is fully vaporized and can even enhances the heat transfer rate by vaporization of the liquid portion within the first heat exchange device.

The IHTF can then be heated to an intermediate temperature B° C., where B° C. can be about 80° C. to about 400° C. or about 500° C., by exchanging heat with the PCF (for example with Coil 160 of FIGS. 1 and 2). The IHTF can then be further heated to a temperature C° C., where C° C. is about 400° C., 500° C., 600° C., 700° C. or up to about 800° C. or more, by exchanging heat with a portion of the PHTF (for example with Coil 161 of FIGS. 1 and 2).

The PCF can be further heated by exchanging heat with the IHTF by, for example, heating the IHTF with a portion of the PHTF and then transferring such heat from the IHTF to the PCF (for example, using at least two of Coils 160 to 169) until the PCF reaches the temperature X° C. The number of steps in this sequence can be determined by considering the flow rate of the PCF, the flow rate of the IHTF, the various temperatures including the supply temperature of the PHTF, the minimum operating temperature of the PHTF, the heat exchanger approach temperature between the intermediate and PHTF, or any combination of two or more of the foregoing. The heat transfer surface area (effective area) at each step can be selected based upon the available temperature differences and combined heat transfer coefficients for the various fluids.

In certain embodiments, the temperature B° C. can be selected to be the same, similar, or greater than the minimum acceptable operating temperature of the PHTF. This minimum temperature can be determined by the melting point of a molten salt, pour point of a heat transfer oil or in some other way related to the flow-ability of the PHTF. In some cases, it can be advantageous to use a second PHTF that has a lower melting temperature than the first for those heat transfer devices that can have a minimum operating temperature of the IHTF that is less than the melting temperature of the first PHTF. For these cases, the second PHTF can be heated circulated in a fourth loop and either be heated directly by the high value heat source or by the first PHTF via at least one heat exchange device.

Figure 4:
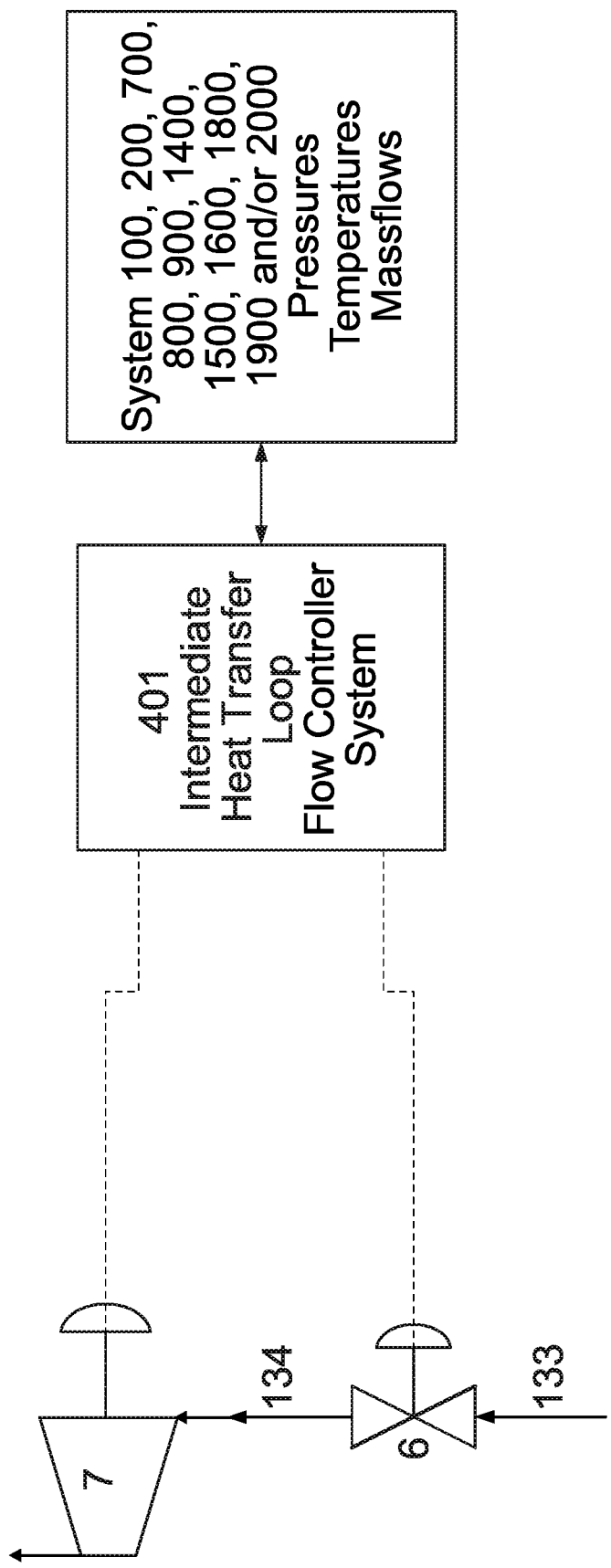
FIG. 4 depicts an illustrative control scheme for managing a circulation flow rate of the IHTF, according to one or more embodiments provided herein.

Now referring to FIG. 4, to control the heat transfer effectiveness of various heat transfer devices, the flow rate of the IHTF can be adjusted by use of control surfaces, adjustable speed fans, blowers or compressors or other means (See FIG. 4 and items 6 and/or 7). Various measurements, for example temperatures or temperature differences, within the IHTL can be used to adjust this flow rate to reach a desired set point. The IHTF flow rate can be adjusted such that the "hot-side" difference between the IHTF inlet temperature minus the PCF outlet temperature of a PCF heater can be equal to the "cold-side" difference between the IHTF exit temperature minus the PCF entrance temperature of the same heater plus or minus a fixed or variable temperature margin setpoint. The cold-side approach temperature can be equal to or similar to the hot-side approach temperature of the target heat exchange device plus or minus a fixed or variable margin or setpoint. If variable, this temperature margin setpoint can be determined or estimated based upon, at least in part, by the IHTF flow rate, a PCF flow rate, a PHTF flow rate, the net power generated, and/or the gross power generated.

It should be apparent that there are many potential methods to measure or determine the hot-side and cold-side temperature differences and all can have equal effectiveness to use as a basis to adjust the IHTF flow rate. For example, the temperatures of the IHTF can be measured or determined at first and second locations proximate to the inlet and outlet IHTF streams to the heat transfer device and similarly the temperatures of the PCF can be measured and determined at first and second locations proximate to the PCF outlet and inlet to the heat transfer device, then the hot-side difference can be calculated from the temperature difference between the first IHTF and PCF locations and the cold-side difference calculated from the temperature difference between the second IHTF and PCF locations. If the difference between this hot-side difference and the cold-side difference is zero, then they are balanced. An equivalent result can be found by calculating the sum of the temperatures at the first IHTF location and the second PCF location less the sum of the temperatures at the second IHTF location and the first PCF location. If this result is zero, then the hot-side and cold-side pinches are balanced. Another method cannot require the measurement of distinct temperatures but rather to measure these temperature differences directly. For example, a thermocouple measures the difference between the temperature at a desired measurement location and a reference location. If this reference location is selected to be another stream location, then the temperature differences can be measured directly. Similarly, thermistors can be used in a similar fashion to directly measure the temperature differences. In addition, by using one or more Wheatstone Bridges or similar devices known to those skilled in the art, a direct measurement or determination of the difference among the two pairs of temperature locations can be made. For the purposes of this disclosure, each of these means or methods to ascertain or quantify the degree to which the hot-side difference is similar to the cold-side difference are equal with respect to the adjustment of the IHTF flow rate.

This method can be used to balance and so avoid a hot-side or cold-side pinch of one or several heat transfer devices. One or more of the heaters can be selected as the base for these temperature differences and they can be used individually, selected based on high-low results, various averaging or optimization methods to provide input to the adjustment of the IHTF flow rate.

Figure 5:
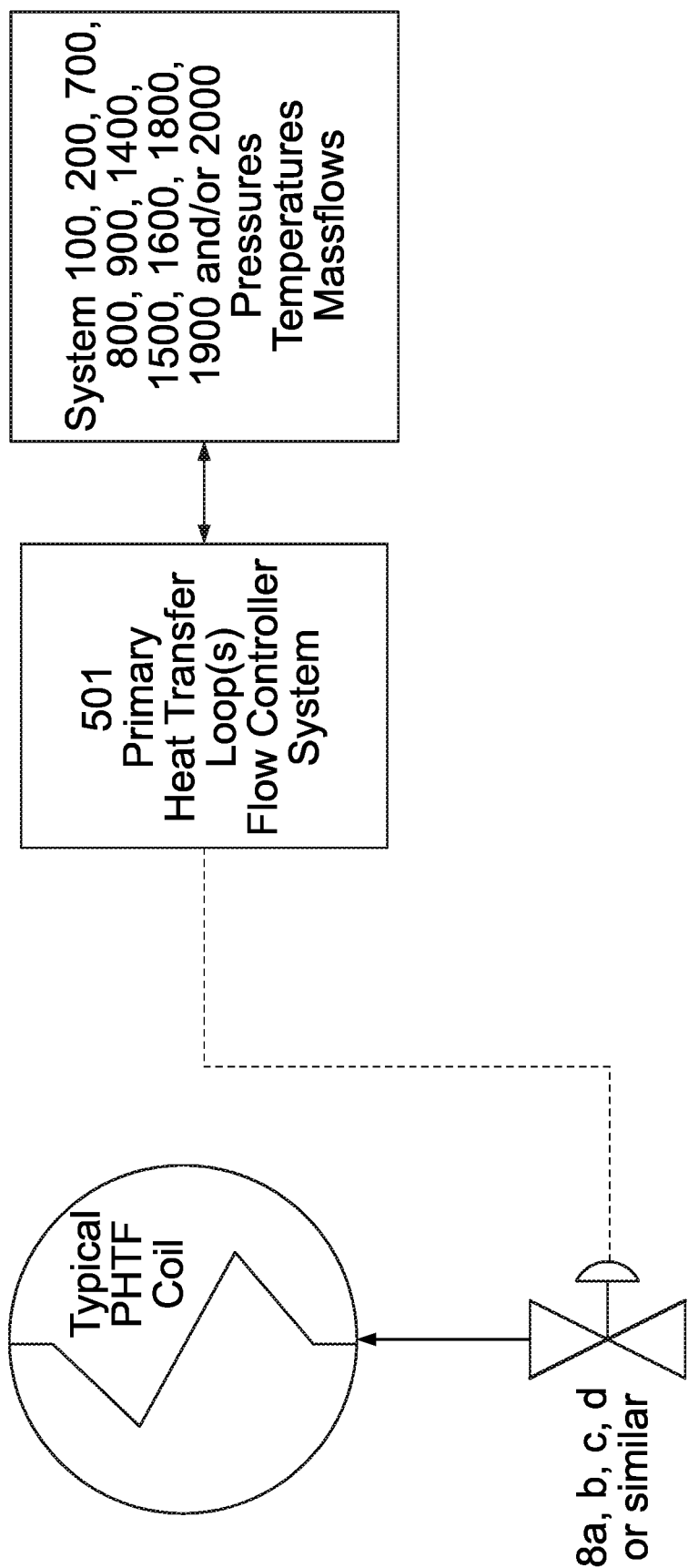
FIG. 5 depicts an illustrative control scheme for managing a flow rate of each portion of the PHTF, according to one or more embodiments provided herein.

FIG. 5 depicts an illustrative control scheme for managing a flow rate of each portion of the PHTF, according to one or more embodiments. The flow rate of each portion of the PHTF to each IHTF heater can be selected and/or controlled to ensure that the temperature of the PHTF exiting each of these heaters is above the minimum operating temperature of the PHTF. This limit control can be in addition to active flow control of the portion of the PHTF to each IHTF heater. Since each of these heaters will generally reach a pinch point at the hot side of the heater, PHTF flow rate to a particular heater can be effectively used to control the outlet temperature of the IHTF from the heater.

Figure 6A:
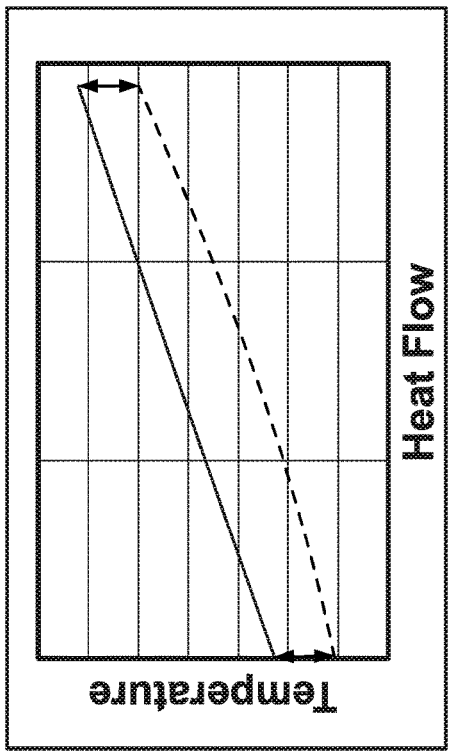
FIG. 6A demonstrates the effect caused by the adjustment of the IHTF circulation rate on the temperature balance of a heat transfer device.
Figure 6C:
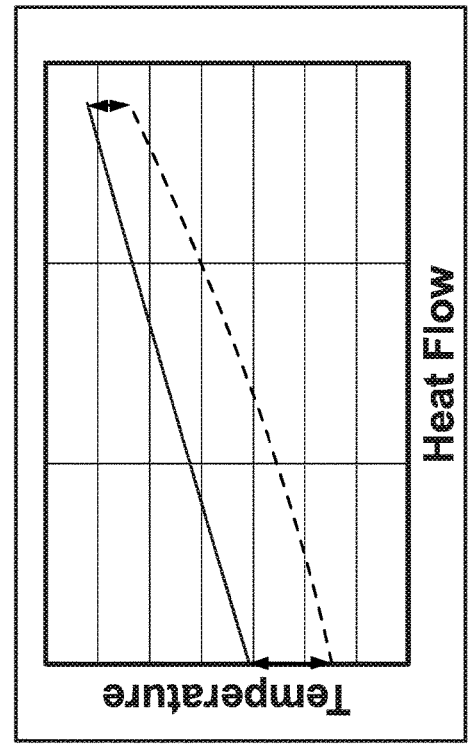
FIG. 6C demonstrates the effect caused by the adjustment of the IHTF circulation rate on the temperature pinch at the hot end of the heat transfer device.
Figure 6B:
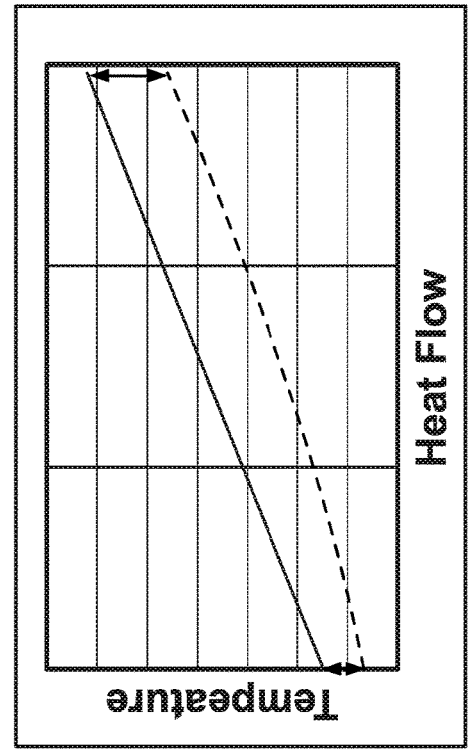
FIG. 6B demonstrates the effect caused by the adjustment of the IHTF circulation rate on the temperature pinch at the cold end of the heat transfer device.

FIG. 6A shows the temperature profile of a sample heater when the IHTF flow rate is adjusted to balance the hot-side and cold-side pinches (shown by the double-ended arrows). If the solid line depicts the temperature change vs. heat flow of the IHTF and the dashed line depicts the PCF temperature profile, and with FIG. 6A as a reference, FIG. 6B shows a smaller temperature difference at the cold side than either FIG. 6A or 6C and a greater temperature difference at the hot side than either FIG. 6A or 6C. On this basis, one can conclude that FIG. 6B depicts a lower flow rate of the IHTF than FIG. 6A and that FIG. 6C depicts a higher flow rate of the IHTF than FIG. 6A. If FIG. 6A depicts that desirable operating condition, then the control system can elect to increase the flow rate of IHTF of FIG. 6B and decrease that of FIG. 6C. However, the operation condition depicted by 6A cannot be an optimum as in general, increasing the IHTF flow rate can be expected to increase the overall heat transfer effectiveness and generally improve the overall efficiency of the power cycle. On the other hand, during periods in which the power plant operates at reduced load, it can be effective to reduce the IHTF flow rate to reduce the effectiveness of the several heat exchange devices (for example Coils 160 to 169 of FIGS. 1 and 2) by reducing the effective heat transfer area and heat transfer coefficients by allowing the hot and/or cold-side pinch to approach zero over a portion of the heat flow path.

Figure 7:
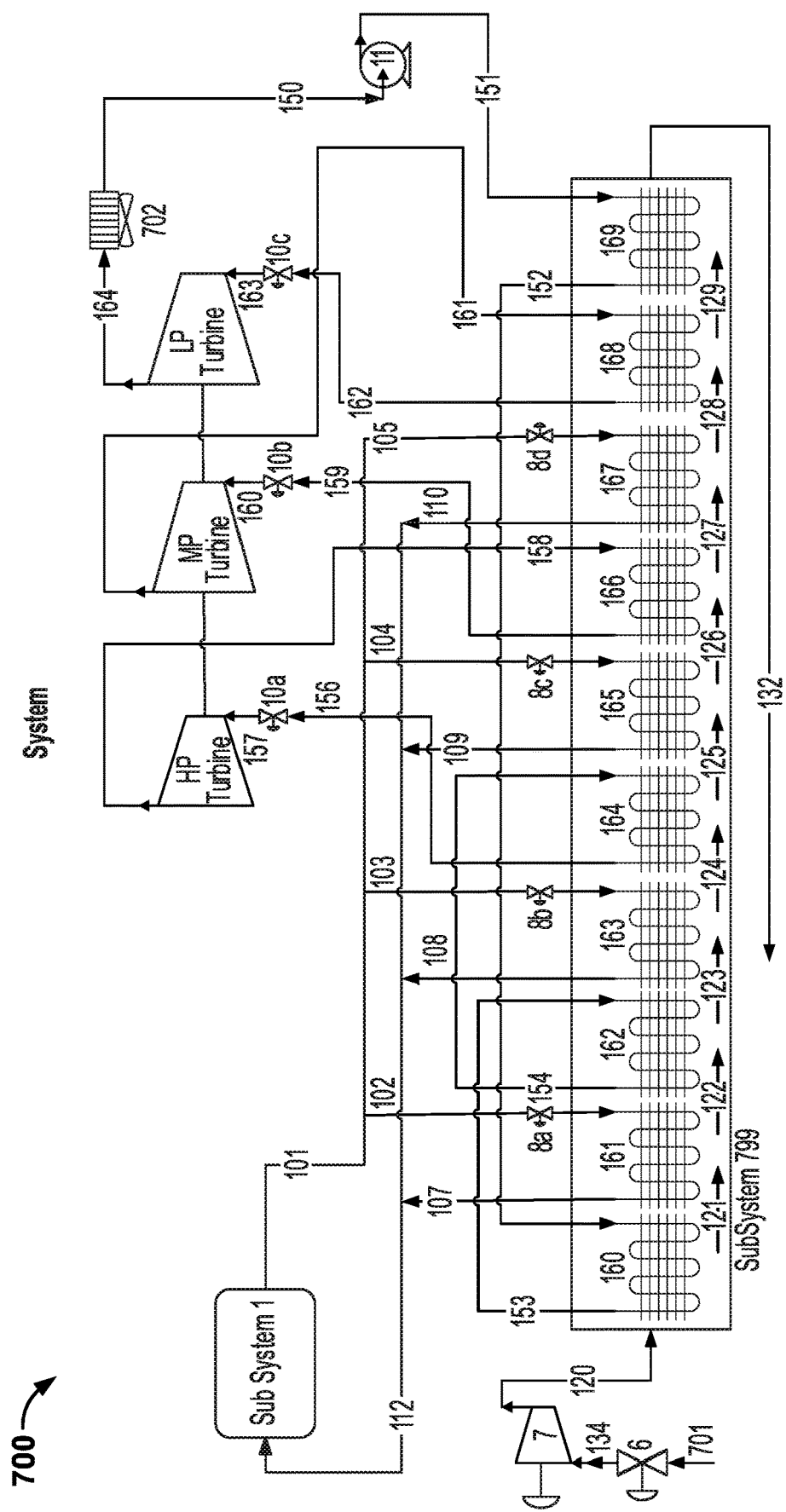
FIG. 7 depicts a schematic representation of another illustrative System 700, according to one or more embodiments provided herein. System 700 is like system 100 and 200 except that the IHTF is not substantially recirculated.

FIG. 7 depicts System 700 and is an open loop embodiment in which the IHTL is not closed and recirculated but rather is primarily once through. Ambient air can used as the IHTF. Other IHTF selections as described for System 100 and System 200 can be used. Ambient air would generally be the economic selection for an open loop system. With System 700, the IHTF can enter the system at or near ambient conditions as stream 701. As with Systems 100 and 200, the flow rate of the IHTF can be regulated by a damper system (6) or by a fan or blower or compressor (7) or similar device with adjustable characteristics. Other features of System 700 can be like System 100 or System 200 except after the IHTF is cooled using a final heat transfer device (for example, Coil 169 in FIG. 7), the IHTF can be exhausted to the atmosphere (132). The pressure and temperature of stream 132 could be near ambient conditions to minimize the "stack loss" (i.e. unused energy of the IHTF exhausted to the atmosphere).

The cooler or condenser (12) and ambient heat rejection system (13) can be replaced by direct cooling of the PCF for System 700 using an air-fin condenser or similar heat exchange device (702). PCF stream 164 can be circulated to 702 to cool or condense the PCF to form stream 150. As with Systems 100 and 200, a pump or compressor (11) can be used to increase the pressure of and recirculate the PCF. Although illustrated with device 702, System 700 could be equally arranged to use a similar cooler or condenser (12) as with System 100 and 200. Similarly, Systems 100, 200 and other Systems could equally be arranged with heat exchange device 702.

System 700 also can be arranged vertically. The various heat transfer deices (for example Coils 160 to 171 of FIG. 7) can be arranged to create hot and cold legs or sections of the IHTL to facilitate a natural circulation from the differing buoyancies of the hot vs. cold IHTF within the IHTL. The location of the ambient inlet (701) can be located at a sufficient elevation to avoid the ingress of dust, and other atmospheric contaminants. To minimize fouling of the various heat transfer devices, inlet conditioning devices (e.g. particulate filters, moisture separators) can be provided for 701. As, the exhaust (132) can have similar buoyancy as the atmosphere, the exhaust outlet for stream 132 can also incorporate a device (e.g. venturi or similar) to accelerate 132 to enhance atmospheric dispersion. As with System 200, the vertical embodiment of System 700 can also incorporate a fan or blower or compressor (7) and/or a damper system (6) to augment and/or facilitate IHTF flow rate control, startup and off-design operations.

Figure 8:
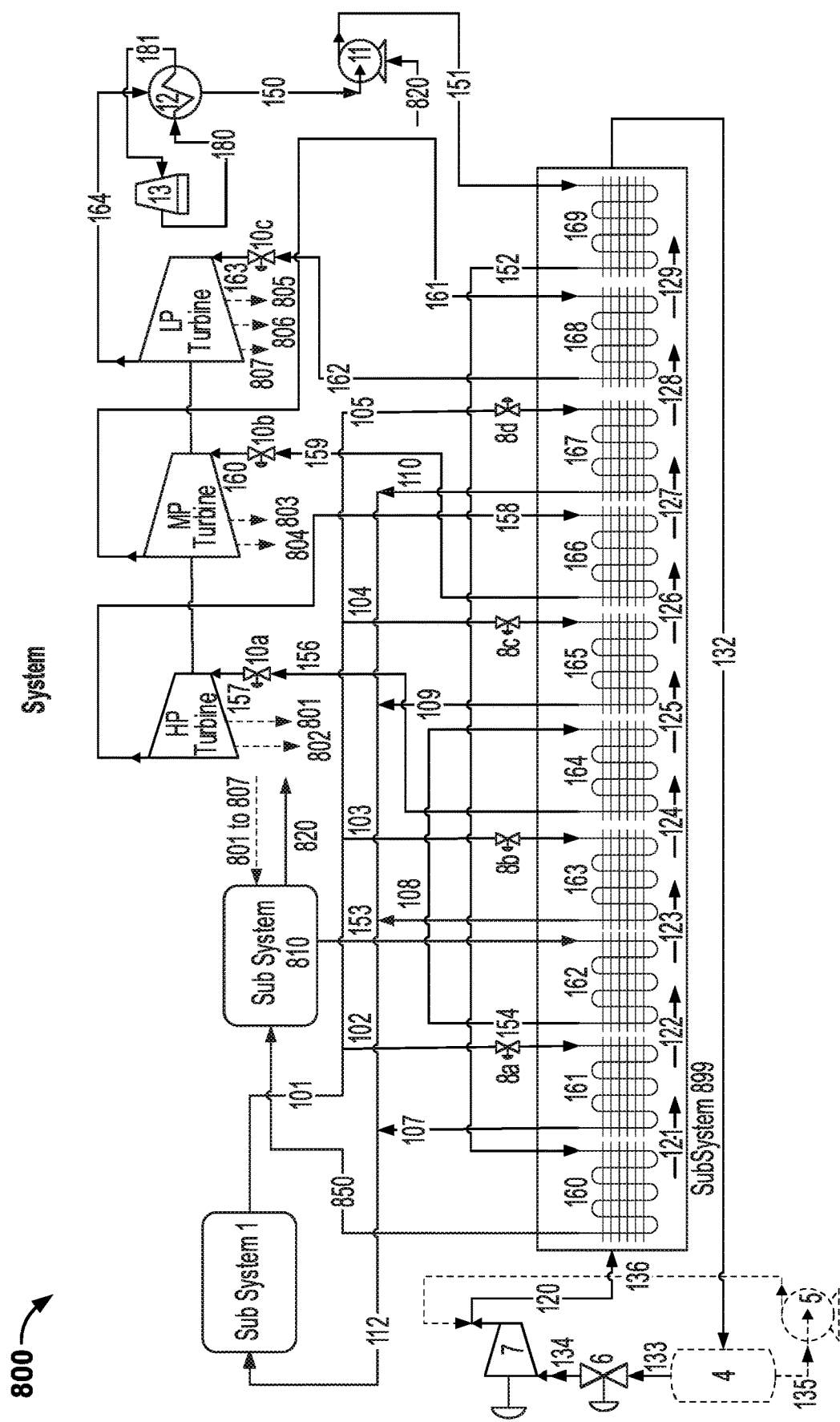
FIG. 8 depicts a schematic representation of another illustrative System 800, according to one or more embodiments provided herein. System 800 includes a system to pre-heat the PCF using at least a portion of the PCF extracted from at least one of the several turbines (e.g. HP Turbine, MP Turbine and/or LP Turbine).
Figure 10:
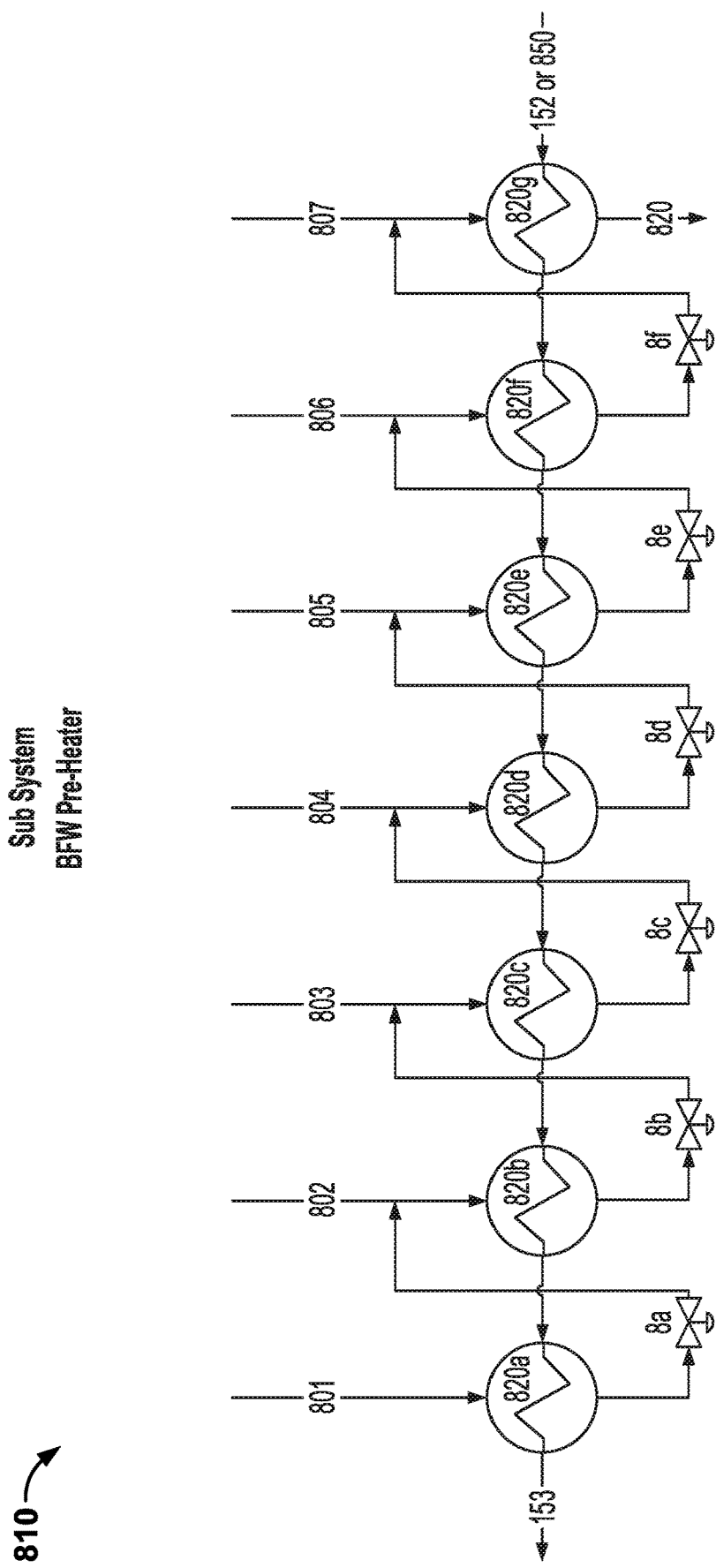
FIG. 10 depicts a diagrammatic representation of the PCF Preheater 810 that is or includes a cascade of heat exchangers that progressively heat the PCF by a sequence of turbine extraction streams.

FIG. 8 depicts System 800 which is an enhancement of Systems 100, 200 and/or 700 to include a means to preheat the PCF using at least a portion of the PCF extracted from at least one of turbines, HP Turbine, MP Turbine and/or LP Turbine. A portion of the PCF from Rankine cycle turbine(s) can be extracted and used to preheat the PCF. Generally, this strategy increases the overall cycle efficiency by using the heat of vaporization of the extracted PCF to preheat the PCF prior to heating the PCF via the primary heat source. As shown in FIG. 8, PCF stream 164 can be cooled and/or condensed in condenser 12 to form stream 150. Stream 150 can be mixed, either before, after or during increasing it pressure via pump or compressor 11, with PCF stream 820. Stream 820 is the stream formed by the combination of the extracted PCF streams after Sub System 810. The combination of streams 150 and 820 after pressure increase can then be used to transfer heat from the IHTF, for example using Coil 169, prior to increasing the pressure of the IHTF via fan/blower/compressor 7 (e.g. IHTF stream 132 to 120). Stream 120 can be reheated via PCF stream 152 and Coil 160 of FIG. 8. PCF stream 850 can then be heated using the heat exchanger Sub System 810. FIG. 10 shows a sample arrangement of cascading heat exchangers that can form Sub System 810.

Figure 9:
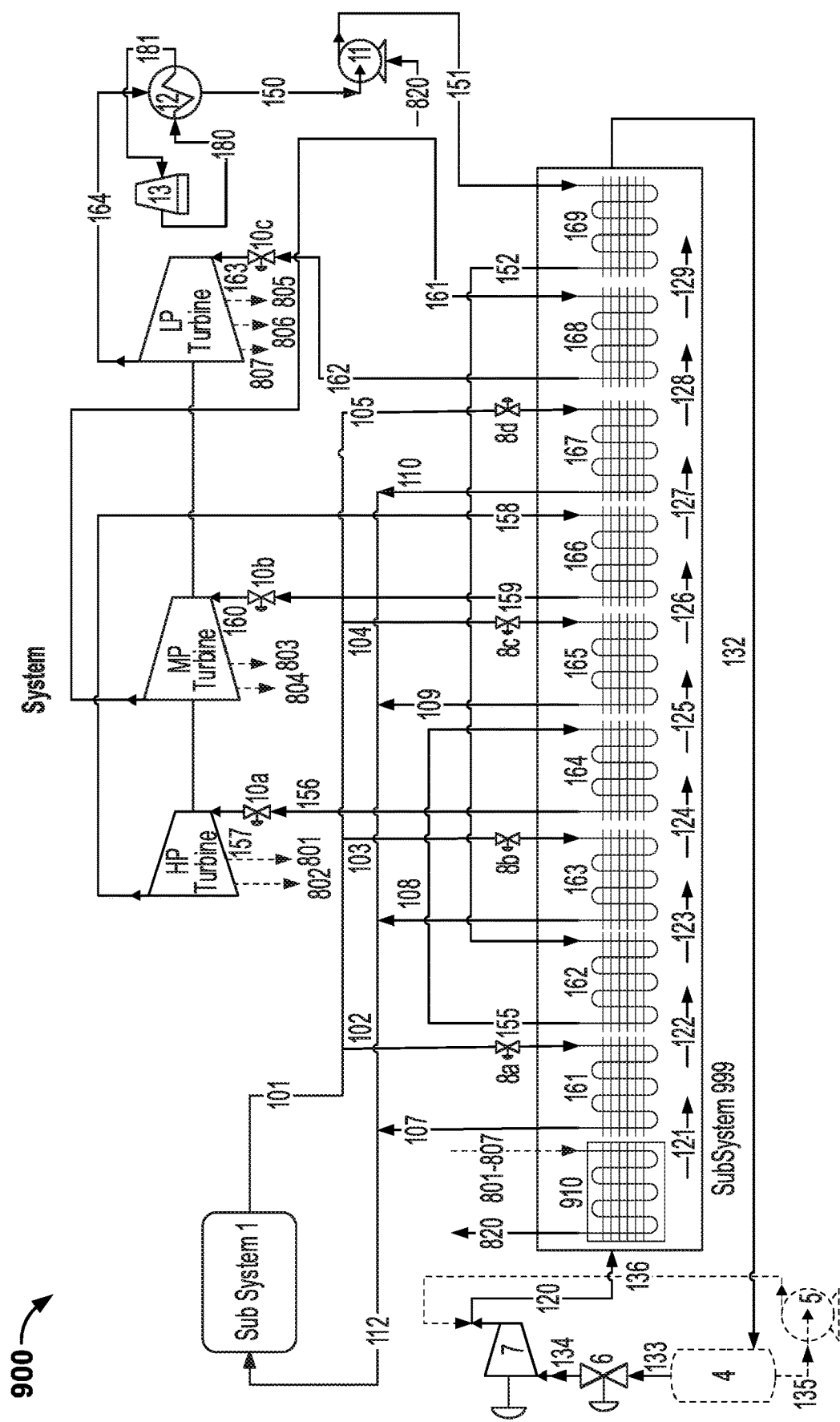
FIG. 9 depicts a schematic representation of another illustrative System 900, according to one or more embodiments provided herein. System 900 includes a system to pre-heat the IHTF using at least a portion of the PCF extracted from at least one of the several turbines (e.g. HP Turbine, MP Turbine and/or LP Turbine).

FIG. 9 depicts System 900 which is an enhancement of Systems 100, 200 and/or 700 and an alternative to System 800 to include a means to preheat the IHTF using at least a portion of the PCF extracted from at least one of turbines HP Turbine, MP Turbine and/or LP Turbine of System 900. Systems 800 and 900 share a common intent to use a portion of the PCF extracted from the turbines to preheat another stream that would otherwise require heating from the primary heat source, i.e. the PHTF/PHTL. For System 900, sub system 910 can be used to preheat the IHTF using a portion of the PCF extracted from the turbines.

In contrast to systems 100, 200, 700 and 800, System 900 replaces Coil 160 that preheats the IHTF using PCF from Coil 169 with Sub System 910. Sub System 910 preheats the IHTF using PCF extractions (e.g. 801 to 807). As a result, the PCF stream 152 is not cooled by transferring heat to IHTF stream 120 and so does not require reheating by Sub System 810 as with System 800. And, as with System 800, System 900 uses the heat from the turbine extractions to reduce the heat rejected to the environment in condenser 12 (or 702) and so improves the cycle efficiency.

Table 1 shows an example embodiment of System 900 that uses molten salt that can be or can include a mixture of sodium nitrate and potassium nitrate as the PHTF, dry air as the IHTF and water/steam as the PCF. In this example, a double reheat Rankine cycle can be used with about 300 bar and 550° C. for the high-pressure turbine inlet conditions and a double reheat to about 550° C. Table 1 provides the overall cycle performance information followed by a list of the several streams of FIG. 9 along with their properties and flow rates.

FIG. 10 depicts an illustrative arrangement of Sub System 810 that uses PCF extractions from the various turbines to heat the PCF streams such as 152 and/or 850 also known as boiler feed water or BFW as illustrated in FIG. 8. In this arrangement, a series of heat exchangers (820a-g) transfer heat from the PCF extractions 801-807 to the PCF fluid. Streams 801 through 807 are extracted at differing pressure levels from turbines HP Turbine, MP Turbine and/or LP Turbine with stream 801 being the highest pressure and temperature stream and each of the other streams being of lower pressure and likely also lower temperature than the prior streams. In this example, stream 807 has the lowest pressure. As shown in FIG. 10, stream 801 passes through the last heat exchanger (in relation to the flow of the preheated PCF) and then its pressure can be dropped across a flow control device, such as a valve, control valve or orifice, and mixed with the next extracted stream 802. This mixed stream passes through the next heat exchanger and can be dropped further in pressure and mixed with the next extracted stream 803. In turn, all the streams are finally dropped to the lowest pressure of stream 807 and pass through the first heat exchanger 820g. The combined stream 820 can be fully condensed (e.g. to water when the PCF is water or steam) and then pumped via pump 11 or a similar pump to the pressure of stream 151.

Figure 11:
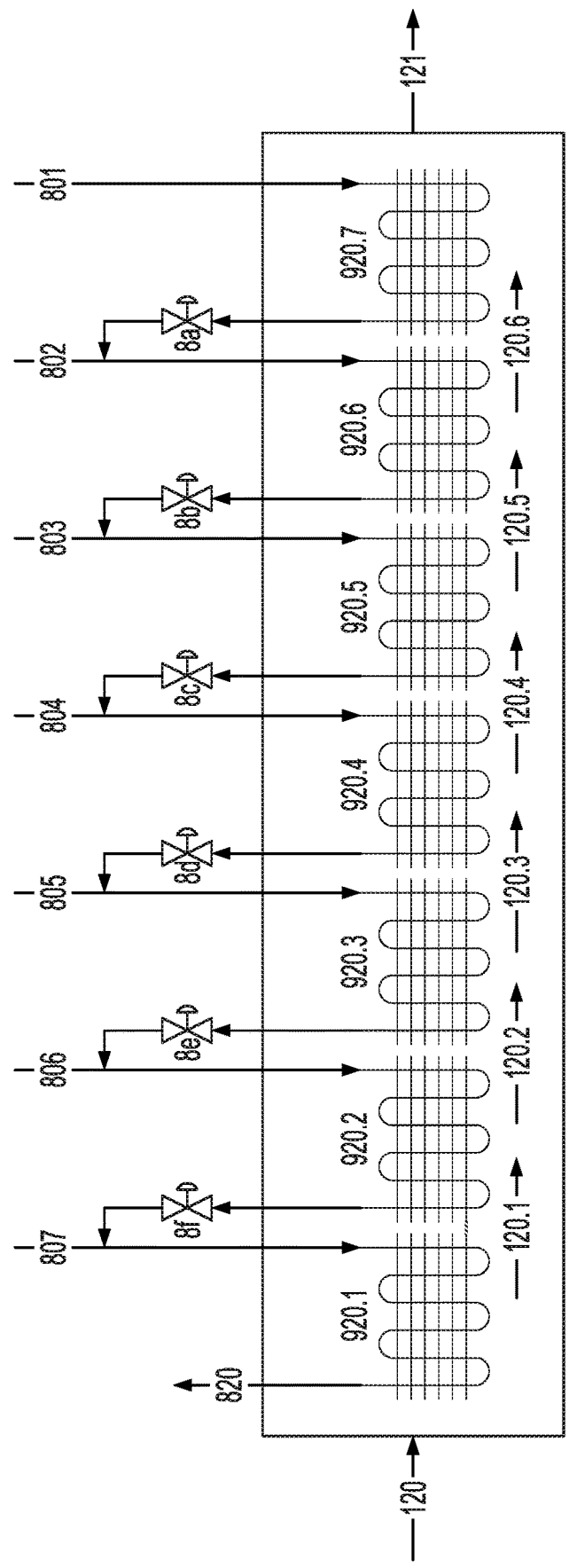
FIG. 11 depicts a diagrammatic representation of the IHTF Preheater 910 that is similar in principle to preheater 810 but rather than heating the PCF, the IHTF Preheater 910 is heated progressively.

FIG. 11 depicts System 910 that uses PCF extraction from the various turbines to heat the IHTF stream such as 120 as illustrated in FIG. 9. As depicted the IHTF Preheater 910 is similar in principle to preheater 810 but rather than heating the PCF, the IHTF Preheater 910 is heated progressively. For example, the IHTF Preheater 910 can use a similar cascade of heat exchange devices (for example Coils 920.1 to 920.7) and PCF extractions (801-807) to preheat the IHTF from stream 120 to 121.

FIG. 12 is a chart that provides a set of operating procedures for an embodiment of the proposed power plant. FIG. 12 describes one or more procedures or steps to startup the Primary Heat Transfer System including the PHTF and PHTL. FIG. 12 further includes operating procedures to start the power generation system 100, 200, 700, 900, 1400, 1800, 1900 and/or 2000. FIG. 12 further includes operating procedures to stop the power generation system in a controlled slow down or shutdown.

Figure 13:
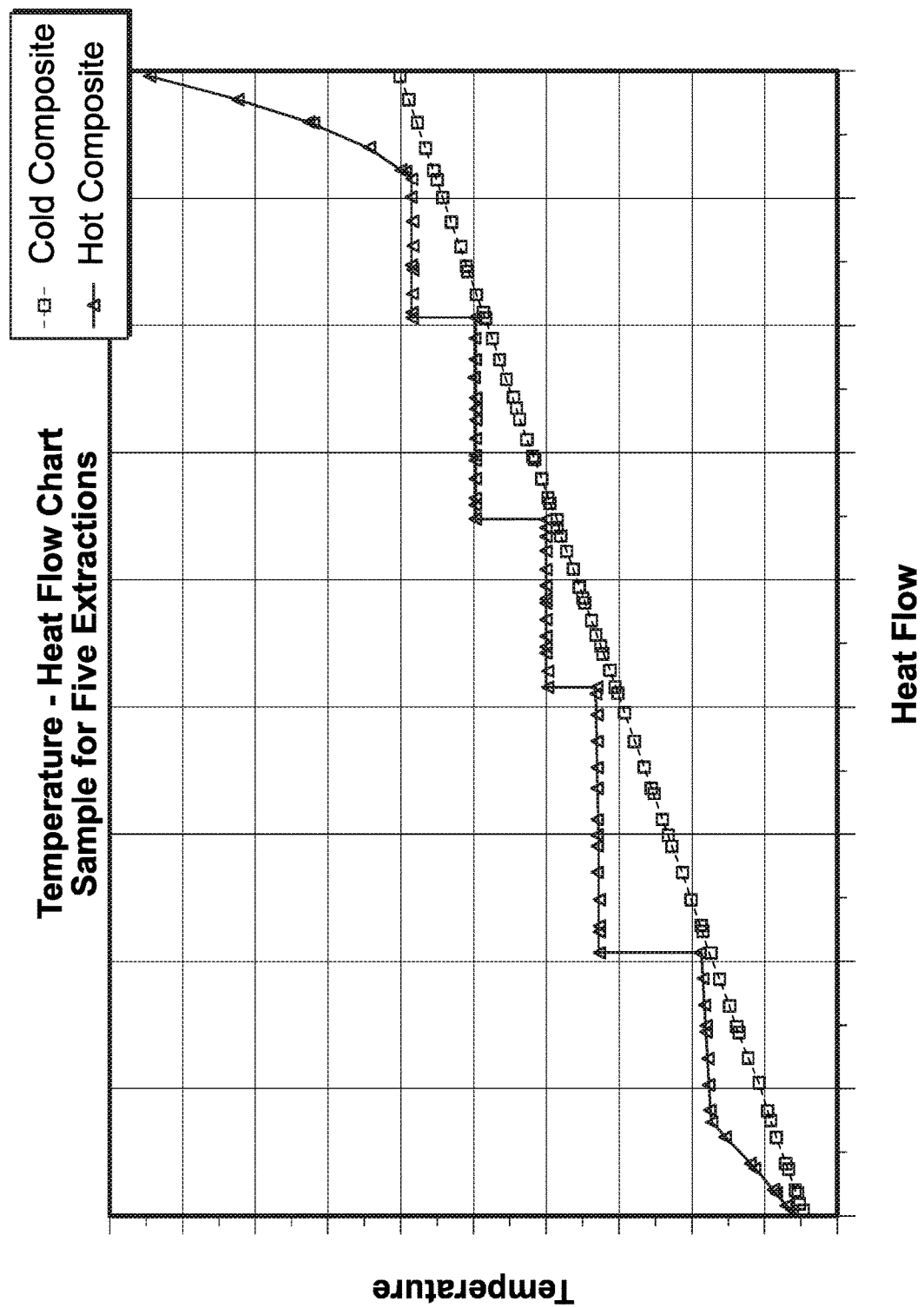
FIG. 13 depicts an example of temperature versus heat flow for the Preheater 810 or Preheater 910, according to one or more embodiments provided herein.

FIG. 13 is a chart depicting an example of temperature versus heat flow for the Preheater 810 or Preheater 910, according to one or more embodiments provided herein. The chart illustrates the relationship between the temperatures of the extracted stream and the ITHF as heat is transferred from the extracted stream and the IHTF. Five extracted PCF streams are shown. The number of extractions can range, such as for example anywhere from 1 to 10 or more.

Figure 14:
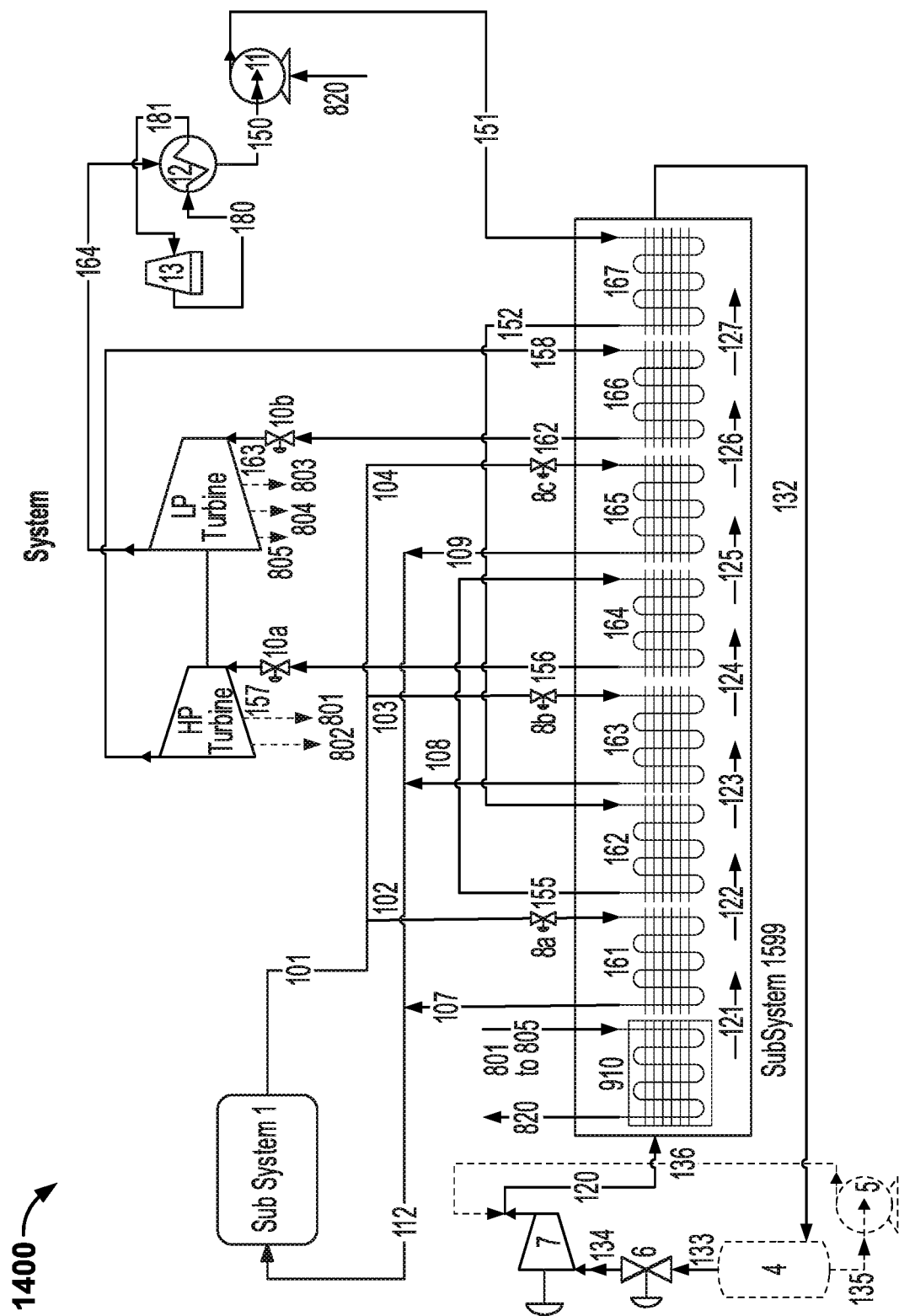
FIG. 14 depicts a schematic representation of another illustrative System 1400, according to one or more embodiments provided herein. System 1400 is like System 900 except that it depicts a only a single reheat of the PCF following the high pressure turbine.

FIG. 14 depicts a schematic representation of another illustrative System 1400, according to one or more embodiments. System 1400 shows a variation of System 900 with only a single reheat of the PCF following the high-pressure turbine. This arrangement can be well suited for lower PCF pressure or temperature applications such as sub-critical Rankine cycles that can incorporate once-through heating of the PCF rather than a system that incorporates separate heat exchange devices that first heats the PCF from a subcooled condition to a temperature at or near its vaporization temperature, then to a heat exchange device that primarily evaporates the PCF and finally to a heat exchange device and superheats the PCF prior to the PCF being directed to at least one of the several turbines. Table 2 shows an example embodiment of System 1400 that uses molten salt comprising sodium nitrate and potassium nitrate as the PHTF, dry air as the IHTF and water/steam as the PCF. In this sample embodiment, a single reheat sub-critical Rankine cycle can be used with about 144 bar and 520° C. for the high-pressure turbine inlet conditions and a reheat to 520° C. Table 2 provides the overall cycle performance information and lists each of the several streams of FIG. 14 along with their properties and flow rates.

A comparison of System 1400 and System 900 illustrates that less complex PCF turbine systems with a single reheat can be accommodated by the transfer of heat from the PHTF to IHTF and then to the PCF. Further, PCF turbine systems with no reheats can also be accommodated and are foreseen as well as PCF turbine systems with more than two reheats. More or less reheats can be accommodated by increasing or decreasing the number IHTF to PCF heat transfer coils and by appropriate changes in the number of PHTF to IHTF heat transfer coils.

Figure 15:
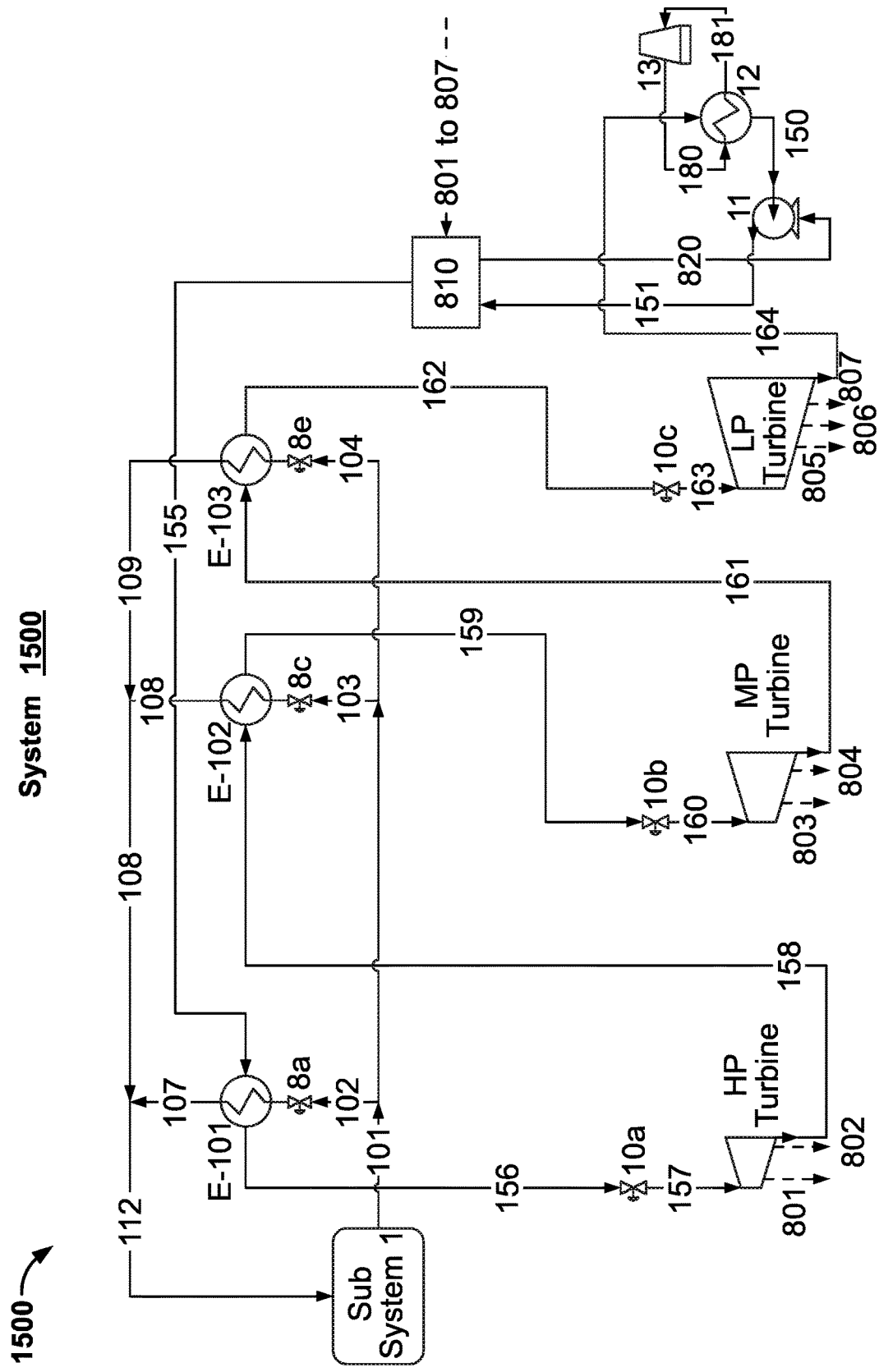
FIG. 15 depicts a schematic representation of a comparative System 1500 that employs direct PHTF to PCF heat exchangers, such as groups of shell and tube heat exchangers, for a double reheat Rankine cycle application.

FIG. 15 depicts a System 1500 that utilizes a series of heat transfer devices to transfer heat from the PHTF to the IHTF and then to the PCF with direct heat transfer from the PHTF to the PCF by the use of shell and tube heat exchangers or similar devices. System 1500 depicts direct heat transfer from the PHTF to the PCF, generally with shell and tube heat exchangers for this super-critical Rankine cycle system with double reheats. In embodiments that use such direct heat transfer, molten salt can be used as the PHTF and water or steam as the PCF. The several shell and tube heat exchangers also can be arranged in groups to serve as the E-101, E-102 and E-103 heat exchange devices. These groups of heat exchangers can include 1, 2, 4, 8 or more individual heat exchangers due to both the practical limits on the size of the heat exchanger shells of 1 to 2 m diameter. Complex piping systems with headers and laterals can be required to supply water/steam and molten salt to each heat exchanger. Further, PHTF can be used on the tube-side or shell-side of such heat exchangers. If on the tube-side, localized freezing of the PHTF can plug some or many of the tubes while the pressure rating of the shells would be required to meet the up to several hundred bar design pressure of the steam system. Alternatively, the heat exchangers can be designed with the PHTF on the shell side and so reduce the design pressure of the heat exchanger shell to perhaps ⅔rd of the steam design pressure if the typical ASME ⅔rd rule for pressure rating can be followed. Should the ASME ⅔rd rule not be followed, then it would very likely be necessary to install pressure relief valves on the shell side of the exchangers (molten salt side) to reduce the pressure rating, shell side thickness and cost of these heat exchangers. Since the pressure relief valves can be subject to intermittent leaking or weeping, heat tracing and insulation are required to ensure acceptable reliability and performance of these pressure relief valves making even the heat tracing a safety critical system.

Regardless of which design option is used for the location of the PHTF salt within the heat exchangers, the off-design conditions associated with at least startup and shutdown of the plants can be very difficult. For example, to prevent freezing of the PHTF within the heat exchangers, complex systems can be required to drain and pump out the PHTF from each exchanger during shutdown periods to avoid freezing. An alternative can include a complex piping system to bypass the PCF turbines and circulate hot PCF through the several heat exchangers to ensure that minimum flow temperatures of the PHTF are maintained. Such systems greatly complicate transitions from a shutdown conditions to the startup of the PHTL and PCL, to ramp up of load towards full load, to normal operation, to turndown operation and finally back to a spinning reserve operation or shutdown.

In contrast, several systems (e.g. PHTL, PCL and IHTL) of System 900 (and other embodiments of the present disclosure) can be operated in a more independent manner because the IHTF serves as an intermediary between the other systems. During a plant shutdown, minimal systems can be required to place plant in an idle state. In such an idle state, a small circulation of the PHTF through an auxiliary heater (e.g. FIG. 3, item 304) through the piping system together with a small circulation of the IHTF via the blower (item 7) or via natural convection can maintain temperatures throughout the PHTL above the minimum flow temperature of the selected PHTF. In this idle state, the PCL can or can not be circulated but would not be required to assure the flowability of the PHTF.

As an alternative, an auxiliary heater can be used to heat the circulating flow within the IHTL during a shutdown or idle condition to maintain the IHTF and the PHTF above minimum temperatures to assure flowability of the PHTF. Or if the PHTF actually fell below the minimum flow temperature within the various heat exchange devices (for example Coils 160 to 169 of FIGS. 1 and 2), circulation of the IHTL with an auxiliary heater heating the IHTF can be used to restore the flowability of the PHTF.

During a plant start or shutdown, the several systems can be operated in a relatively independent manner. For example, in steam Rankine cycle plants, turbine bypass systems can be used to allow at least a portion or even all of the live steam (PCF) generated to be sent to the condenser rather than through the turbines. This allows the PCF turbines to be started or shutdown independently of the various heaters. Further, the addition of the IHTL allows that system to be operated with significant independence of the PHTL. The IHTL can be operated with or without the PHTL in full operation and together with an auxiliary heater can be used to gradually warm the other systems during a start or allow the other systems to gradually cool during a shutdown. By circulation and warming of parts of the PHTL system via the IHTL, the PHTL can be maintained in a condition to assure flowability and simplify the start and stop of the overall plant as the primary heat source availability varies.

Figure 16:
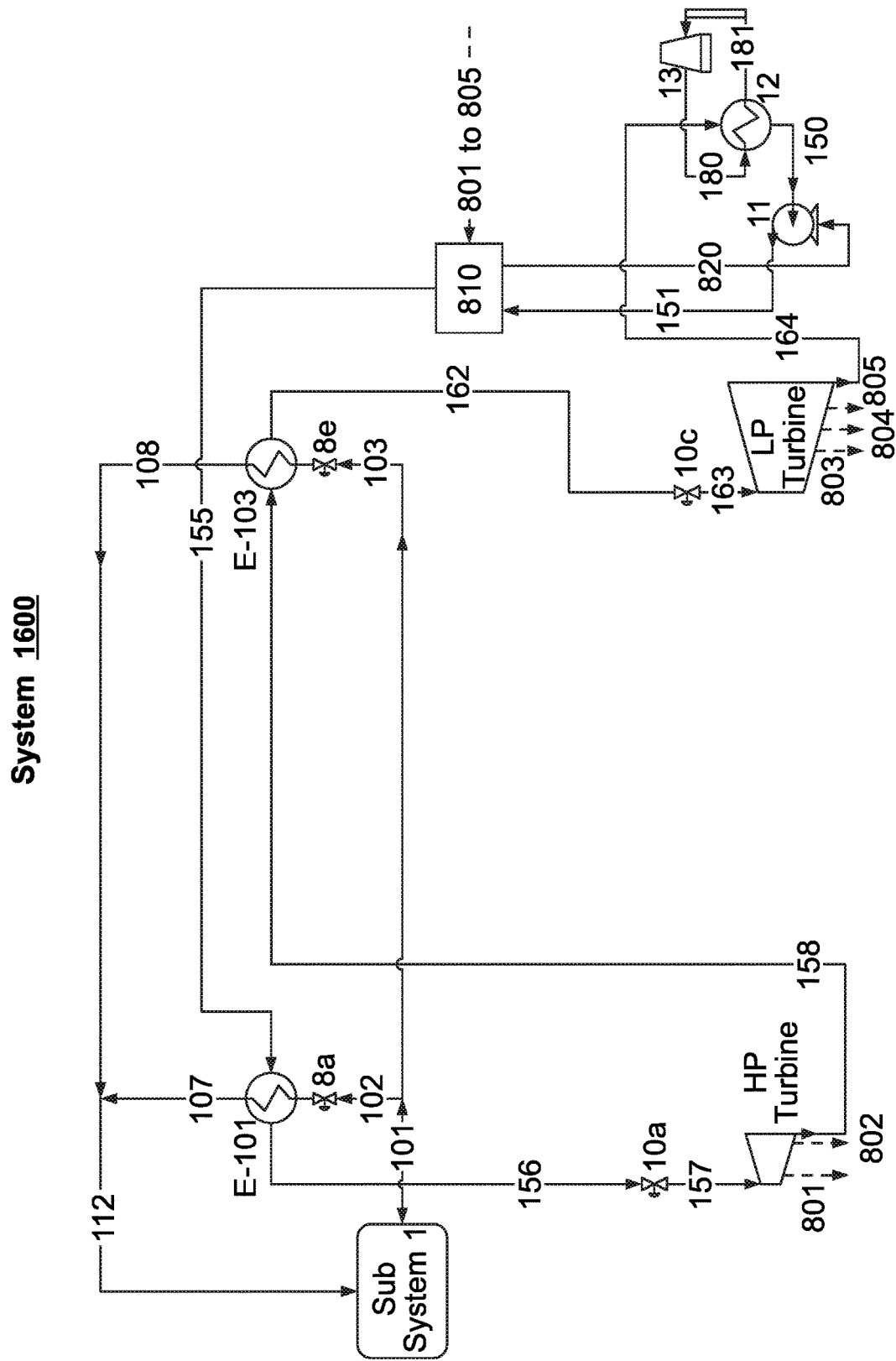
FIG. 16 depicts a schematic representation of another comparative System 1600 that employs direct PHTF to PCF heat exchangers, such as groups of shell and tube heat exchangers, for a single reheat Rankine cycle application.

FIG. 16 depicts a schematic representation of another illustrative System 1600 that employs direct PHTF to PCF heat exchangers, such as groups of shell and tube heat exchangers, for a single reheat Rankine cycle application. As with System 1400, System 1600 is depicted as using a once-through heating system rather than separate heat exchange devices to heat the subcooled PCF, then vaporize the PCF and then superheat the PCF. System 1600 can be viewed as including both the illustrated once-through systems and adaptations of the illustration to include separate PCF heating, evaporation and superheating heat exchange devices. Similar to System 1500, System 1600 uses direct PHTL to PCL heat transfer via shell and tube heat exchangers. In this case, a single reheat Rankine cycle application is depicted.

Figure 17:
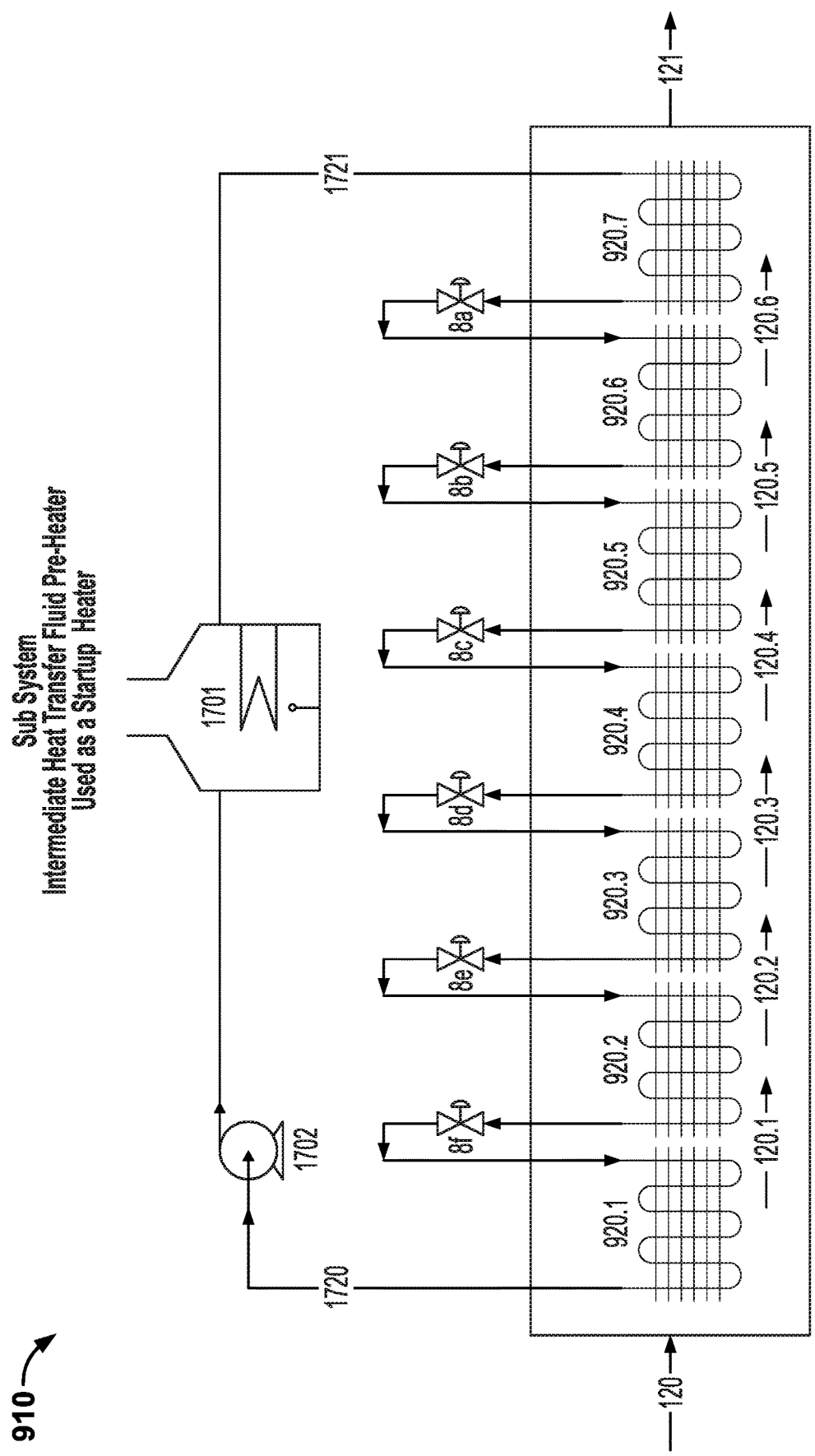
FIG. 17 depicts a diagrammatic representation of IHTF preheater 910, according to one or more embodiments provided herein.

FIG. 17 depicts a diagrammatic representation of IHTF preheater 910 that can be employed as a startup or shutdown heater to heat the IHTF using an external heater (e.g. a fired heater, auxiliary boiler, electric heater, or similar). This startup or shutdown heating system can be employed to maintain a minimum temperature within the various PHTF and PCF heat exchange devices and piping networks to assure flowability of those systems while the plant or parts of the plant are starting up, shutting down, shutdown or operating at reduced load or heat load. FIG. 17 that can be viewed with reference to FIG. 11 and Sub System 910, the IHTF Pre-Heater. Sub System 910 was previously described as a device or system that can be used in conjunction with PCF extracts from at least one of the PCF turbines to efficiently heat the IHTF during normal operation of the power plant. In addition, the same device or system or a variation of it can also be used to warm or heat the IHTL during off-design operations that can include startup, shutdown, idle, spinning reserve or similar operating conditions in which the PHTL does not provide adequate heating to maintain minimum temperatures or does not provide a desired thermal gradient for the various systems and devices comprising the PCL, IHTL and/or PHTL.

In conjunction with an auxiliary heater that can include and auxiliary boiler, fired heater, electric heater or another heat source that is independent or at least partially independent of the PHTL, Sub System 910 can be used to provide heat to the circulating IHTF to warm or control the temperature warming or cooling rates of the various systems. As depicted in FIG. 17, a single PCF stream 1720 can be heated in auxiliary heater 1701 and then cascades through at least one of the heat exchange devices 920.1 to 920.7 to warm or heat the IHTF stream 120 to become the heated IHTF stream 121. The now condensed PCF stream 820 can be directed to a boiler feed water (e.g. PCF) pump that can be an auxiliary pump 1702 to return to heater 1701. By controlling the circulation rate of the IHTF, the circulation rate and/or temperature of stream 1721 and the heat output of heater 1701, the IHTL and associated PHTL and PCL systems can be heated or cooled as required for the several plant operating modes.

Figure 18:
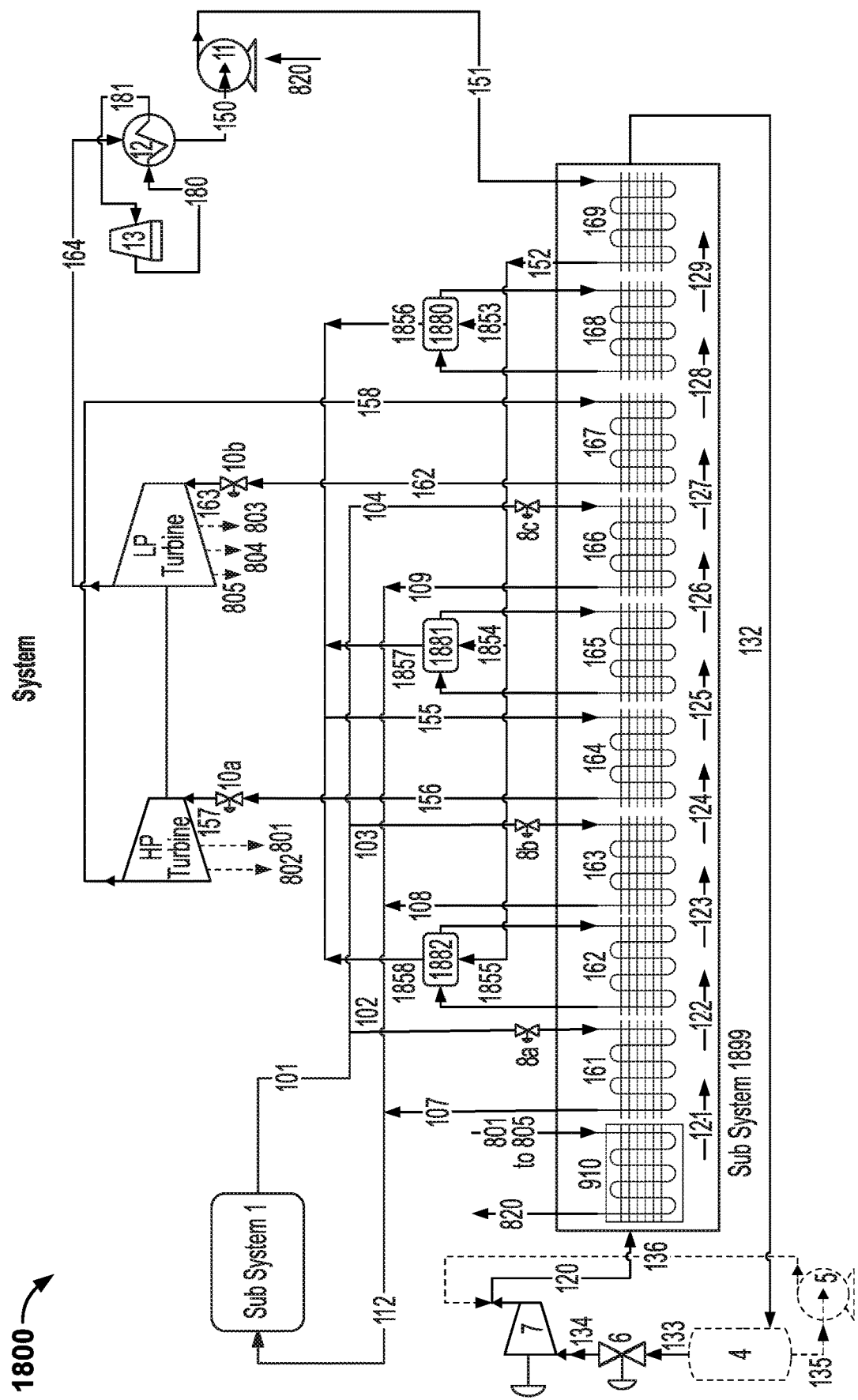
FIG. 18 depicts a schematic representation of another illustrative System 1800, according to one or more embodiments provided herein. System 1800 is a variation of System 1400 that can include separate PCF heating from a subcooled condition, for example using heat exchange device 169, evaporation of the PCF, for example using heat exchange devices 162, 165 and 168, and superheating of the PCF, for example using heat exchange device 164.

FIG. 18 is schematic representation of System 1800, which is a modification or variation of System 1400 that is specifically configured for a sub-critical Rankine power cycle system. If used for a sub-critical system, System 1400 can be described as a once-through design for the PCF. That is, System 1400 does not include clearly separate heat exchange devices to 1) pre-heat the PCF to at or near to the vaporization temperature, 2) vaporize the PCF and 3) to superheat the PCF. System 1800 is a modification of System 1400 to provide those separate heat exchange devices. Coil 169 can receive PCF stream 151 from pump 11 and heat 151 to produce stream 152 by exchanging heat with IHTF stream 129. It is expected that stream 152 is close to the vaporization temperature of the PCF at that location. Stream 152 can be then divided into at least one but perhaps several streams, for example stream 1853, 1854 and 1855 are shown in FIG. 18. These several streams are directed to at least one but perhaps several evaporator drums, for example 1880, 1881 and 1882 are shown in FIG. 18. Each of the several evaporator drums can be connected to evaporator tubes or coils that extend into Sub System 1899 to exchange heat with at least one IHTF stream (for example 122, 125 and 128 are shown in FIG. 18) and vaporize the PCF. Those skilled in the art understand that the flow through the evaporator tubes or coils can be caused by the thermosyphon effect of the evaporating PCF. The vaporized PCF then can be collected within at least one vapor stream (for example 1856, 1857 and 1858 are shown in FIG. 18) and directed to stream or pathway 155 as a saturated vapor PCF. Stream 155 can then be directed to at least one superheating device (for example coil 164 is shown in FIG. 18) for further heating by exchanging heat with at least one IHTF stream (for example, stream 124 is shown in FIG. 18) prior to the superheated stream, 156, being directed to the HP Turbine.

Still referring to FIG. 18 and specifically to PCF stream 1853, 1854 and/or 1855, those skilled in the art understand that the flow rate of these streams to their respective evaporator drums, 1880, 1881 and/or 1882 can be generally controlled by a level control valve or level control system that maintains a notionally constant level of liquid PCF within each of these evaporator drums so that fresh liquid PCF can be added as PCF can be vaporized within the evaporator drum and evaporator coils.

Figure 19:
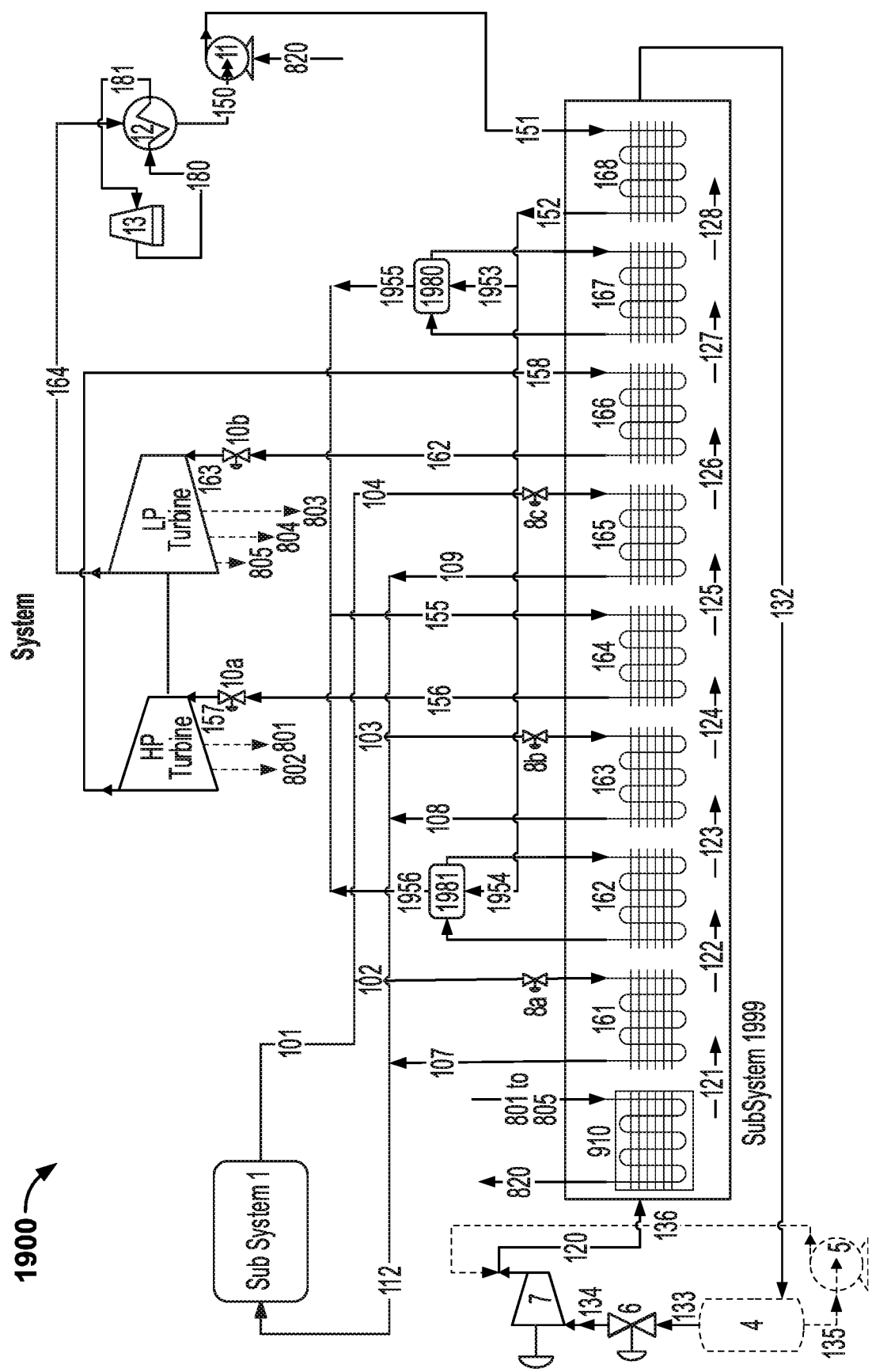
FIG. 19 depicts a schematic representation of another illustrative System 1900, according to one or more embodiments provided herein. System 1900 is a variation of System 1800 in which PCF evaporation can be performed by one less heat exchange device, for example 162 and 167.

FIG. 19 depicts a schematic representation of another illustrative System 1900, according to one or more embodiments. System 1900 is a variation of System 1800 in which PCF evaporation can be performed by one less heat exchange device, for example 162 and 167. As illustrated in FIG. 19, a majority of the PCF can be vaporized in Evaporator 1981 by heating the PCF with IHTF stream 122. The remainder of the PCF can be vaporized in Evaporator 1980 by heating the PCF with IHTF stream 127. As illustrated by FIG. 19, just prior to entering Coil 162, stream 122 was heated by PHTF stream 102 in Coil 161. In contrast, stream 127 was produced from stream 126 after reheating PCF stream 158 in Coil 166. As such, stream 127 can be less hot than stream 122 and cannot evaporate as much PCF in Coil 167 versus stream 122 in Coil 162. However, it is unexpected and surprising that by using stream 128, which is produced from stream 127 after vaporizing a portion of the PCF in Coil 167, the PCF outlet temperature (of stream 152) from Coil 168 can be maintained at or near the vaporization temperature of the PCF.

Still referring to FIG. 19, Table 3 shows an example embodiment of System 1900 that uses molten salt comprising a mixture of sodium nitrate and potassium nitrate as the PHTF, dry air as the IHTF and water/steam as the PCF. In this sample embodiment, a single reheat sub-critical Rankine cycle can be used with about 144 bar and 520° C. for the high-pressure turbine inlet conditions and one reheats also to 520° C. Table 3 provides the overall cycle performance information and lists each of the several streams of FIG. 19 along with their properties and flow rates.

Figure 20:
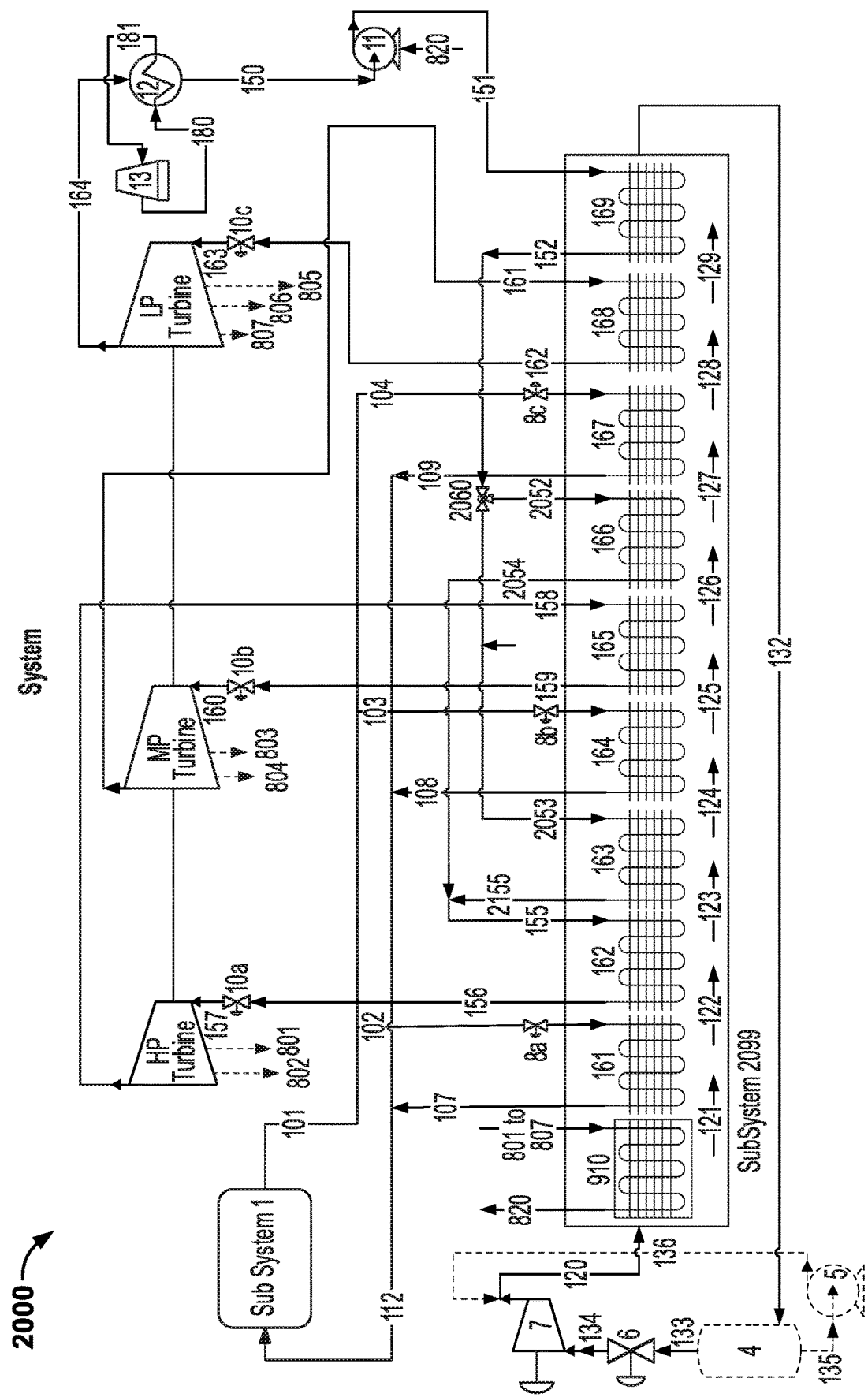
FIG. 20 depicts a schematic representation of another illustrative System 2000, according to one or more embodiments provided herein. System 2000 is a variation of System 900 and incorporates fewer PHTF heat exchange devices and uses flow control devices to split the flow of the PCF to better utilize the available heat from the IHTF and PHTF.

FIG. 20 depicts a schematic representation of another illustrative System 2000, according to one or more embodiments. System 2000 is a variation of System 900 and incorporates fewer PHTF heat exchange devices and uses flow control devices to split the flow of the PCF to better utilize the available heat from the IHTF and PHTF. System 2000 is well suited to super critical Rankine cycle applications or to sub critical applications with once-through heating of the PCF. To manage or control the heat transfer at several locations within Sub System 2099 and/or within the several heat exchange devices (for example, Coils 161 to 169 shown in FIG. 20), PCF stream 152 that has been preheated in Coil 169, can be split into at least two streams, for example 2052 and 2053 are shown in FIG. 20. The flow rate of these at least two streams can be adjusted by the action of a control valve or valves. FIG. 20 illustrates a single 3-way valve 2060 to split stream 152 into stream 2052 and 2053 but many other alternatives to adjust the flow of these streams are known to those skilled in the art. Each of these several streams can be directed to at least one heat transfer device. FIG. 20 illustrates that PCF stream 2052 can be directed to Coil 166 and can be heated by IHTF stream 126 while PCF stream 2053 can be directed to Coil 163 and can be heated by IHTF stream 123. Both IHTF streams 123 and 126 are produced by streams (i.e. streams 122 and 125, respectively) that have already been used to heat other PCF streams (i.e. streams 156 and 165, respectively) since last being heated by a PHTF stream in one of the several coils. As such, based on the amount of residual heat remaining in streams 122 and 125 they can have the capability to heat a larger or small portion of stream 152 as it is split into stream 2052 and 2053. Several control methods can be employed to adjust the split between these two streams. The flow directed to stream 2052 versus stream 2053 can be adjusted so that the temperatures of streams 2054 and 2055 are approximately equal. For this method, if the temperature of stream 2054 is higher than stream 2055, then a larger portion of stream 152 should be directed to stream 2052. Conversely, if the temperature of stream 2054 is less than stream 2055, than a lesser portion of stream 152 should be directed to stream 2052.

As an alternative control method, the flow directed to streams 2052 versus stream 2053 can be adjusted so that the temperatures of IHTF streams 124 and 127 are approximately equal. For this method, if the temperature of stream 127 is higher than stream 124, then a larger portion of stream 152 can be directed to stream 2052. Conversely, if the temperature of stream 127 is less than stream 124, than a lesser portion of stream 152 can be directed to stream 2052. The descriptions of these two control methods presume that temperature equality of the streams is a reasonable target for the methods. However, in some cases, a temperature difference can be used as the target with the respective streams −20° C., 10° C., −5° C., +5° C., +10° C. or +20° C. different in temperature. In other cases, some other property of the respective streams can be used as the target for the control methods, such as enthalpy or entropy.

Still referring to FIG. 20, Table 4 shows an example embodiment of System 2000 that uses molten salt comprising a mixture of sodium nitrate and potassium nitrate as the PHTF, dry air as the IHTF and water/steam as the PCF. In this sample embodiment, a double reheat super-critical Rankine cycle can be used with about 300 bar and 550° C. for the high-pressure turbine inlet conditions and two reheats also to 550° C. Table 4 provides the overall cycle performance information and also lists each of the several streams of FIG. 20 along with their properties and flow rates.

As described previously, FIG. 20 illustrates one arrangement that can be well suited to a super critical Rankine cycle. Table 4 provides details of the simulation of an example arrangement that is designed for a net power output of 150 MW. This illustrated cycle simulation includes assumed design bases for each of the heat exchange devices indicated on FIG. 20 as Coils 161 to 169. These coils have been sized and simulated for a "Full Load" operation of 150 MW with the assumptions that the PHTF supply temperature is about 600° C., the PHTF return temperature is about 500° C., the minimum approach temperature used to size and determine the surface area for each of the several coils 161 to 169 is about 30° C. between the PHTF and the IHTF and about 20° C. between the IHTF and the PCF. These operating conditions are exemplary of this embodiment and other operating conditions for a plant of a similar, with a larger or smaller net output are certainly possible and fully envisioned by this disclosure. For example, the PHTF to IHTF coils have been economically designed with low dT between PHTF supply and return to reduce surface area of these coils at the expense of PHTF circulation rate. Other design options are possible that increase surface area at full load to decrease PHTF return temperature and therefore its circulation rate at full load.

Figure 21:
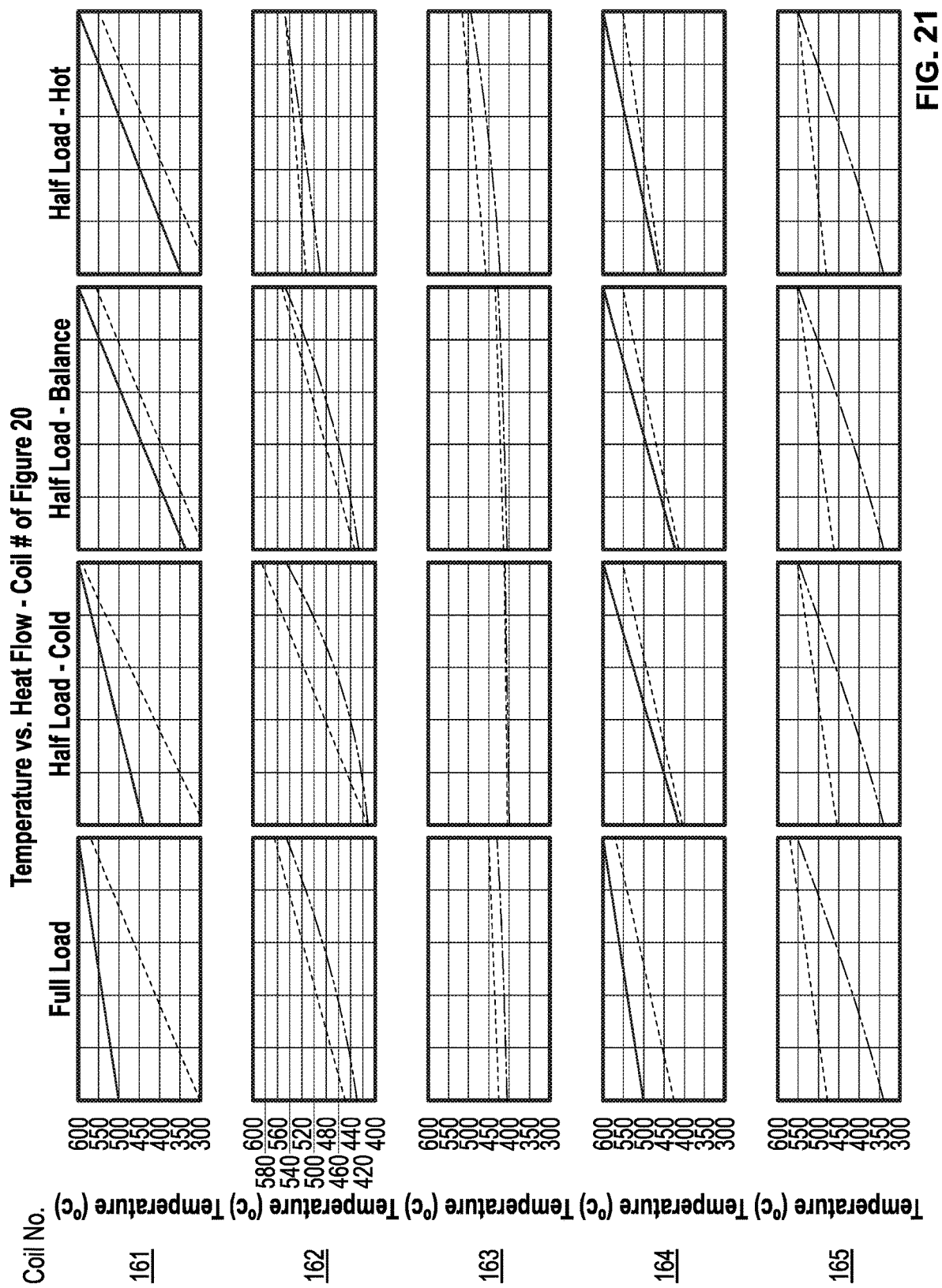
FIG. 21 depicts various temperature profiles for Coils 161 to 169 for certain embodiments described with reference to System 2000 depicted in FIG. 20.

FIG. 21 includes temperature profile charts for each of the several Coils 161 to 169 for this example arrangement and are marked as "Full Load". FIG. 21 illustrates the relationship between the PHTF temperatures and the IHTF temperatures versus the percentage of heat transferred of the example Coils 161, 164 and 167 and illustrates the relationship between the IHTF temperatures and the PCF temperatures versus the percentage of heat transferred of the example Coils 162, 163, 165, 166, 168 and 169.

In order to simulate off-design operations of the example power plant, the effective heat transfer areas of the several heat transfer devices represented by Coils 161 to 169 can be selected for a particular operating condition, such as that given by Table 4, and then frozen so that simulations can be repeated for other operating conditions in order to determine the performance and characteristics of the power plant. For example, a fifty percent (50%) turndown condition of the power plant can be simulated by maintaining the said frozen effective areas of the several heat transfer devices, by maintaining constant PCF operating pressures and temperature conditions, by maintaining constant PHTF supply pressures and temperatures and by maintaining a constant IHTF outlet pressure at blower 7 as given in Table 4. The several flow rates of the PHTF, IHTF and PCF streams are then adjusted to produce a net power of 75 MW (versus the 150 MW of Table 4) and the other conditions are determined by calculation and simulation for the power plant.

It is reasonable to expect that at turndown conditions a temperature pinch will occur on the cold side of the PHTF to IHTF coils such that the PHTF return temperature will approach and in the limit be equal to the IHTF temperature entering these coils. Specifically, the effective surface area and the PHTF supply temperature are held constant while it can be expected that the IHTF temperature can remain nominally constant or perhaps fall. Therefore, it should be clear that to transfer the lesser heat at a turndown condition, a smaller average temperature difference is needed and so the temperature difference between the IHTF entering a coil and the PHTF leaving a coil will be reduced. This is shown in FIG. 21 by comparing any of the temperature profiles for Coils 161, 164 and 167 for any of the half-load cases versus the full load case.

To avoid local "freezing" of the PHTF, the IHTF temperature can be maintained above the minimum acceptable operating temperature of the PHTF. Since the primary heat loss from the IHTF is heat transfer to the PCF, during off-design operations, temperatures of the IHTF can be measured within Sub System 2099 and the PCF circulation rate relative to the IHTF circulation rate can be reduced if the IHTF approaches the limiting setpoint determined at least in part by the minimum operating temperature of the PHTF. Referring to FIG. 20, the temperature of streams 121, 124 and 127, those being IHTF streams entering the cold side of a PHTF to IHTF heat transfer Coils 161, 164 and 167, can be measured and if a parameter that is dependent upon at least one of these temperature measurements falls below a limit setpoint, then the relative flow rate of the PCF versus the flow rate of the IHTF can be reduced or the IHTF temperature increased. This reduction can be accomplished by reducing the PCF flow rate, increasing the IHTF flow rate, increasing the IHTF by some other means or a combination of these. Conversely, if the said parameter is above the said limit setpoint, then no action of this limit control scheme is required, and other control schemes can be employed to control the relative PCF versus IHTF flow rates. For such a limit control scheme and for this example, the parameter can be equal to the minimum temperature of the streams 121, 124 and 127, an average of these temperatures or some other parameter that is determined at least in part by one of these temperatures. Again, for such a limit control scheme, the limit setpoint can be equal to the minimum acceptable operating temperature of the PHTF, the minimum operating temperature of the PHTF plus a margin of 5° C., 10° C., 20° C., 50° C. or 100° C. or higher, or limit setpoint that is at least dependent on a property of the PHTF (e.g. freezing or melting temperature, viscosity, pour point, etc.).

It can be expected that to produce an off-design operation at 50% net power, that at first estimation, the various flow rates of PCF, IHTF and PHTF can also be simply be reduced by 50%. However, the unexpected and surprising results are that except for the PCF streams this 50% estimate is unreliable, that many operating condition combinations can be determined and that a deterministic control method can be employed to adjust the several IHTF and PHTF flow rates to provide an optimum or near optimum combination of operating conditions for on-design and off-design operation of the power plant. FIG. 21, in addition to the said "Full Load" temperature profiles for each coil, it also includes three additional temperature profiles for each coil for operations at 50% power. These three additional temperature profiles are labelled either "Balanced", "Cold" or "Hot" to signify if the temperature pinch shown for Coil 162 is a cold-side pinch, hot-side pinch or is approximately balanced between the hot and cold sides. That is, for a cold-side pinch of Coil 162, the temperature of IHTF stream 123 is only slightly higher than the temperature of PCF stream 155. For a hot-side pinch of Coil 162, the temperature of IHTF stream 122 is only slightly higher than the temperature of PCF stream 156. For the balanced condition, the hot-side and cold-side temperature differences are similar.

Table 5 shows the detailed results for the example embodiment of FIG. 20 and Table 4 while operating at 50% power with a "balanced" condition. Referring to PCF stream 151, PHTF stream 101 and IHTF stream 120, the PCF flow rate of Table 5 is 50% of that of Table 4, the PHTF flow rate of Table 5 is 45.1% of that of Table 4 and the IHTF flow rate of Table 5 is 51.1% of that of Table 4.

Table 6 shows the detailed results for the example embodiment of FIG. 20 and Table 4 while operating at 50% power with a "cold-side pinch" condition. The PCF flow rate of Table 6 is 49.8% of that of Table 4, the PHTF flow rate of Table 6 is 55.0% of that of Table 4 and the IHTF flow rate of Table 6 is 46.6% of that of Table 4.

Table 7 shows the detailed results for the example embodiment of FIG. 20 and Table 4 while operating at 50% power with a "hot-side pinch" condition. The PCF flow rate of Table 7 is 49.1% of that of Table 4, the PHTF flow rate of Table 7 is 52.5% of that of Table 4 and the IHTF flow rate of Table 7 is 63.8% of that of Table 4.

These results indicate that the PCF flow when all PCF operating conditions are maintained constant, changes approximately in proportion to the net power generation when the power plant is turned down and are for the most part independent of PHTF or IHTF flow rate variations so long as the desired PCF operating conditions can be maintained. The results for the "hot-side pinch" condition vary slightly from this due to the higher resulting temperature of stream 120 that reduced the allowed PCF extractions to Sub System 910 and reduced PCF circulation rate at 50% load. These results also indicated that by adjusting the IHTF flow rate to move from a lowest IHTF flow at "cold-side pinch" through the "balanced pinch" and finally to a "hot-side pinch" condition, the PHTF flow rate can vary from 55% to 45.1% to 52.5% of the 100% load case.

Referring to Table 6, the "cold-side pinch" conditions detailed in this table represent approximately the lowest IHTF flow rate that can meet all the required operating conditions of the example power cycle at this 50% turndown condition. The "cold-side pinch of Coil 162 results in a concomitant "hot-side pinch" of Coil 161 to the point that the temperature of IHTF stream 122 is nearly equal to the highest available PHTF temperature. As such, the required heat to produce the expected net power of the power plant at this condition cannot be provided by a lesser flow of the IHTF. Because of the lower IHTF flow rate versus the "balanced pinch" condition, the cycle efficiency is slightly higher for this "cold-side pinch" condition (44.97% versus 44.91%). However, given that it represents a limit of the feasible IHTF flow rate that maintains other power cycle performance requirements, it can be near an optimum based solely on cycle efficiency given the other operating conditions for this sample application, but it cannot represent an optimum given other factors that can include plant operability, detection, and operating flexibility.

The "hot-side pinch" conditions of Table 7 represent a high but not the highest IHTF flow rate that can meet all the required operating conditions of the example power cycle at this 50% turndown condition. In contrast to the "cold-side pinch" condition, the higher flow rate of IHTF of the "hot-side pinch" condition maintains the IHTF at a higher average temperature than either the "cold-side pinch" or "balanced pinch" conditions. As a result, the "hot-side pinch" condition does not reach a limiting high flow rate that can no longer satisfy the required operating conditions of the power cycle. Rather, as the IHTF circulation rate increases, the cycle efficiency is reduced as more energy is required by the blower (7). Also, at these higher IHTF flow rates, residual heat cannot be adequately transferred from IHTF stream 129 to PCF stream 152. This results in a greater cold-side approach of the Coil 169 heat exchange device in this example configuration and a higher temperature of IHTF stream 132 when compared to the "balanced pinch" or "cold-side pinch" turndown conditions. Both the higher IHTF flow rate and the higher temperature of IHTF stream 133 and 134 result in a higher power requirement from blower 7 which reduces the estimated cycle efficiency from 44.90% at full load to 44.91% at half load with a "balanced pinch" to 44.0% with the "hot-side pinch" of Table 7.

Damper (6) and blower (7) can be adjusted as discussed previously to affect the IHTF flow rate. As indicated by comparison of the results given in Tables 4 to 7, a wide range of IHTF flow rates are possible that can serve to transfer the needed heat from the PHTF to the PCF to generate the desired power and/or heat from a power plant based on the technologies disclosed herein. The surprising and unexpected result of these studies and comparisons is that a near optimum IHTF flow rate can be determined by adjusting Damper (6), Blower (7) or a combination of these to achieve an IHTF flow rate for which the hot-side pinch and cold-side pinch of at least one of the heat exchange devices are approximately equal or approximately equal plus or minus a margin.

Using Coil 162 of FIG. 20 as an example, the "cold-side pinch" temperature is equal to the temperature of IHTF stream 123 less the temperature of PCF stream 155 and the "hot-side pinch" temperature is equal to the temperature of IHTF stream 122 less the temperature of PCF stream 156. For this example, if the cold-side pinch temperature is less than the hot-side pinch temperature, then the IHTF flow rate can be increased by adjusting the damper and/or blower adjustments. Conversely, if the cold-side pinch temperature is more than the hot-side pinch temperature, then the IHTF flow rate can be decreased by adjusting the damper and/or blower adjustments. The IHTF flow adjustments can be continued until the cold-side pinch and hot-side pinch temperatures are balanced to zero.

As an alternative to the above, it is not necessary or perhaps even desired to balance the hot and cold-side pinch temperatures to zero but rather a bias or temperature difference setpoint can be used such that difference between the cold-side pinch temperature and hot-side pinch temperature can be controlled to maintain a bias of −50° C., −20° C., −10° C., −5° C., −2° C., −1° C., 0° C., 1° C., 2° C., 5° C., 10° C., 20° C. or 50° C. or some other value found to provide an advantage. This bias temperature can be a fixed value or one that is calculated or determined based on some operating parameter of the power plant, such as IHTF flow rate, PHTF flow rate, PCF flow rate, net or gross power production, PHTF supply temperature, IHTF temperature, a PCF temperature, etc.

In this example configuration, the selected heat exchange device was Coil 162 which is the heat exchange device that superheats the PCF prior to entering the HP Turbine. Others of the heat exchange devices can be used for this control method. Further, operating conditions of several of the heat exchange devices can be combined by an average or other combination. The cold-side pinch and hot-side pinch temperatures have been described as calculated based on stream conditions upstream or downstream of the heat exchange device. It is envisioned in this disclosure that other temperature measurement locations can be used that are not directly upstream or downstream of the heat exchange devices. To the extent that these other temperature measurement locations are at least affected by the temperatures described herein to determine the cold-side pinch temperature and the hot-side pinch temperature, then they are also considered to determine the cold-side pinch temperature and hot-side pinch temperature for the purposes of the described control method.

The difference between the cold-side pinch and hot-side pinch temperatures described in the proceeding paragraphs is numerically equal to the difference between a first temperature difference and a second temperature difference. The first temperature difference being equal to the inlet temperature less the outlet temperature of the IHTF at a coil (e.g. temperature of stream 122 less the temperature of stream 123) and the second temperature difference being equal to the difference between the outlet temperature less the inlet temperature of the PCF at a coil (e.g. temperature of stream 156 less the temperature of stream 155). In practice, it is not necessary to measure or determine the temperature precisely at the inlet and outlet of a coil and temperatures of the IHTF at two different locations and PCF temperatures at two different locations could be equally used to determine or calculate the said first and second temperature differences.

Referring now to FIG. 11, it is expected that the temperature of IHTF stream 121 can be the lowest temperature stream that exchanges heat with the PHTF. As such, the design and operation of Sub System 910 can be such that the temperature of stream 121 is maintained above the minimum acceptable operating temperature of the PHTF to avoid the possibility or probability of local flowability issues of the PHTF. So sufficient PCF extracts (e.g. 801 to 807) and sufficient Coils (e.g. 920.1 to 920.7) can be provided to ensure that stream 121 can be maintained above such a minimum temperature setpoint during all normal and expected turndown conditions. Further, during off-design operating conditions, the PCF extraction rates can be adjusted using a limit control method to maintain the said minimum temperature of IHTF stream 121. Such limit control method can increase the PCF extraction rates above the desired outputs of other control methods that can be intended for the most efficient PCF extractions rates if the temperature of stream 121 of FIG. 11 falls below the minimum acceptable value.

Further to the above and now referring to FIG. 17, Sub System 910 can also include an auxiliary heater (1701) and circulating pump (1702). During off-design or unusual operations when PCF extractions are not available or not available in sufficient flow rates to maintain IHTF stream 121 above the minimum acceptable value, then the auxiliary heater and circulating pump can be used to adjust the flow rate, pressure and/or temperature of stream 1721 to thereby control the temperature of stream 121 to a setpoint at or above the minimum acceptable value by a selected margin. Specifically, if the temperature of stream 121 falls below the setpoint, more heat can be provided by 1701. If the temperature of stream 121 is above the setpoint, then less heat can be provided by 1701. This enhancement of Sub System 910 of FIG. 17 and the described control method can be required during plant warm-up, start-up, shutdown, spinning reserve, or other operating conditions in which the IHTF can be circulated with PHTF introduced to the plant.

Referring now to FIG. 5 and FIG. 20 and using PHTF stream 102, IHTF stream 122 and PCF stream 156 as an example, it can be possible to control the temperature of stream 156 by adjusting the flow rate of stream 102. Such adjustment can be done by modulation of at least one of Valves 8a to 8b of FIG. 5 or by other means known to those skilled in the art that are not shown in FIG. 5. These means can include but are not limited to adjustable speed pumps, adjustable geometry pumps, multi-port valves, adjustable flow restrictions and similar devices.

Considering the results given in Table 4 for the full load example, the mass flow of stream 102 can be about 3687 T/h with a stream 102 temperature of 600° C., stream 107 temperature of 500° C., a stream 122 temperature of 570° C. and a stream 156 temperature of 550° C. If only the flow rate of stream 102 is increased by 5% and with fixed heat exchanger effective areas, then stream 102 remains at 600° C., stream 107 increases to 504.4° C., stream 122 increases to 570.9° C. and stream 156 increases to 551.0° C. Conversely, if only the flow rate of stream 102 is decreased by 5%, then stream 102 remains at 600° C., stream 107 decreases to 495.4° C., stream 122 decreases to 569.0° C. and stream 156 decreases to 548.9° C. As such, the temperature of the PCF stream to the HP Turbine can be directly controlled by adjusting the mass flow of the PHTF to a PHTF-to-IHTF heat transfer device (e.g. Coil 161 in this example). With other parameters held constant, increasing the flow rate of the portion of PHTF to one such coil (e.g. Coil 161) will tend to increase the temperature of the relevant IHTF stream (e.g. stream 122 in this example) that in turn will cause the temperature of the relevant PCF stream (e.g. stream 156 in this example) to also increase. Conversely, decreasing the flow rate of the portion of the PHTF to the same coil will tend to decrease the temperature of the relevant IHTF and PCF streams.

In a similar fashion, the temperatures of other PCF streams can be similarly controlled by adjusting the flow rates of other PHTF streams (e.g. streams 103 and/or 104 in FIG. 20). The simplest form of such a control scheme can measure the temperature of the relevant PCF streams to be controlled and adjust the PHTF flow rates using a PID (Proportional-Integral-Derivative) controller to achieve the desired setpoint condition. An alternative can measure and control the temperature of the relevant IHTF stream to a desired temperature setpoint and then adjust the IHTF setpoint until the PCF stream has reached the desired temperature. Such a control scheme can adjust the flow rate of one PHTF stream to achieve a temperature setpoint condition for one IHTF stream or one PCF stream and adjust the flow rate of another PHTF stream to achieve a temperature setpoint for another IHTF stream or another PCF stream and extended in a similar fashion for added PHTF, IHTF and/or PCF streams.

It is envisioned that adjustment of the individual PHTF flow rates can affect the temperature of streams other than the said relevant PCF or IHTF stream temperatures. That is, adjusting a single PHTF flow rate can affect more than one of the PCF or IHTF stream temperatures. Therefore, a multi-variable control system can be better used. Such a multi-variable control system can be adjusted to compensate for the interactions between each PHTF flow rate adjustment and the resulting IHTF and/or PCF stream temperatures so that each of the several temperature setpoints can be achieved concurrently or simultaneously with minimal interactions.

The controls and protective systems of turbines in a power plant are well known in the power generation industry and are not a subject of this disclosure. Referring to FIG. 20, in general such control systems adjust valves such as those shown as Valves 10a, 10b and 10c to adjust the PCF flow to each stage of the turbines to meet a desired power generation need and maintain synchronization of an electric generator with the local electrical grid frequency. This can be termed as load following and is generally implemented as a closed loop control system.

In addition, protective systems can be used to prevent overspeed of the turbine-generator system due to sudden load shedding by shifting from a closed-loop control system to an open-loop control system to adjust at least one of 10a, 10b and 10c by a proscribed amount. Further, the turbine control system can also be required to respond to electrical grid instabilities and/or faults by again shifting to an open-loop control system to make similar valve adjustments. Such instabilities can include at least one of under-frequency event, over-frequency event, line-to-line faults, line-to-ground faults and three-phase faults.

Such turbine control and protective systems and the effects of these systems on the flow and operating conditions of the several PCF streams are normal and expected and the remainder of the power plant can be designed to respond in a reasonable manner. As such, in addition to the feedback controls for the IHTF flow rate and PHTF flow rate described previously, a feed-forward or open-loop control system can also be incorporated into the overall control system. Such a feed-forward or open-loop control system can be used to adjust the flow rate of the IHTF and PHTF in combination with the previously described feedback system when conditions of the PCL and PCF change faster than can be accommodated by the feedback system alone. For example, if the turbine-generator system suddenly dropped a large percentage of load to respond to an external grid condition or the electric breaker disconnected from the external grid, then the turbine power and PCF flow rate can suddenly drop in response to this sudden disturbance. A feed forward or open-loop control system for the IHTF and PHTF flow controls can ramp the flow rate of each of these in proportion to at least one of the PCF flow rates and the turbine stage power. The effect of this feed forward or open loop control can be limited to a short time and the normal feedback controls can be returned to prominence after the disturbance has ebbed.

The present disclosure further includes any one or more of the following numbered embodiments:

1. A system for generating power, comprising: a) a primary heat transfer loop wherein the primary heat transfer loop comprises a primary heat transfer fluid having a flow rate, a temperature and a pressure, a high value heat source and at least one heat transfer device to transfer heat from the high value heat source to the primary heat transfer fluid; b) an intermediate heat transfer loop wherein the intermediate heat transfer loop comprises an intermediate heat transfer fluid having a flow rate, at least one primary heat transfer device to transfer heat from at least a first portion of the primary heat transfer fluid to the intermediate heat transfer fluid and at least one heat primary transfer device to transfer heat from at least a second portion of the primary heat transfer fluid; c) a power cycle loop wherein the power cycle loop comprises a power cycle fluid having a flow rate, at least one of a circulating fan, blower, compressor and/or a pump, at least one turbine stage to convert the heat or enthalpy of the power cycle fluid to useful work or power, at least two power cycle heat transfer devices to transfer heat from the intermediate heat transfer fluid to increase the temperature or enthalpy of the power cycle fluid and at least one tertiary heat transfer device to reject residual heat from the power cycle fluid to an external system; d) a sequence of the said at least two primary heat transfer devices and the at least two power cycle heat transfer devices to transfer heat from the primary heat transfer fluid to the power cycle fluid such that the intermediate heat transfer fluid is first increased in temperature by transferring at least some heat from the first portion of the primary heat transfer fluid to the intermediate heat transfer fluid, then the intermediate heat transfer fluid is reduced in temperature by transferring at least some heat to the power cycle fluid, then the intermediate heat transfer fluid is again increased in temperature by transferring at least some heat from the second portion of the primary heat transfer fluid and then the intermediate heat transfer fluid is again reduced in temperature by transferring at least some heat to the power cycle fluid; e) a pathway, pipe or conduit system configured to return the at least first and second portions of the primary heat transfer fluid to the high value heat source; f) a pathway, pipe or conduit system configured to direct at least a portion of the power cycle fluid to a turbine stage to generate useful work or power and direct that power cycle fluid to the tertiary heat exchange device; and g) a pathway, pipe or conduit system configured to return the power cycle fluid from the tertiary heat exchange device to the said at least two power cycle heat transfer devices.

2. The system of Embodiment 1 wherein the primary heat transfer fluid comprises a molten salt, heat transfer oil, hydrogen, an inert gas, liquid metal or a hydrocarbon fluid.

3. The system of Embodiments 1 or 2 wherein the intermediate heat transfer fluid comprises water, steam, air, any constituent of air or a hydrocarbon fluid.

4. The system according to any Embodiment 1 to 3 wherein the power cycle fluid comprises, water, steam, air, humidified air, any constituent of air including but not limited to nitrogen, argon, helium and carbon dioxide and/or a hydrocarbon fluid.

5. The system according to any Embodiment 1 to 4 wherein the intermediate heat transfer fluid is recirculated.

6. The system according to any Embodiment 1 to 5 wherein the intermediate heat transfer loop comprises a blower, compressor or fan to recirculate the intermediate heat transfer fluid.

7. The system according to any Embodiment 1 to 6 wherein the blower, compressor or fan comprises an adjustable operating speed.

8. The system according to any Embodiment 1 to 7 wherein the blower, compressor or fan comprises adjustable inlet guide vanes, adjustable stator vanes or adjustable rotating blades.

9. The system according to any Embodiment 1 to 8 wherein the intermediate heat transfer loop comprises a damper configured to allow adjustment of the flow rate of the intermediate heat transfer fluid.

10. The system according to any Embodiment 1 to 9 wherein the intermediate heat transfer loop is arranged with hot and cold vertical legs or sections configured to at least cause some natural circulation of the intermediate heat transfer fluid.

11. The system according to any Embodiment 1 to 10 wherein the flow rate of the intermediate heat transfer fluid is adjusted by at least one of: a) changing the operating speed; b) changing the position of the inlet guide vanes; c) changing the position of the stator vanes; d) changing the position of the rotating blades of the blower, compressor or fan; and e) changing the position of the damper.

12. The system according to any Embodiment 1 to 11 wherein at least one of the primary heat transfer devices or at least one of the power cycle heat transfer devices comprises a means to measure or determine the temperatures differences of the streams on the cold side of the heat transfer device and the temperature differences of the streams on the hot side of the heat transfer device.

13. The system according to any Embodiment 1 to 12 wherein the flow rate of the intermediate heat transfer fluid is adjusted until the temperature difference of the cold side streams is approximately equal to the temperature difference of the hot side streams plus or minus a temperature margin setpoint.

14. The system according to any Embodiment 1 to 13 wherein the temperature margin setpoint is approximately equal to zero.

15. The system according to any Embodiment 1 to 14 wherein the temperature margin setpoint is a fixed value selected between −50° C. and +50° C.

16. The system according to any Embodiment 1 to 15 wherein the temperature margin setpoint can be adjusted at least in part based at least one of a primary heat transfer fluid flow rate, the intermediate heat transfer fluid flow rate, a power cycle fluid flow rate, the net power generated, and/or the gross power generated.

17. The system according to any Embodiment 1 to 16 wherein the external system comprises atmospheric air, a cooling tower, and/or an external heat consumer including but not limited to a district heating system and a process plant.

18. The system according to any Embodiment 1 to 17 wherein the flow rate of the intermediate heat transfer fluid is further adjusted in response to a rapid change of at least one of the power cycle fluid flow rate and the useful work of power of the turbine stage and that such further adjustment is transitory and reverts after a period of time to the adjustment determined by system of Embodiment 13.

19. The system according to any Embodiment 1 to 18 wherein the power cycle loop comprises a means to measure or determine the temperature of at least one power cycle fluid stream and wherein the primary heat transfer loop comprises a means to adjust the flow rate of at least one primary heat transfer fluid stream.

20. The system according to any Embodiment 1 to 19 wherein the flow rate of the at least one primary heat transfer fluid is adjusted until the temperature of the at least one power cycle fluid stream is approximately equal to an at least one power cycle fluid setpoint temperature.

21. The system according to any Embodiment 1 to 20 wherein the intermediate heat transfer loop comprises a means to measure or determine the temperature of at least one intermediate heat transfer fluid stream.

22. The system according to any Embodiment 1 to 21 wherein the flow rate of the at least one primary heat transfer fluid stream is adjusted until the temperature of the at least one intermediate heat transfer fluid stream is approximately equal to an at least one intermediate heat transfer fluid setpoint.

23. The system according to any Embodiment 1 to 22 wherein the at least one intermediate heat transfer fluid setpoint is adjusted until the temperature of the at least one power cycle fluid stream is approximately equal to an at least one power cycle fluid setpoint temperature.

24. The system according to any Embodiment 1 to 23 wherein the system for generating power comprises a multi-variable control system to adjust the flow rates of the several portions of the primary heat transfer fluid streams until the temperatures of the several intermediate heat transfer fluid streams and/or the temperatures of the several power cycle fluid streams are each approximately equal to a setpoint temperature desired for each of these streams.

25. The system according to any Embodiment 1 to 24 wherein the intermediate heat transfer loop comprises a means to measure or determine the pressure of the intermediate heat transfer loop for at least one location.

26. The system according to any Embodiment 1 to 25 wherein the intermediate heat transfer loop comprises a means to add or remove intermediate heat transfer fluid from or to an external source or reservoir.

27. The system according to any Embodiment 1 to 26 wherein the intermediate heat transfer fluid is added to or removed from the intermediate heat transfer loop until the said pressure of the intermediate heat transfer loop is approximately equal to an intermediate heat transfer loop pressure setpoint.

28. The system according to any Embodiment 1 to 27 wherein the intermediate heat transfer loop comprises a blower, compressor or fan to circulate the intermediate heat transfer fluid, the intermediate heat transfer fluid is substantially ambient air and the intermediate heat transfer fluid is not substantially recirculated.

29. The system according to any Embodiment 1 to 28 wherein the intermediate heat transfer fluid is substantially ambient air and the intermediate heat transfer fluid is not substantially recirculated.

30. The system according to any Embodiment 1 to 29 wherein the at least one turbine stage comprises power cycle fluid extraction ports to remove at least a first portion of the power cycle fluid at a flow rate, pressure and temperature and at least a second portion of the power cycle fluid at a flow rate, another pressure and another temperature.

31. The system according to any Embodiment 1 to 30 wherein at least the first portion and the second portion of the power cycle fluid is introduced to an intermediate heat transfer fluid preheater to heat the intermediate heat transfer fluid and so cool the at least first and second portions of the power cycle fluid.

32. The system according to any Embodiment 1 to 31 wherein at least the first and second portions of the power cycle fluid are returned to the power cycle loop after cooling.

33. The system according to any Embodiment 1 to 32 wherein the primary heat transfer loop comprises a storage tank.

34. The system according to any Embodiment 1 to 33 wherein the intermediate heat transfer fluid circulation rate is controlled at a lower rate and/or the independent heat transfer loop that captures heat from the power cycle area and provides additional heat to the to the intermediate heat transfer loop before the molten salt are controlled to allow a lower and more stable turndown operation compared to just adjusting the molten salt rate and BFW/steam flow rate.

35. A control system, comprising: a) a primary heat transfer loop wherein the primary heat transfer loop comprises a primary heat transfer fluid having a total flow rate, a temperature and a pressure, a high value heat source, at least one heat transfer device to transfer heat from the high value heat source to the primary heat transfer fluid, a means to divide the said total flow rate into at least two portions each having a separate flow rate and a means to adjust the flow rates of the first portion and the second portion of the said at least two portions; b) an intermediate heat transfer loop wherein the intermediate heat transfer loop comprises an intermediate heat transfer fluid having a flow rate, at least one primary heat transfer device to transfer heat from at least a first portion of the primary heat transfer fluid to the intermediate heat transfer fluid, at least one heat primary transfer device to transfer heat from at least a second portion of the primary heat transfer fluid, a means to adjust the flow rate of the intermediate heat transfer fluid, and a means to measure or determine the temperature of the intermediate heat transfer fluid at a least two locations; c) a power cycle loop wherein the power cycle loop comprises a power cycle fluid having a flow rate, at least one of a circulating fan, blower, compressor and/or a pump, at least one turbine stage to convert the heat or enthalpy of the power cycle fluid to useful work or power, at least two power cycle heat transfer devices to transfer heat from the intermediate heat transfer fluid to increase the temperature or enthalpy of the power cycle fluid, at least one tertiary heat transfer device to reject residual heat from the power cycle fluid to an external system, and a means to measure or determine the temperature of the power cycle fluid for at least two locations; d) a sequence of the said at least two primary heat transfer devices and the at least two power cycle heat transfer devices to transfer heat from the primary heat transfer fluid to the power cycle fluid such that the intermediate heat transfer fluid is first increased in temperature by transferring at least some heat from the first portion of the primary heat transfer fluid to the intermediate heat transfer fluid, then the intermediate heat transfer fluid is reduced in temperature by transferring at least some heat to the power cycle fluid, then the intermediate heat transfer fluid is again increased in temperature by transferring at least some heat from the second portion of the primary heat transfer fluid and then the intermediate heat transfer fluid is again reduced in temperature by transferring at least some heat to the power cycle fluid; e) a pathway, pipe or conduit system configured to return the at least first and second portions of the primary heat transfer fluid to the high value heat source; f) a pathway, pipe or conduit system configured to direct at least a portion of the power cycle fluid to a turbine stage to generate useful work or power and direct that power cycle fluid to the tertiary heat exchange device; g) a pathway, pipe or conduit system configured to return the power cycle fluid from the tertiary heat exchange device to the said at least two power cycle heat transfer devices; h) a means to adjust the flow rate of the first portion of the primary heat transfer fluid to achieve a desired temperature setpoint condition a one power cycle fluid location; and i) a means to adjust the flow rate of the second portion of the primary heat transfer fluid to achieve a desired temperature setpoint condition at another power cycle fluid location.

36. The system of Embodiment 35 wherein the means to adjust the flow rates of the first and second portions of the primary heat transfer fluid are incorporated into a multi-variable controller that compensates for interactions between the flow rates of the first and second portions of the primary heat transfer fluid and the power cycle fluid temperatures.

37. The system of Embodiments 35 or 36 wherein the primary heat transfer fluid total flow rate is divided into more than two portions and a means is provided to adjust the flow rates of each portion individually to achieve desired temperature setpoints for more than two power cycle fluid locations.

38. The system according to any Embodiment 35 to 37 wherein the means to adjust the flow rates of the more than two portions of the primary heat transfer fluid total flow rate are incorporated into a multi-variable controller that compensates for interactions between the flow rates of the more than two portions of the primary heat transfer fluid and the power cycle fluid temperatures.

39. A control system, comprising: a) a primary heat transfer loop wherein the primary heat transfer loop comprises a primary heat transfer fluid having a total flow rate, a temperature and a pressure, a high value heat source, at least one heat transfer device to transfer heat from the high value heat source to the primary heat transfer fluid, a means to divide the said total flow rate into at least two portions each having a separate flow rate and a means to adjust the flow rates of the first portion and the second portion of the said at least two portions; b) an intermediate heat transfer loop wherein the intermediate heat transfer loop comprises an intermediate heat transfer fluid having a flow rate, at least one primary heat transfer device to transfer heat from at least a first portion of the primary heat transfer fluid to the intermediate heat transfer fluid, at least one heat primary transfer device to transfer heat from at least a second portion of the primary heat transfer fluid, a means to adjust the flow rate of the intermediate heat transfer fluid, and a means to measure or determine the temperature of the intermediate heat transfer fluid for at least a first location and a second location; c) a power cycle loop wherein the power cycle loop comprises a power cycle fluid having a flow rate, at least one of a circulating fan, blower, compressor and/or a pump, at least one turbine stage to convert the heat or enthalpy of the power cycle fluid to useful work or power, at least two power cycle heat transfer devices to transfer heat from the intermediate heat transfer fluid to increase the temperature or enthalpy of the power cycle fluid, at least one tertiary heat transfer device to reject residual heat from the power cycle fluid to an external system, and a means to measure or determine the temperature of the power cycle fluid for at least a first location and a second location; d) a sequence of the said at least two primary heat transfer devices and the at least two power cycle heat transfer devices to transfer heat from the primary heat transfer fluid to the power cycle fluid such that the intermediate heat transfer fluid is first increased in temperature by transferring at least some heat from the first portion of the primary heat transfer fluid to the intermediate heat transfer fluid, then the intermediate heat transfer fluid is reduced in temperature by transferring at least some heat to the power cycle fluid, then the intermediate heat transfer fluid is again increased in temperature by transferring at least some heat from the second portion of the primary heat transfer fluid and then the intermediate heat transfer fluid is again reduced in temperature by transferring at least some heat to the power cycle fluid; e) a pathway, pipe or conduit system configured to return the at least first and second portions of the primary heat transfer fluid to the high value heat source; f) a pathway, pipe or conduit system configured to direct at least a portion of the power cycle fluid to a turbine stage to generate useful work or power and direct that power cycle fluid to the tertiary heat exchange device; g) a pathway, pipe or conduit system configured to return the power cycle fluid from the tertiary heat exchange device to the said at least two power cycle heat transfer devices; h) a means or calculation system to determine a first temperature difference between the intermediate heat transfer fluid at a first and second location and a second temperature difference between the power cycle fluid at a first and second location locations; and i) a means to adjust the flow rate of the intermediate heat transfer fluid to achieve a desired temperature difference setpoint between the said first and second temperature differences.

40. The control system of Embodiment 39 wherein the temperature difference setpoint is adjusted based upon at least an operating parameter of the power plant comprising at least one of the intermediate heat transfer fluid flow rate, a primary heat transfer fluid flow rate, a power cycle fluid flow rate, a primary heat transfer fluid temperature, an intermediate heat transfer fluid temperature, a power cycle fluid temperature, the net power production and/or the gross power production.

41. A control system, comprising: a) a primary heat transfer loop wherein the primary heat transfer loop comprises a primary heat transfer fluid having a flow rate, a temperature and a pressure, a high value heat source and at least one heat transfer device to transfer heat from the high value heat source to the primary heat transfer fluid; b) an intermediate heat transfer loop wherein the intermediate heat transfer loop comprises an intermediate heat transfer fluid having a flow rate, at least one primary heat transfer device to transfer heat from at least a first portion of the primary heat transfer fluid to the intermediate heat transfer fluid and at least one heat primary transfer device to transfer heat from at least a second portion of the primary heat transfer fluid; c) a power cycle loop wherein the power cycle loop comprises a power cycle fluid having a flow rate, at least one of a circulating fan, blower, compressor and/or a pump, at least one turbine stage to convert the heat or enthalpy of the power cycle fluid to useful work or power, at least two power cycle heat transfer devices to transfer heat from the intermediate heat transfer fluid to increase the temperature or enthalpy of the power cycle fluid and at least one tertiary heat transfer device to reject residual heat from the power cycle fluid to an external system; d) a sequence of the said at least two primary heat transfer devices and the at least two power cycle heat transfer devices to transfer heat from the primary heat transfer fluid to the power cycle fluid such that the intermediate heat transfer fluid is first increased in temperature by transferring at least some heat from the first portion of the primary heat transfer fluid to the intermediate heat transfer fluid, then the intermediate heat transfer fluid is reduced in temperature by transferring at least some heat to the power cycle fluid, then the intermediate heat transfer fluid is again increased in temperature by transferring at least some heat from the second portion of the primary heat transfer fluid and then the intermediate heat transfer fluid is again reduced in temperature by transferring at least some heat to the power cycle fluid; e) a pathway, pipe or conduit system configured to return the at least first and second portions of the primary heat transfer fluid to the high value heat source; f) a pathway, pipe or conduit system configured to direct at least a portion of the power cycle fluid to a turbine stage to generate useful work or power and direct that power cycle fluid to the tertiary heat exchange device; g) a pathway, pipe or conduit system configured to return the power cycle fluid from the tertiary heat exchange device to the said at least two power cycle heat transfer devices; h) the turbine stage that comprises power cycle fluid extraction ports to extract at least a first portion of the power cycle fluid at a flow rate, pressure and temperature and at least a second portion of the power cycle fluid at a flow rate, another pressure and another temperature; i) an intermediate heat transfer fluid preheater that uses the first portion and the second portion of the extracted power cycle fluid to heat the intermediate heat transfer fluid and so cool the at least first and second portions of the power cycle fluid; and j) a means to adjust the flow rates of at least one of the first and second portion of the extracted power cycle fluid to maintain the temperature of the intermediate heat transfer fluid at or above a minimum temperature setpoint.

42. A control system, comprising: a) a primary heat transfer loop wherein the primary heat transfer loop comprises a primary heat transfer fluid having a flow rate, a temperature and a pressure, a high value heat source and at least one heat transfer device to transfer heat from the high value heat source to the primary heat transfer fluid; b) an intermediate heat transfer loop wherein the intermediate heat transfer loop comprises an intermediate heat transfer fluid having a flow rate, at least one primary heat transfer device to transfer heat from at least a first portion of the primary heat transfer fluid to the intermediate heat transfer fluid and at least one heat primary transfer device to transfer heat from at least a second portion of the primary heat transfer fluid; c) a power cycle loop wherein the power cycle loop comprises a power cycle fluid having a flow rate, at least one of a circulating fan, blower, compressor and/or a pump, at least one turbine stage to convert the heat or enthalpy of the power cycle fluid to useful work or power, at least two power cycle heat transfer devices to transfer heat from the intermediate heat transfer fluid to increase the temperature or enthalpy of the power cycle fluid and at least one tertiary heat transfer device to reject residual heat from the power cycle fluid to an external system; d) a sequence of the said at least two primary heat transfer devices and the at least two power cycle heat transfer devices to transfer heat from the primary heat transfer fluid to the power cycle fluid such that the intermediate heat transfer fluid is first increased in temperature by transferring at least some heat from the first portion of the primary heat transfer fluid to the intermediate heat transfer fluid, then the intermediate heat transfer fluid is reduced in temperature by transferring at least some heat to the power cycle fluid, then the intermediate heat transfer fluid is again increased in temperature by transferring at least some heat from the second portion of the primary heat transfer fluid and then the intermediate heat transfer fluid is again reduced in temperature by transferring at least some heat to the power cycle fluid; e) a pathway, pipe or conduit system configured to return the at least first and second portions of the primary heat transfer fluid to the high value heat source; f) a pathway, pipe or conduit system configured to direct at least a portion of the power cycle fluid to a turbine stage to generate useful work or power and direct that power cycle fluid to the tertiary heat exchange device; g) a pathway, pipe or conduit system configured to return the power cycle fluid from the tertiary heat exchange device to the said at least two power cycle heat transfer devices; h) an electrical generator mechanically connected to the turbine stage to generate electrical power such that the electrical power is transmitted to an electric grid that consumes the electrical power; i) a means to detect at least one of an instability of the electrical grid, an open breaker event and a turbine stage overspeed event thereby causing the turbine stage and electrical generator to respond by rapidly changing the generated load and so flow rate of the power cycle fluid; and j) a means to respond to the rapid change to the load of the turbine stage and electrical generator and the flow rate of the power cycle fluid by rapidly changing at least one of the intermediate heat transfer fluid flow rate and the primary heat transfer fluid flow rate in approximate proportion to at least one of the power cycle fluid flow rate and the turbine stage or electrical generator power.

43. A control system, comprising: a) a primary heat transfer loop wherein the primary heat transfer loop comprises a primary heat transfer fluid having a flow rate, a temperature and a pressure, a high value heat source and at least one heat transfer device to transfer heat from the high value heat source to the primary heat transfer fluid; b) an intermediate heat transfer loop wherein the intermediate heat transfer loop comprises an intermediate heat transfer fluid having a flow rate, at least one primary heat transfer device to transfer heat from at least a first portion of the primary heat transfer fluid to the intermediate heat transfer fluid and at least one heat primary transfer device to transfer heat from at least a second portion of the primary heat transfer fluid; c) a pathway, pipe or conduit system configured to return the at least first and second portions of the primary heat transfer fluid to the high value heat source; d) a power cycle loop that comprises a power cycle fluid having a flow rate, at least one of a circulating fan, blower, compressor and/or a pump; e) a heating device to heat at least a first portion of the power cycle fluid having a flow rate and temperature; f) an intermediate heat transfer fluid preheater using the at least a first portion of the power cycle fluid to heat the intermediate heat transfer fluid and cool the at least a first portion of the power cycle fluid; g) a pathway, pipe or conduit system configured to return the at least first portion of the power cycle fluid to the heating device; and h) a means to adjust the at least one of the flow rate, pressure and temperature of the at least a first portion of the power cycle fluid to maintain the temperature of the intermediate heat transfer fluid at or above a minimum temperature setpoint.

44. A method for generating power, comprising: a) heating a primary heat transfer fluid having a flow rate by circulating the primary heat transfer fluid to a high value heat source; b) dividing the primary heat transfer fluid into at least a first portion having a first flow rate and a second portion having a second flow rate; c) circulating an intermediate heat transfer fluid having a flow rate within an intermediate heat transfer loop; d) circulating a power cycle fluid having a flow rate and a high pressure within a power cycle loop; e) heating the intermediate heat transfer fluid by transferring heat from the first portion of the primary heat transfer fluid; f) heating at least a portion of the high-pressure power cycle fluid by transferring heat from the intermediate heat transfer fluid after the intermediate heat transfer fluid is heated by the first portion of the primary heat transfer fluid; g) introducing at least a portion of the high-pressure power cycle fluid to a first turbine stage after that portion has been heated by the intermediate heat transfer fluid and extracting the portion of the power cycle fluid from the turbine stage at a lower pressure such that useful work or power is generated; h) heating the intermediate heat transfer fluid by transferring heat from the second portion of the primary heat transfer fluid after the intermediate heat transfer fluid heats the high-pressure portion of the power cycle fluid; i) heating at least a portion of the lower-pressure power cycle fluid by transferring heat from the intermediate heat transfer fluid after the intermediate heat transfer fluid is heated by the second portion of the primary heat transfer fluid; j) introducing at least a portion of the lower-pressure power cycle fluid to a second turbine stage after that portion has been heated by the intermediate heat transfer fluid and extracting the portion of the power cycle fluid at a very-low-pressure such that useful work or power is generated; k) introducing the very-low-pressure power cycle fluid to a heat exchange device to reject residual heat to an external system; and l) re-pressurizing and recirculating the power cycle fluid by using a device that can include a pump, compressor or blower.

45. The method of Embodiment 44 further comprising cooling the intermediate heat transfer fluid by transferring heat to the power cycle fluid after it is re-pressurized thereby preheating the power cycle fluid.

46. The method of Embodiments 44 or 45 further comprising recirculating the intermediate heat transfer fluid.

47. The method according to any Embodiment 44 to 46 further comprising recirculating the primary heat transfer fluid.

48. The method according to any Embodiment 44 to 47 further comprising extracting at least two portions of the power cycle fluid from the first turbine stage and/or second turbine stage and directing them to an intermediate heat transfer fluid preheater thereby heating the intermediate heat transfer fluid and cooling the said at least two portions of the power cycle fluid.

49. The method according to any Embodiment 44 to 48 further comprising re-pressurizing and recirculating the said at least two portions of the power cycle fluid.

50. The method according to any Embodiment 44 to 49 wherein the intermediate heat transfer fluid is recirculated by a blower, compressor or fan.

51. The method according to any Embodiment 44 to 50 further comprising adjusting the flow rate of the intermediate heat transfer fluid by adjusting the position of a damper within the intermediate heat transfer loop, by adjusting the operating speed of the blower, compressor or fan and/or by adjusting the position, openness or angle of at least one of inlet guide vanes, stator vanes or rotating vanes of the blower, compressor or fan.

52. The method according to any Embodiment 44 to 51 wherein the intermediate heat transfer fluid is recirculated at least in part by differences in buoyancy of the intermediate heat transfer fluid within different legs or sections of the intermediate heat transfer loop.

53. The method according to any Embodiment 44 to 52 wherein the intermediate heat transfer fluid is at least in part recirculated by a blower, compressor or fan.

54. The method according to any Embodiment 44 to 53 further comprising adjusting the flow rate of the intermediate heat transfer fluid by adjusting the position of a damper within the intermediate heat transfer loop, by adjusting the operating speed of a blower, compressor or fan and/or by adjusting the position, openness or angle of at least one of inlet guide vanes, stator vanes or rotating vanes of a blower, compressor or fan.

55. The method according to any Embodiment 44 to 54 wherein the primary heat transfer fluid comprises a molten salt, heat transfer oil, hydrogen, inert gas, liquid metal or hydrocarbon fluid.

56. The method according to any Embodiment 44 to 55 wherein the intermediate heat transfer fluid comprises water, steam, air, any constituent of air or hydrocarbon fluid.

57. The method according to any Embodiment 44 to 56 wherein the power cycle fluid comprises water, steam, air, any constituent of air, super critical carbon dioxide or hydrocarbon fluid.

58. The method according to any Embodiment 44 to 57 further comprising measuring or determining the temperatures of the intermediate heat transfer fluid at two locations and measuring or determining the temperatures of the power cycle fluid at two locations.

59. The method according to any Embodiment 44 to 58 further comprising adjusting the flow rate of the intermediate heat transfer fluid at least in part based upon the temperatures of the intermediate heat transfer fluid and power cycle fluid.

60. The method according to any Embodiment 44 to 59 further comprising calculating the difference between the temperature drop between the two intermediate heat transfer fluid locations and the temperature rise between the two power cycle fluid locations and adjusting the flow rate of the intermediate heat transfer fluid until the said difference is approximately equal to a setpoint.

61. The method according to any Embodiment 44 to 60 wherein the setpoint is approximately equal to zero.

62. The method according to any Embodiment 44 to 61 wherein the setpoint is a fixed value selected between −50° C. to 50° C.

63. The method according to any Embodiment 44 to 62 further comprising adjusting the setpoint based at least in part on the flow rate of at least one of the primary heat transfer fluid, the intermediate heat transfer fluid and the power cycle fluid.

64. The method according to any Embodiment 44 to 63 wherein the external system comprises at least one of atmospheric air, a cooling tower, a process plant, and/or a district heating system.

65. The method according to any Embodiment 44 to 64 further comprising adjusting the flow rate of the intermediate heat transfer fluid in response to a rapid change of at least one of the flow rate of the power cycle fluid flow rate and the turbine stage useful work or power generation wherein such further adjusting is transitory and reverts after a period of time to the adjusting determined by Embodiment 60.

66. The method according to any Embodiment 44 to 65 further comprising measuring or determining the temperature of at least one power cycle fluid stream and further comprising adjusting the flow rate of at least one portion of the primary heat transfer fluid.

67. The method according to any Embodiment 44 to 66 further comprising adjusting the flow rate of the at least one portion of the primary heat transfer fluid until the temperature of at least one power cycle fluid stream is approximately equal to an at least one power cycle fluid setpoint temperature.

68. The method according to any Embodiment 44 to 67 further comprising measuring or determining the temperatures of at least two power cycle fluid streams and further comprising adjusting the flow rates of at least two portions of the primary heat transfer fluid.

69. The method according to any Embodiment 44 to 68 further comprising adjusting the flow rates of the portions of the primary heat transfer fluid using a multi-variable control system to adjust the flow rates concurrently until the temperatures of all power cycle fluid streams are approximately equal to the setpoint temperatures for each power cycle fluid stream.

70. The method according to any Embodiment 44 to 69 further comprising measuring or determining the pressure of the intermediate heat transfer loop for at least one location.

71. The method according to any Embodiment 44 to 70 wherein a means is provided to add or remove the intermediate heat transfer fluid from or to an external source or reservoir.

72. The method according to any Embodiment 44 to 71 further comprising adding or removing intermediate heat transfer fluid to or from the intermediate heat transfer loop until the said pressure is approximately equal to an intermediate heat transfer loop pressure setpoint.

73. The method according to any Embodiment 44 to 72 wherein the intermediate heat transfer loop comprises a blower, compressor or fan to circulate to intermediate heat transfer fluid, the intermediate heat transfer fluid is substantially ambient air and the intermediate heat transfer fluid is not substantially recirculated.

74. The method according to any Embodiment 44 to 73 wherein the intermediate heat transfer fluid is substantially ambient air and the intermediate heat transfer fluid is not substantially recirculated.

75. The method according to any Embodiment 44 to 74 wherein the primary heat transfer loop comprises a storage tank.

76. A method to control a power generation system, comprising: a) heating a primary heat transfer fluid having a flow rate by circulating the primary heat transfer fluid to a high value heat source; b) dividing the primary heat transfer fluid into at least a first portion having a first flow rate and a second portion having a second flow rate; c) circulating an intermediate heat transfer fluid having a flow rate within an intermediate heat transfer loop; d) circulating a power cycle fluid having a flow rate and a high pressure within a power cycle loop; e) heating the intermediate heat transfer fluid by transferring heat from the first portion of the primary heat transfer fluid; f) heating at least a portion of the high-pressure power cycle fluid to a first temperature setpoint by transferring heat from the intermediate heat transfer fluid after the intermediate heat transfer fluid is heated by the first portion of the primary heat transfer fluid; g) introducing at least a portion of the high-pressure power cycle fluid to a first turbine stage after that portion has been heated by the intermediate heat transfer fluid and extracting the portion of the power cycle fluid from the turbine stage at a lower pressure such that useful work or power is generated; h) heating the intermediate heat transfer fluid by transferring heat from the second portion of the primary heat transfer fluid after the intermediate heat transfer fluid heats the high-pressure portion of the power cycle fluid; i) heating at least a portion of the lower-pressure power cycle fluid to a second temperature setpoint by transferring heat from the intermediate heat transfer fluid after the intermediate heat transfer fluid is heated by the second portion of the primary heat transfer fluid; j) introducing at least a portion of the lower-pressure power cycle fluid to a second turbine stage after that portion has been heated by the intermediate heat transfer fluid and extracting the portion of the power cycle fluid at a very-low-pressure such that useful work or power is generated; k) introducing the very-low-pressure power cycle fluid to a heat exchange device to reject residual heat to an external system; l) re-pressurizing and recirculating the power cycle fluid by using a device that can include a pump, compressor or blower; m) adjusting the flow rate of the first portion of the primary heat transfer fluid to achieve a first temperature setpoint condition at one power cycle fluid locations; and n) adjusting the flow rate of the second portion of the primary heat transfer fluid to achieve a second temperature setpoint condition at another power cycle fluid location.

77. The method of Embodiment 76 further adjusting the flow rates of the first and second portions of the primary heat transfer fluid using a multi-variable controller that compensates for interactions between the flow rates of the first and second portions of the primary heat transfer fluid and the power cycle fluid temperatures.

78. The method of Embodiments 76 or 77 wherein the primary heat transfer fluid flow rate is divided into more than two portions and further comprising adjusting the flow rates of each portion individually to achieve desired temperature setpoints for more than two power cycle fluid locations.

79. The method according to any Embodiment 76 to 78 further comprising adjusting the flow rates of the more than two portions of the primary heat transfer fluid total flow rate using a multi-variable controller that compensates for interactions between the flow rates of the more than two portions of the primary heat transfer fluid and the power cycle fluid temperatures.

80. A method to control a power generations system, comprising: a) heating a primary heat transfer fluid having a flow rate by circulating the primary heat transfer fluid to a high value heat source; b) dividing the primary heat transfer fluid into at least a first portion having a first flow rate and a second portion having a second flow rate; c) circulating an intermediate heat transfer fluid having a flow rate within an intermediate heat transfer loop; d) circulating a power cycle fluid having a flow rate and a high pressure within a power cycle loop; e) heating the intermediate heat transfer fluid by transferring heat from the first portion of the primary heat transfer fluid; f) heating at least a portion of the high-pressure power cycle fluid to a first temperature setpoint by transferring heat from the intermediate heat transfer fluid after the intermediate heat transfer fluid is heated by the first portion of the primary heat transfer fluid; g) introducing at least a portion of the high-pressure power cycle fluid to a first turbine stage after that portion has been heated by the intermediate heat transfer fluid and extracting the portion of the power cycle fluid from the turbine stage at a lower pressure such that useful work or power is generated; h) heating the intermediate heat transfer fluid by transferring heat from the second portion of the primary heat transfer fluid after the intermediate heat transfer fluid heats the high-pressure portion of the power cycle fluid; i) heating at least a portion of the lower-pressure power cycle fluid to a second temperature setpoint by transferring heat from the intermediate heat transfer fluid after the intermediate heat transfer fluid is heated by the second portion of the primary heat transfer fluid; j) introducing at least a portion of the lower-pressure power cycle fluid to a second turbine stage after that portion has been heated by the intermediate heat transfer fluid and extracting the portion of the power cycle fluid at a very-low-pressure such that useful work or power is generated; k) introducing the very-low-pressure power cycle fluid to a heat exchange device to reject residual heat to an external system; l) re-pressurizing and recirculating the power cycle fluid by using a device that can include a pump, compressor or blower; m) calculating or determining a first temperature difference between the intermediate heat transfer fluid at a first and second location and a second temperature difference between the power cycle fluid at a first and second location locations; and n) adjusting the flow rate of the intermediate heat transfer fluid to achieve a desired temperature difference setpoint between the said first and second temperature differences.

81. The method of Embodiment 80 further comprising adjusting the temperature difference setpoint based upon at least an operating parameter of the power plant comprising at least one of the intermediate heat transfer fluid flow rate, a primary heat transfer fluid flow rate, a power cycle fluid flow rate, a primary heat transfer fluid temperature, an intermediate heat transfer fluid temperature, a power cycle fluid temperature, the net power production and the gross power production.

82. A method to control a power generations system, comprising: a) heating a primary heat transfer fluid having a flow rate by circulating the primary heat transfer fluid to a high value heat source; b) dividing the primary heat transfer fluid into at least a first portion having a first flow rate and a second portion having a second flow rate; c) circulating an intermediate heat transfer fluid having a flow rate within an intermediate heat transfer loop; d) circulating a power cycle fluid having a flow rate and a high pressure within a power cycle loop; e) heating the intermediate heat transfer fluid by transferring heat from the first portion of the primary heat transfer fluid; f) heating at least a portion of the high-pressure power cycle fluid to a first temperature setpoint by transferring heat from the intermediate heat transfer fluid after the intermediate heat transfer fluid is heated by the first portion of the primary heat transfer fluid; g) introducing at least a portion of the high-pressure power cycle fluid to a first turbine stage after that portion has been heated by the intermediate heat transfer fluid and extracting the portion of the power cycle fluid from the turbine stage at a lower pressure such that useful work or power is generated; h) heating the intermediate heat transfer fluid by transferring heat from the second portion of the primary heat transfer fluid after the intermediate heat transfer fluid heats the high-pressure portion of the power cycle fluid; i) heating at least a portion of the lower-pressure power cycle fluid to a second temperature setpoint by transferring heat from the intermediate heat transfer fluid after the intermediate heat transfer fluid is heated by the second portion of the primary heat transfer fluid; j) introducing at least a portion of the lower-pressure power cycle fluid to a second turbine stage after that portion has been heated by the intermediate heat transfer fluid and extracting the portion of the power cycle fluid at a very-low-pressure such that useful work or power is generated; k) introducing the very-low-pressure power cycle fluid to a heat exchange device to reject residual heat to an external system; l) re-pressurizing and recirculating the power cycle fluid by using a device that can include a pump, compressor or blower; m) extracting at least a first portion and a second portion of the power cycle fluid from the turbine stage; n) heating the intermediate heat transfer fluid with a preheater that uses the first portion and the second portion of the extracted power cycle fluid to heat the intermediate heat transfer fluid and so cool the at least first and second portions of the power cycle fluid; and o) adjusting the flow rates of at least one of the first and second portion of the extracted power cycle fluid to maintain the temperature of the intermediate heat transfer fluid at or above a minimum temperature setpoint.

83. A method to control a power generation system, comprising: a) heating a primary heat transfer fluid having a flow rate by circulating the primary heat transfer fluid to a high value heat source; b) dividing the primary heat transfer fluid into at least a first portion having a first flow rate and a second portion having a second flow rate; c) circulating an intermediate heat transfer fluid having a flow rate within an intermediate heat transfer loop; d) circulating a power cycle fluid having a flow rate and a high pressure within a power cycle loop; e) heating the intermediate heat transfer fluid by transferring heat from the first portion of the primary heat transfer fluid; f) heating at least a portion of the high-pressure power cycle fluid to a first temperature setpoint by transferring heat from the intermediate heat transfer fluid after the intermediate heat transfer fluid is heated by the first portion of the primary heat transfer fluid; g) introducing at least a portion of the high-pressure power cycle fluid to a first turbine stage after that portion has been heated by the intermediate heat transfer fluid and extracting the portion of the power cycle fluid from the turbine stage at a lower pressure such that useful work or power is generated; h) heating the intermediate heat transfer fluid by transferring heat from the second portion of the primary heat transfer fluid after the intermediate heat transfer fluid heats the high-pressure portion of the power cycle fluid; i) heating at least a portion of the lower-pressure power cycle fluid to a second temperature setpoint by transferring heat from the intermediate heat transfer fluid after the intermediate heat transfer fluid is heated by the second portion of the primary heat transfer fluid; j) introducing at least a portion of the lower-pressure power cycle fluid to a second turbine stage after that portion has been heated by the intermediate heat transfer fluid and extracting the portion of the power cycle fluid at a very-low-pressure such that useful work or power is generated; k) introducing the very-low-pressure power cycle fluid to a heat exchange device to reject residual heat to an external system; l) re-pressurizing and recirculating the power cycle fluid by using a device that can include a pump, compressor or blower; m) converting the useful work or power of the turbine stage to electrical energy and further transmitting that electrical energy to an electrical grid that consumes the electrical power; n) detecting at least one of an instability of the electrical grid, an open breaker event and a turbine stage overspeed event and further causing the turbine stage and electrical generator to respond by rapidly changing the generated load and so flow rate of the power cycle fluid; and o) responding to the rapid change to the generated load of the turbine stage and electrical generator and the flow rate of the power cycle fluid by rapidly changing at least one of the intermediate heat transfer fluid flow rate and the primary heat transfer fluid flow rate in approximate proportion to at least one of the power cycle fluid flow rate and the turbine stage or electrical generator power.

84. A method to control a power generating system, comprising: a) heating a primary heat transfer fluid having a flow rate by circulating the primary heat transfer fluid to a high value heat source; b) dividing the primary heat transfer fluid into at least a first portion having a first flow rate and a second portion having a second flow rate; c) circulating an intermediate heat transfer fluid having a flow rate within an intermediate heat transfer loop; d) circulating a power cycle fluid having a flow rate within a power cycle loop; e) heating at least a first portion of the power cycle fluid having a flow rate, pressure and temperature; f) heating the intermediate heat transfer fluid with a preheater using the at least a first portion of the power cycle fluid and further cooling the at least a first portion of the power cycle fluid; g) recirculating the at least first portion of the power cycle fluid to the heating device; and h) adjusting at least one of the flow rate, pressure and/or the temperature of the at least a first portion of the power cycle fluid and further maintaining the temperature of the intermediate heat transfer fluid at or above a minimum temperature setpoint.

85. A system for generating power, comprising: a primary heat transfer loop comprising a primary heat transfer fluid having a flow rate, a temperature and a pressure, a high value heat source and at least one heat transfer device to transfer heat from the high value heat source to the primary heat transfer fluid; an intermediate heat transfer loop comprising an intermediate heat transfer fluid having a flow rate, at least a first primary heat transfer device to transfer heat from at least a first portion of the primary heat transfer fluid to the intermediate heat transfer fluid and at least a second heat primary transfer device to transfer heat from at least a second portion of the primary heat transfer fluid to the intermediate heat transfer fluid; a power cycle loop comprising a power cycle fluid having a flow rate, at least one compression device, at least one turbine stage to convert the heat or enthalpy of the power cycle fluid to useful work or power, at least two power cycle heat transfer devices to transfer heat from the intermediate heat transfer fluid to increase the temperature or enthalpy of the power cycle fluid and at least one tertiary heat transfer device to reject residual heat from the power cycle fluid to an external system; a sequence of the said at least a first and second primary heat transfer devices and the at least two power cycle heat transfer devices to transfer heat from the primary heat transfer fluid to the power cycle fluid such that the intermediate heat transfer fluid is first increased in temperature by transferring at least some heat from the first portion of the primary heat transfer fluid to the intermediate heat transfer fluid, then the intermediate heat transfer fluid is reduced in temperature by transferring at least some heat to the power cycle fluid, then the intermediate heat transfer fluid is again increased in temperature by transferring at least some heat from the second portion of the primary heat transfer fluid and then the intermediate heat transfer fluid is again reduced in temperature by transferring at least some heat to the power cycle fluid; a pathway, pipe or conduit system configured to return the at least first and second portions of the primary heat transfer fluid to the high value heat source; a pathway, pipe or conduit system configured to direct at least a portion of the power cycle fluid to a turbine stage to generate useful work or power and direct that power cycle fluid to the tertiary heat exchange device; a pathway, pipe or conduit system configured to extract at least a portion of the power cycle fluid directed to a turbine stage and to use that extracted portion of the power cycle fluid to increase the temperature of the intermediate heat transfer fluid; and a pathway, pipe or conduit system configured to return the power cycle fluid from the tertiary heat exchange device and the extracted portion of the power cycle fluid to the at least one compression device.

86. The system of Embodiment 85, wherein the primary heat transfer fluid comprises a molten salt, heat transfer oil, hydrogen, an inert gas, liquid metal or a hydrocarbon fluid.

87. The system of Embodiments 85 or 86, wherein the intermediate heat transfer fluid comprises water, steam, air, any constituent of air or a hydrocarbon fluid.

88. The system according to any Embodiment 85 to 87, wherein the power cycle fluid comprises, water, steam, air, humidified air, any constituent of air including but not limited to nitrogen, argon, helium and carbon dioxide and/or a hydrocarbon fluid.

89. The system according to any Embodiment 85 to 88, wherein the intermediate heat transfer fluid is recirculated.

90. The system according to any Embodiment 85 to 89, wherein the intermediate heat transfer loop comprises a blower, compressor or fan to recirculate the intermediate heat transfer fluid.

91. The system according to any Embodiment 85 to 90, wherein the blower, compressor or fan comprises an adjustable operating speed.

92. The system according to any Embodiment 85 to 91, wherein the blower, compressor or fan comprises adjustable inlet guide vanes, adjustable stator vanes or adjustable rotating blades.

93. The system according to any Embodiment 85 to 92, wherein the intermediate heat transfer loop comprises a damper configured to allow adjustment of the flow rate of the intermediate heat transfer fluid.

94. The system according to any Embodiment 85 to 93, wherein the intermediate heat transfer loop is arranged with hot and cold vertical legs or sections configured to at least cause some natural circulation of the intermediate heat transfer fluid.

95. The system according to any Embodiment 85 to 94, wherein the flow rate of the intermediate heat transfer fluid is adjusted by at least one of: changing the operating speed; changing the position of the inlet guide vanes; changing the position of the stator vanes; changing the position of the rotating blades of the blower, compressor or fan; and changing the position of the damper.

TABLE 1

Sample Energy Balance and Stream Summary for FIG. 9

| PCF Inlet Temperature | 550° C. | 1st Reheat Temperature | 550° C. |
|---|---|---|---|
| 2nd Reheat Temperature | 550° C. | HP Turbine Inlet Pressure | 300 bar |
| Overall Cycle Efficiency | 45.19% | Assumed Heat Loss | 1.0% |

Energy Streams

| Molten Salt Including Heat Loss | 331.9 MW | Gross Turbine Power | 161.3 MW |
|---|---|---|---|
| Cooling Water Heat Rejection | 173.9 MW | BFW Pump Power | 4.4 MW |
| EGR Blower Power | 2.2 MW | Other House Loads | 4.8 MW |
| Net Power | 150.0 MW | | |

| Stream No. (—) | Description (—) | Composition (—) | Frac Vap. (—) | Temperature (° C.) | Pressure (bara) | Mass Flow Rate (Tonne/hr) | Heat Flow (MW) |
|---|---|---|---|---|---|---|---|
| 101 | Molten Salt ex SubSystem 1 | Molten Salt | 0.000 | 590.0 | 10.00 | 5098.3 | −5111.9 |
| 102 | PHTF to Coil 161 | Molten Salt | 0.000 | 590.0 | 10.00 | 2177.2 | −2183.0 |
| 103 | PHTF to Coil 163 | Molten Salt | 0.000 | 590.0 | 10.00 | 1216.5 | −1219.8 |
| 104 | PHTF to Coil 165 | Molten Salt | 0.000 | 590.0 | 10.00 | 872.6 | −874.9 |
| 105 | PHTF to Coil 167 | Molten Salt | 0.000 | 590.0 | 10.00 | 832.0 | −834.2 |
| 107 | PHTF ex Coil 161 | Molten Salt | 0.000 | 490.0 | 9.00 | 2177.2 | −2325.8 |
| 108 | PHTF ex Coil 163 | Molten Salt | 0.000 | 490.0 | 9.00 | 1216.5 | −1299.5 |
| 109 | PHTF ex Coil 165 | Molten Salt | 0.000 | 500.0 | 9.00 | 872.6 | −926.5 |
| 110 | PHTF ex Coil 167 | Molten Salt | 0.000 | 490.0 | 9.00 | 832.0 | −888.7 |
| 112 | Molten Salt to SubSystem 1 | Molten Salt | 0.000 | 491.7 | 9.00 | 5098.3 | −5440.5 |
| 120 | IHTF to Preheater 910 | Dry Air | 1.000 | 86.7 | 1.30 | 1738.8 | 28.0 |

TABLE 1-continued

Sample Energy Balance and Stream Summary for FIG. 9

| | | | | | | | |
|---|---|---|---|---|---|---|---|
| 121 | IHTF to Coil 161 | Dry Air | 1.000 | 298.2 | 1.30 | 1738.8 | 134.2 |
| 122 | IHTF to Coil 162 | Dry Air | 1.000 | 570.0 | 1.29 | 1738.8 | 276.9 |
| 123 | IHTF to Coil 163 | Dry Air | 1.000 | 419.7 | 1.29 | 1738.8 | 197.2 |
| 124 | IHTF to Coil 164 | Dry Air | 1.000 | 570.0 | 1.28 | 1738.8 | 276.9 |
| 125 | IHTF to Coil 165 | Dry Air | 1.000 | 473.2 | 1.28 | 1738.8 | 225.3 |
| 126 | IHTF to Coil 166 | Dry Air | 1.000 | 570.0 | 1.27 | 1738.8 | 276.9 |
| 127 | IHTF to Coil 167 | Dry Air | 1.000 | 467.6 | 1.27 | 1738.8 | 222.4 |
| 128 | IHTF to Coil 168 | Dry Air | 1.000 | 570.0 | 1.26 | 1738.8 | 276.9 |
| 129 | IHTF to Coil 169 | Dry Air | 1.000 | 505.2 | 1.26 | 1738.8 | 242.3 |
| 132 | IHTF to Separator 4 | Dry Air | 1.000 | 82.3 | 1.25 | 1738.8 | 25.8 |
| 133 | IHTF to Valve 6 | Dry Air | 1.000 | 82.3 | 1.25 | 1738.8 | 25.8 |
| 135 | IHTF Condensate to Pump 5 | H2O | 0.000 | 82.3 | 1.25 | 0.0 | 0.0 |
| 136 | IHTF Condensate ex Pump 5 | H2O | 1.000 | 29.6 | 1.30 | 0.0 | 0.0 |
| 150 | PCF to Pump 11 | H2O | 0.000 | 35.8 | 0.06 | 277.3 | −1215.1 |
| 151 | PCF to Coil 169 | H2O | 0.000 | 59.2 | 302.50 | 416.9 | −1812.6 |
| 152 | PCF to Coil 162 | H2O | 0.000 | 399.7 | 302.00 | 416.9 | −1596.1 |
| 155 | PCF to Coil 164 | H2O | 1.000 | 451.4 | 301.50 | 416.9 | −1516.4 |
| 156 | PCF to HP Turbine | H2O | 1.000 | 550.0 | 300.00 | 416.9 | −1464.8 |
| 158 | PCF to Coil 166 | H2O | 1.000 | 350.0 | 85.50 | 362.5 | −1304.0 |
| 159 | PCF to MP Turbine | H2O | 1.000 | 550.0 | 85.00 | 362.5 | −1249.5 |
| 161 | PCF to Coil 168 | H2O | 1.000 | 350.0 | 22.28 | 282.0 | −1001.8 |
| 162 | PCF to LP Turbine | H2O | 1.000 | 550.0 | 21.78 | 282.0 | −967.2 |
| 164 | PCF to Condenser 12 | H2O | 0.934 | 35.8 | 0.06 | 277.3 | −1041.2 |
| 180 | CWS to Condenser 12 | H2O | 0.000 | 19.2 | 4.00 | 12850.2 | −56558.5 |
| 181 | CWR ex Condenser 12 | H2O | 0.000 | 30.8 | 3.50 | 12850.2 | −56384.7 |
| 801 | 1st PCF Extraction | H2O | 1.000 | 452.0 | 170.00 | 31.1 | −110.6 |
| 802 | 2nd PCF Extraction | H2O | 1.000 | 350.0 | 85.35 | 23.3 | −83.9 |
| 803 | 3rd PCF Extraction | H2O | 1.000 | 448.9 | 45.00 | 29.2 | −102.1 |
| 804 | 4th PCF Extraction | H2O | 1.000 | 350.0 | 22.24 | 51.3 | −182.4 |
| 805 | 5th PCF Extraction | H2O | 1.000 | 311.3 | 4.00 | 4.7 | −16.6 |
| 820 | PCF Extraction Return | H2O | 0.000 | 101.2 | 302.50 | 139.6 | −600.3 |

TABLE 2

Sample Energy Balance and Stream Summary for FIG. 14

| | | | |
|---|---|---|---|
| HP Turbine Inlet Temperature | 520° C. | Reheat Temperature | 520° C. |
| HP Turbine Inlet Pressure | 144 bar | Assumed Heat Loss | 1.0% |
| Overall Cycle Efficiency | 40.63% | | |

Energy Streams

| | | | |
|---|---|---|---|
| Molten Salt Including Heat Loss | 369.2 MW | Gross Turbine Power | 159.1 MW |
| Cooling Water Heat Rejection | 211. MW | BFW Pump Power | 2.5 MW |
| EGR Blower Power | 1.9 MW | Other House Loads | 4.7 MW |
| Net Power | 150.0 MW | | |

| Stream No. (—) | Description (—) | Composition (—) | Frac Vap. (—) | Temperature (° C.) | Pressure (bara) | Mass Flow Rate (Tonne/hr) | Heat Flow (MW) |
|---|---|---|---|---|---|---|---|
| 101 | PHTF ex Sub System 1 | Molten Salt | 0.000 | 560.0 | 10.00 | 4176.6 | −1189.0 |
| 102 | PHTF to Coil 161 | Molten Salt | 0.000 | 560.0 | 10.00 | 1391.9 | −396.2 |
| 103 | PHTF to Coil 163 | Molten Salt | 0.000 | 560.0 | 10.00 | 1392.4 | −396.4 |
| 104 | PHTF to Coil 165 | Molten Salt | 0.000 | 560.0 | 10.00 | 1392.3 | −396.4 |
| 107 | PHTF ex Coil 161 | Molten Salt | 0.000 | 298.3 | 9.00 | 1391.9 | −550.2 |
| 108 | PHTF ex Coil 163 | Molten Salt | 0.000 | 381.3 | 9.00 | 1392.4 | −502.0 |
| 109 | PHTF ex Coil 165 | Molten Salt | 0.000 | 380.8 | 9.00 | 1392.3 | −502.3 |
| 112 | PHTF to Sub System 1 | Molten Salt | 0.000 | 353.5 | 9.00 | 4176.6 | −1554.5 |
| 120 | IHTF to Preheater 910 | Dry Air | 1.000 | 75.2 | 1.30 | 1942.0 | 24.9 |
| 121 | IHTF to Coil 161 | Dry Air | 1.000 | 276.4 | 1.29 | 1942.0 | 137.4 |
| 122 | IHTF to Coil 162 | Dry Air | 1.000 | 540.0 | 1.29 | 1942.0 | 291.3 |
| 123 | IHTF to Coil 163 | Dry Air | 1.000 | 360.5 | 1.29 | 1942.0 | 185.7 |
| 124 | IHTF to Coil 164 | Dry Air | 1.000 | 540.0 | 1.28 | 1942.0 | 291.3 |
| 125 | IHTF to Coil 165 | Dry Air | 1.000 | 359.9 | 1.28 | 1942.0 | 185.4 |
| 126 | IHTF to Coil 166 | Dry Air | 1.000 | 540.0 | 1.27 | 1942.0 | 291.3 |
| 127 | IHTF to Coil 167 | Dry Air | 1.000 | 465.0 | 1.26 | 1942.0 | 246.8 |
| 132 | IHTF to Separator 4 | Dry Air | 1.000 | 71.8 | 1.26 | 1942.0 | 23.1 |
| 133 | IHTF to Valve 6 | Dry Air | 1.000 | 71.8 | 1.26 | 1942.0 | 23.1 |
| 134 | IHTF to Blower 7 | Dry Air | 1.000 | 71.8 | 1.26 | 1942.0 | 23.1 |
| 150 | PCF to Pump 11 | H2O | 0.000 | 35.8 | 0.06 | 350.8 | −1537.4 |
| 151 | PCF to Coil 167 | H2O | 0.000 | 51.8 | 147.40 | 498.3 | −2172.4 |
| 152 | PCF to Coil 162 | H2O | 0.241 | 340.5 | 146.90 | 498.3 | −1948.6 |
| 155 | PCF to Coil 164 | H2O | 0.984 | 340.2 | 146.40 | 498.3 | −1843.0 |

TABLE 2-continued

Sample Energy Balance and Stream Summary for FIG. 14

| | | | | | | | |
|---|---|---|---|---|---|---|---|
| 156 | PCF to HP Turbine | H2O | 1.000 | 520.0 | 144.00 | 498.3 | −1737.1 |
| 158 | PCF to Coil 66 | H2O | 1.000 | 334.2 | 41.00 | 363.7 | −1300.5 |
| 162 | PCF to LP Turbine | H2O | 1.000 | 520.0 | 37.72 | 363.7 | −1256.0 |
| 164 | PCF to Condenser 12 | H2O | 0.895 | 35.8 | 0.06 | 350.8 | −1326.4 |
| 180 | CWS to Condenser 12 | H2O | 0.000 | 19.2 | 4.00 | 15588.6 | −68611.2 |
| 181 | CWR ex Condenser 12 | H2O | 0.000 | 30.8 | 3.50 | 15588.6 | −68400.2 |
| 801 | 1st PCF Extract | H2O | 1.000 | 417.1 | 75.00 | 59.4 | −209.9 |
| 802 | 2nd PCF Extract | H2O | 1.000 | 334.2 | 38.60 | 75.2 | −268.7 |
| 803 | 3rd PCF Extract | H2O | 1.000 | 229.0 | 4.00 | 12.9 | −46.5 |
| 820 | PCF Extract Return | H2O | 0.000 | 87.3 | 147.40 | 147.4 | −636.7 |

TABLE 3

Sample Energy Balance and Stream Summary for FIG. 19

| | | | |
|---|---|---|---|
| HP Turbine Inlet Temperature | 520° C. | Reheat Temperature | 520° C. |
| HP Turbine Inlet Pressure | 144 bar | Assumed Heat Loss | 1.0% |
| Overall Cycle Efficiency | 41.01% | | |

Energy Streams

| | | | |
|---|---|---|---|
| Molten Salt Including Heat Loss | 365.8 MW | Gross Turbine Power | 159. MW |
| Cooling Water Heat Rejection | 207.5 MW | BFW Pump Power | 2.5 MW |
| EGR Blower Power | 1.8 MW | Other House Loads | 4.7 MW |
| Net Power | 150.0 MW | | |

| Stream No. (—) | Description (—) | Composition (—) | Frac Vap. (—) | Temperature (° C.) | Pressure (bara) | Mass Flow Rate (Tonne/hr) | Heat Flow (MW) |
|---|---|---|---|---|---|---|---|
| 101 | PHTF ex SubSystem 1 | Molten Salt | 0.000 | 560.0 | 10.00 | 4204.0 | −1196.8 |
| 102 | PHTF to Coil 161 | Molten Salt | 0.000 | 560.0 | 10.00 | 1408.1 | −400.9 |
| 103 | PHTF to Coil 163 | Molten Salt | 0.000 | 560.0 | 10.00 | 1397.4 | −397.8 |
| 104 | PHTF to Coil 165 | Molten Salt | 0.000 | 560.0 | 10.00 | 1398.5 | −398.1 |
| 107 | PHTF ex Coil 161 | Molten Salt | 0.000 | 304.0 | 9.00 | 1408.1 | −553.2 |
| 108 | PHTF ex Coil 163 | Molten Salt | 0.000 | 380.0 | 9.00 | 1397.4 | −504.6 |
| 109 | PHTF ex Coil 165 | Molten Salt | 0.000 | 386.6 | 9.00 | 1398.5 | −501.1 |
| 112 | PHTF to SubSystem 1 | Molten Salt | 0.000 | 356.7 | 9.00 | 4204.0 | −1558.9 |
| 120 | IHTF to SubSystem 910 | Dry Air | 1.000 | 75.8 | 1.30 | 1958.3 | 25.5 |
| 121 | IHTF to Coil 161 | Dry Air | 1.000 | 281.4 | 1.30 | 1958.3 | 141.4 |
| 122 | IHTF to Coil 162 | Dry Air | 1.000 | 540.0 | 1.29 | 1958.3 | 293.8 |
| 123 | IHTF to Coil 163 | Dry Air | 1.000 | 360.0 | 1.29 | 1958.3 | 187.0 |
| 124 | IHTF to Coil 164 | Dry Air | 1.000 | 540.0 | 1.28 | 1958.3 | 293.8 |
| 125 | IHTF to Coil 165 | Dry Air | 1.000 | 366.5 | 1.28 | 1958.3 | 190.8 |
| 126 | IHTF to Coil 166 | Dry Air | 1.000 | 540.0 | 1.27 | 1958.3 | 293.8 |
| 127 | IHTF to Coil 167 | Dry Air | 1.000 | 461.5 | 1.27 | 1958.3 | 246.8 |
| 128 | IHTF to Coil 168 | Dry Air | 1.000 | 402.6 | 1.26 | 1958.3 | 212.0 |
| 132 | IHTF to Separator 4 | Dry Air | 1.000 | 72.5 | 1.26 | 1958.3 | 23.6 |
| 133 | IHTF to Valve 6 | Dry Air | 1.000 | 72.5 | 1.26 | 1958.3 | 23.6 |
| 134 | IHTF to Blower 7 | Dry Air | 1.000 | 72.5 | 1.26 | 1958.3 | 23.6 |
| 150 | PCF to Pump 11 | H2O | 0.000 | 35.8 | 0.06 | 344.3 | −1508.8 |
| 151 | PCF to Coil 168 | H2O | 0.000 | 52.5 | 147.40 | 496.0 | −2162.2 |
| 152 | PCF ex Coil 168 | H2O | 0.000 | 340.5 | 146.90 | 496.0 | −1973.8 |
| 155 | PCF to Coil 164 | H2O | 1.000 | 339.9 | 145.90 | 496.0 | −1832.2 |
| 156 | PCF to HP Turbine | H2O | 1.000 | 520.0 | 144.00 | 496.0 | −1729.2 |
| 158 | PCF to Coil 166 | H2O | 1.000 | 334.2 | 41.00 | 383.7 | −1372.1 |
| 162 | PCF to LP Turbine | H2O | 1.000 | 520.0 | 37.72 | 383.7 | −1325.1 |
| 164 | PCF to Condenser 12 | H2O | 0.897 | 35.8 | 0.06 | 344.3 | −1301.4 |
| 180 | CWS to Condenser 12 | H2O | 0.000 | 19.2 | 4.00 | 15330.9 | −67477.0 |
| 181 | CWR ex Condenser 12 | H2O | 0.000 | 30.8 | 3.50 | 15330.9 | −67269.5 |
| 801 | 1st PCF Extraction | H2O | 1.000 | 417.1 | 75.00 | 49.2 | −174.1 |
| 802 | 2nd PCF Extraction | H2O | 1.000 | 334.2 | 41.00 | 63.0 | −225.4 |
| 803 | 3rd PCF Extraction | H2O | 1.000 | 320.9 | 9.00 | 39.4 | −140.4 |
| 820 | PCF Extraction Return | H2O | 0.000 | 87.8 | 147.40 | 151.7 | −655.0 |
| 2053 | PCF to Evaporator 2080 | H2O | 0.000 | 340.5 | 146.90 | 122.9 | −489.3 |
| 2054 | PCF to Evaporator 2081 | H2O | 0.000 | 340.5 | 146.90 | 373.1 | −1484.6 |
| 2055 | PCF ex Evaporator 2080 | H2O | 1.000 | 339.9 | 145.90 | 122.9 | −454.1 |
| 2056 | PCF ex Evaporator 2081 | H2O | 1.000 | 339.9 | 145.90 | 373.1 | −1378.0 |

TABLE 4

Sample Energy Balance and Stream Summary for FIG. 20

| | | | |
|---|---|---|---|
| PCF Inlet Temperature | 550° C. | 1st Reheat Temperature | 550° C. |
| 2nd Reheat Temperature | 550° C. | HP Turbine Inlet Pressure | 300 bar |
| Overall Cycle Efficiency | 44.90% | Assumed Heat Loss | 1.0% |

Energy Streams

| | | | |
|---|---|---|---|
| Molten Salt Including Heat Loss | 334.1 MW | Gross Turbine Power | 161.8 MW |
| Cooling Water Heat Rejection | 176. MW | BFW Pump Power | 4.4 MW |
| EGR Blower Power | 2.6 MW | Other House Loads | 4.8 MW |
| Net Power | 150.0 MW | | |

| Stream No. (—) | Description (—) | Composition (—) | Frac Vap. (—) | Temperature (° C.) | Pressure (bara) | Mass Flow Rate (Tonne/hr) | Heat Flow (MW) |
|---|---|---|---|---|---|---|---|
| 101 | PHTF ex Sub System1 | Molten Salt | 0.000 | 600.0 | 10.00 | 7722.0 | −2065.6 |
| 102 | PHTF to Coil 161 | Molten Salt | 0.000 | 600.0 | 10.00 | 3686.7 | −986.2 |
| 103 | PHTF to Coil 164 | Molten Salt | 0.000 | 600.0 | 10.00 | 2008.2 | −537.2 |
| 104 | PHTF to Coil 167 | Molten Salt | 0.000 | 600.0 | 10.00 | 2027.2 | −542.3 |
| 107 | PHTF ex Coil 161 | Molten Salt | 0.000 | 319.9 | 9.00 | 3686.7 | −1144.1 |
| 108 | PHTF ex Coil 164 | Molten Salt | 0.000 | 454.4 | 9.00 | 2008.2 | −623.2 |
| 109 | PHTF ex Coil 167 | Molten Salt | 0.000 | 454.3 | 9.00 | 2027.2 | −629.1 |
| 112 | PHTF to Sub System 1 | Molten Salt | 0.000 | 408.7 | 9.00 | 7722.0 | −2396.4 |
| 120 | IHTF to Preheater 910 | Dry Air | 1.000 | 114.9 | 1.30 | 1940.1 | 46.7 |
| 121 | IHTF to Coil 161 | Dry Air | 1.000 | 300.6 | 1.30 | 1940.1 | 151.1 |
| 122 | IHTF to Coil 162 | Dry Air | 1.000 | 580.0 | 1.29 | 1940.1 | 309.0 |
| 123 | IHTF to Coil 163 | Dry Air | 1.000 | 441.6 | 1.29 | 1940.1 | 238.0 |
| 124 | IHTF to Coil 164 | Dry Air | 1.000 | 434.4 | 1.28 | 1940.1 | 223.0 |
| 125 | IHTF to Coil 165 | Dry Air | 1.000 | 580.0 | 1.28 | 1940.1 | 309.0 |
| 126 | IHTF to Coil 166 | Dry Air | 1.000 | 488.3 | 1.27 | 1940.1 | 254.3 |
| 127 | IHTF to Coil 167 | Dry Air | 1.000 | 434.3 | 1.27 | 1940.1 | 222.2 |
| 128 | IHTF to Coil 168 | Dry Air | 1.000 | 570.0 | 1.26 | 1940.1 | 309.0 |
| 129 | IHTF to Coil 169 | Dry Air | 1.000 | 507.2 | 1.26 | 1940.1 | 271.5 |
| 132 | IHTF to Separator 4 | Dry Air | 1.000 | 110.2 | 1.25 | 1940.1 | 44.1 |
| 133 | IHTF to Valve 6 | Dry Air | 1.000 | 110.2 | 1.25 | 1940.1 | 44.1 |
| 134 | IHTF to Blower 7 | Dry Air | 1.000 | 110.2 | 1.25 | 1940.1 | 44.1 |
| 135 | IHTF Condensate to Pumps | H2O | 0.000 | 110.2 | 1.25 | 0.0 | 0.0 |
| 136 | IHTF Condensate ex Pumps | H2O | 1.000 | 29.6 | 1.30 | 0.0 | 0.0 |
| 150 | PCF to Pump 11 | H2O | 0.000 | 35.8 | 0.06 | 277.0 | −1213.8 |
| 151 | PCF to Coil 169 | H2O | 0.000 | 69.5 | 302.50 | 420.0 | −1821.1 |
| 152 | PCF ex Coil 169 | H2O | 1.000 | 404.8 | 302.00 | 420.0 | −1593.7 |
| 155 | PCF to Coil 162 | H2O | 1.000 | 421.6 | 301.00 | 420.0 | −1546.5 |
| 156 | PCF to HP Turbine | H2O | 1.000 | 550.0 | 300.00 | 420.0 | −1475.5 |
| 158 | PCF to Coil 165 | H2O | 1.000 | 340.0 | 79.06 | 349.5 | −1258.7 |
| 159 | PCF to MP Turbine | H2O | 1.000 | 550.0 | 78.56 | 349.5 | −1204.1 |
| 161 | PCF to Coil 168 | H2O | 1.000 | 340.0 | 18.99 | 292.7 | −1041.1 |
| 162 | PCF to LP Turbine | H2O | 1.000 | 550.0 | 18.49 | 292.7 | −1003.6 |
| 164 | PCF to Condenser | H2O | 0.946 | 35.8 | 0.06 | 277.0 | −1037.8 |
| 180 | CWS to Condenser | H2O | 0.000 | 19.2 | 4.00 | 13004.6 | −57238.2 |
| 181 | CWR from Condenser | H2O | 0.000 | 30.8 | 3.50 | 13004.6 | −57062.2 |
| 801 | 1st PCF Turbine Extraction | H2O | 1.000 | 445.0 | 162.51 | 35.3 | −125.4 |
| 802 | 2nd PCF Turbine Extraction | H2O | 1.000 | 340.0 | 79.06 | 35.3 | −127.0 |
| 803 | 3rd PCF Turbine Extraction | H2O | 1.000 | 445.0 | 40.49 | 33.3 | −116.6 |
| 804 | 4th PCF Turbine Extraction | H2O | 1.000 | 340.0 | 18.99 | 23.5 | −83.6 |
| 805 | 5th PCF Turbine Extraction | H2O | 1.000 | 440.6 | 9.00 | 15.7 | −54.7 |
| 820 | PCF Extraction Return | H2O | 0.000 | 130.0 | 302.50 | 143.0 | −610.1 |
| 2152 | PCF to Coil 166 | H2O | 1.000 | 404.8 | 302.00 | 285.6 | −1083.7 |
| 2153 | PCF to Coil 163 | H2O | 1.000 | 404.8 | 302.00 | 134.4 | −510.0 |
| 2154 | PCF ex Coil 166 | H2O | 1.000 | 421.6 | 301.00 | 285.6 | −1051.5 |
| 2155 | PCF ex Coil 163 | H2O | 1.000 | 421.6 | 301.50 | 134.4 | −494.9 |

TABLE 5

Sample Energy Balance and Stream Summary for FIG. 20 at Half Power
"Balanced Pinch"

| | | | |
|---|---|---|---|
| PCF Inlet Temperature | 550° C. | 1st Reheat Temperature | 550° C. |
| 2nd Reheat Temperature | 550° C. | HP Turbine Inlet Pressure | 300 bar |
| Overall Cycle Efficiency | 44.91% | Assumed Heat Loss | 1.0% |

Energy Streams

| | | | |
|---|---|---|---|
| Molten Salt Including Heat Loss | 167. MW | Gross Turbine Power | 80.8 MW |
| Cooling Water Heat Rejection | 88. MW | BFW Pump Power | 2.2 MW |
| EGR Blower Power | 1.3 MW | Other House Loads | 2.4 MW |

TABLE 5-continued

Sample Energy Balance and Stream Summary for FIG. 20 at Half Power
"Balanced Pinch"

| | Net Power | | 75.0 MW | | | | |
|---|---|---|---|---|---|---|---|
| Stream No. (—) | Description (—) | Composition (—) | Frac Vap. (—) | Temperature (° C.) | Pressure (bara) | Mass Flow Rate (Tonne/hr) | Heat Flow (MW) |
| 101 | PHTF ex Sub System 1 | Molten Salt | 0.000 | 600.0 | 10.00 | 1831.3 | −489.9 |
| 102 | PHTF to Coil 161 | Molten Salt | 0.000 | 600.0 | 10.00 | 715.3 | −191.3 |
| 103 | PCF to Coil 164 | Molten Salt | 0.000 | 600.0 | 10.00 | 554.1 | −148.2 |
| 104 | PHTF to Coil 167 | Molten Salt | 0.000 | 600.0 | 10.00 | 561.9 | −150.3 |
| 107 | PHTF ex Coil 161 | Molten Salt | 0.000 | 335.4 | 9.00 | 715.3 | −271.7 |
| 108 | PCF ex Coil 164 | Molten Salt | 0.000 | 423.0 | 9.00 | 554.1 | −190.1 |
| 109 | PHTF ex Coil 167 | Molten Salt | 0.000 | 419.8 | 9.00 | 561.9 | −193.5 |
| 112 | PHTF to Sub System 1 | Molten Salt | 0.000 | 387.8 | 9.00 | 1831.3 | −655.2 |
| 120 | IHTF to Preheater 910 | Dry Air | 1.000 | 93.7 | 1.30 | 992.2 | 17.5 |
| 121 | IHTF to Coil 161 | Dry Air | 1.000 | 287.9 | 1.30 | 992.2 | 71.9 |
| 122 | IHTF to Coil 162 | Dry Air | 1.000 | 556.5 | 1.29 | 992.2 | 153.9 |
| 123 | IHTF to Coil 163 | Dry Air | 1.000 | 433.9 | 1.29 | 992.2 | 116.8 |
| 124 | IHTF to Coil 164 | Dry Air | 1.000 | 413.4 | 1.28 | 992.2 | 110.6 |
| 125 | IHTF to Coil 165 | Dry Air | 1.000 | 551.9 | 1.28 | 992.2 | 152.5 |
| 126 | IHTF to Coil 166 | Dry Air | 1.000 | 461.9 | 1.27 | 992.2 | 125.2 |
| 127 | IHTF to Coil 167 | Dry Air | 1.000 | 409.3 | 1.27 | 992.2 | 109.4 |
| 128 | IHTF to Coil 168 | Dry Air | 1.000 | 552.2 | 1.26 | 992.2 | 152.6 |
| 129 | IHTF to Coil 169 | Dry Air | 1.000 | 490.6 | 1.26 | 992.2 | 133.9 |
| 132 | IHTF to Separator 4 | Dry Air | 1.000 | 93.8 | 1.25 | 992.2 | 17.9 |
| 133 | IHTF to Valve 6 | Dry Air | 1.000 | 93.8 | 1.25 | 992.2 | 17.9 |
| 134 | IHTF to Blower 7 | Dry Air | 1.000 | 93.8 | 1.25 | 992.2 | 17.9 |
| 135 | IHTF Condensate to Pump 5 | H2O | 0.000 | 93.8 | 1.25 | 0.0 | 0.0 |
| 136 | IHTF Condensate ex Pump 5 | H2O | 1.000 | 29.6 | 1.30 | 0.0 | 0.0 |
| 150 | PCF to Pump 11 | H2O | 0.000 | 35.8 | 0.06 | 138.4 | −606.6 |
| 151 | PCF to Coil 169 | H2O | 0.000 | 60.3 | 302.50 | 209.9 | −912.3 |
| 152 | PCF ex Coil 169 | H2O | 1.000 | 404.8 | 302.00 | 209.9 | −796.4 |
| 155 | PCF to Coil 162 | H2O | 1.000 | 427.5 | 301.00 | 209.9 | −774.5 |
| 156 | PCF to HP Turbine | H2O | 1.000 | 550.0 | 300.00 | 209.9 | −737.4 |
| 158 | PCF to Coil 165 | H2O | 1.000 | 340.0 | 79.06 | 174.6 | −629.0 |
| 159 | PCF to MP Turbine | H2O | 1.000 | 549.9 | 78.56 | 174.6 | −601.7 |
| 161 | PCF to Coil 168 | H2O | 1.000 | 340.0 | 19.00 | 146.3 | −520.3 |
| 162 | PCF to LP Turbine | H2O | 1.000 | 550.1 | 18.50 | 146.3 | −501.6 |
| 164 | PCF to Condenser | H2O | 0.946 | 35.8 | 0.06 | 138.4 | −518.6 |
| 180 | CWS to Condenser | H2O | 0.000 | 19.2 | 4.00 | 6499.7 | −28607.6 |
| 181 | CWR from Condenser | H2O | 0.000 | 30.8 | 3.50 | 6499.7 | −28519.7 |
| 801 | 1st PCF Turbine Extraction | H2O | 1.000 | 445.0 | 162.51 | 17.6 | −62.7 |
| 802 | 2nd PCF Turbine Extraction | H2O | 1.000 | 340.0 | 79.06 | 17.6 | −63.5 |
| 803 | 3rd PCF Turbine Extraction | H2O | 1.000 | 445.0 | 40.49 | 16.6 | −58.3 |
| 804 | 4th PCF Turbine Extraction | H2O | 1.000 | 340.0 | 18.99 | 11.7 | −41.8 |
| 805 | 5th PCF Turbine Extraction | H2O | 1.000 | 440.6 | 9.00 | 7.8 | −27.4 |
| 820 | PCF Extraction Return | H2O | 0.000 | 103.2 | 302.50 | 71.5 | −307.1 |
| 2152 | PCF to Coil 166 | H2O | 1.000 | 404.8 | 302.00 | 151.1 | −573.4 |
| 2153 | PCF to Coil 163 | H2O | 1.000 | 404.8 | 302.00 | 58.8 | −223.0 |
| 2154 | PCF ex Coil 166 | H2O | 1.000 | 427.5 | 301.00 | 151.1 | −557.6 |
| 2155 | PCF ex Coil 163 | H2O | 1.000 | 427.7 | 301.50 | 58.8 | −216.9 |

TABLE 6

Sample Energy Balance and Stream Summary for FIG. 20 at Half Power
"Cold Pinch"

| PCF Inlet Temperature | 550° C. | 1st Reheat Temperature | 550° C. |
|---|---|---|---|
| 2nd Reheat Temperature | 550° C. | HP Turbine Inlet Pressure | 300 bar |
| Overall Cycle Efficiency | 44.97% | Assumed Heat Loss | 1.0% |

Energy Streams

| Molten Salt Including Heat Loss | 166.8 MW | Gross Turbine Power | 80.6 MW |
|---|---|---|---|
| Cooling Water Heat Rejection | 87.7 MW | BFW Pump Power | 2.2 MW |
| EGR Blower Power | 1.1 MW | Other House Loads | 2.4 MW |
| Net Power | 75.0 MW | | |

| Stream No. (—) | Description (—) | Composition (—) | Frac Vap. (—) | Temperature (° C.) | Pressure (bara) | Mass Flow Rate (Tonne/hr) | Heat Flow (MW) |
|---|---|---|---|---|---|---|---|
| 101 | PHTF ex Sub System 1 | Molten Salt | 0.000 | 600.0 | 10.00 | 2234.5 | −597.7 |
| 102 | PHTF to Coil 161 | Molten Salt | 0.000 | 600.0 | 10.00 | 1205.9 | −322.6 |

TABLE 6-continued

Sample Energy Balance and Stream Summary for FIG. 20 at Half Power
"Cold Pinch"

| | | | | | | | |
|---|---|---|---|---|---|---|---|
| 103 | PCF to Coil 164 | Molten Salt | 0.000 | 600.0 | 10.00 | 513.7 | −137.4 |
| 104 | PHTF to Coil 167 | Molten Salt | 0.000 | 600.0 | 10.00 | 514.9 | −137.7 |
| 107 | PHTF ex Coil 161 | Molten Salt | 0.000 | 439.0 | 9.00 | 1205.9 | −405.4 |
| 108 | PCF ex Coil 164 | Molten Salt | 0.000 | 413.1 | 9.00 | 513.7 | −178.3 |
| 109 | PHTF ex Coil 167 | Molten Salt | 0.000 | 411.7 | 9.00 | 514.9 | −179.0 |
| 112 | PHTF to Sub System 1 | Molten Salt | 0.000 | 426.8 | 9.00 | 2234.5 | −762.8 |
| 120 | IHTF to Preheater 910 | Dry Air | 1.000 | 75.6 | 1.30 | 904.2 | 11.7 |
| 121 | IHTF to Coil 161 | Dry Air | 1.000 | 289.4 | 1.30 | 904.2 | 67.4 |
| 122 | IHTF to Coil 162 | Dry Air | 1.000 | 592.5 | 1.29 | 904.2 | 150.3 |
| 123 | IHTF to Coil 163 | Dry Air | 1.000 | 412.1 | 1.29 | 904.2 | 100.5 |
| 124 | IHTF to Coil 164 | Dry Air | 1.000 | 403.9 | 1.28 | 904.2 | 98.2 |
| 125 | IHTF to Coil 165 | Dry Air | 1.000 | 552.5 | 1.28 | 904.2 | 139.1 |
| 126 | IHTF to Coil 166 | Dry Air | 1.000 | 454.0 | 1.27 | 904.2 | 111.9 |
| 127 | IHTF to Coil 167 | Dry Air | 1.000 | 402.3 | 1.27 | 904.2 | 97.8 |
| 128 | IHTF to Coil 168 | Dry Air | 1.000 | 552.4 | 1.26 | 904.2 | 139.1 |
| 129 | IHTF to Coil 169 | Dry Air | 1.000 | 485.0 | 1.26 | 904.2 | 120.4 |
| 132 | IHTF to Separator 4 | Dry Air | 1.000 | 71.4 | 1.25 | 904.2 | 10.6 |
| 133 | IHTF to Valve 6 | Dry Air | 1.000 | 71.4 | 1.25 | 904.2 | 10.6 |
| 134 | IHTF to Blower 7 | Dry Air | 1.000 | 71.4 | 1.25 | 904.2 | 10.6 |
| 135 | IHTF Condensate to Pump 5 | H2O | 0.000 | 71.4 | 1.25 | 0.0 | 0.0 |
| 136 | IHTF Condensate ex Pump 5 | H2O | 1.000 | 29.6 | 1.30 | 0.0 | 0.0 |
| 150 | PCF to Pump 11 | H2O | 0.000 | 35.8 | 0.06 | 138.1 | −605.0 |
| 151 | PCF to Coil 169 | H2O | 0.000 | 54.0 | 302.50 | 209.3 | −911.5 |
| 152 | PCF ex Coil 169 | H2O | 0.000 | 399.6 | 302.00 | 209.3 | −801.6 |
| 155 | PCF to Coil 162 | H2O | 1.000 | 411.7 | 301.00 | 209.3 | −785.3 |
| 156 | PCF to HP Turbine | H2O | 1.000 | 550.0 | 300.00 | 209.3 | −735.4 |
| 158 | PCF to Coil 165 | H2O | 1.000 | 340.0 | 79.06 | 174.2 | −627.4 |
| 159 | PCF to MP Turbine | H2O | 1.000 | 550.0 | 78.56 | 174.2 | −600.2 |
| 161 | PCF to Coil 168 | H2O | 1.000 | 340.0 | 18.99 | 145.9 | −518.9 |
| 162 | PCF to LP Turbine | H2O | 1.000 | 550.0 | 18.49 | 145.9 | −500.3 |
| 164 | PCF to Condenser | H2O | 0.946 | 35.8 | 0.06 | 138.1 | −517.3 |
| 180 | CWS to Condenser | H2O | 0.000 | 19.2 | 4.00 | 6482.0 | −28529.6 |
| 181 | CWR from Condenser | H2O | 0.000 | 30.8 | 3.50 | 6482.0 | −28441.8 |
| 801 | 1st PCF Turbine Extraction | H2O | 1.000 | 445.0 | 162.51 | 17.6 | −62.5 |
| 802 | 2nd PCF Turbine Extraction | H2O | 1.000 | 340.0 | 79.06 | 17.6 | −63.3 |
| 803 | 3rd PCF Turbine Extraction | H2O | 1.000 | 445.0 | 40.49 | 16.6 | −58.1 |
| 804 | 4th PCF Turbine Extraction | H2O | 1.000 | 340.0 | 18.99 | 11.7 | −41.7 |
| 805 | 5th PCF Turbine Extraction | H2O | 1.000 | 440.6 | 9.00 | 7.8 | −27.3 |
| 820 | PCF Extraction Return | H2O | 0.000 | 84.8 | 302.50 | 71.3 | −307.8 |
| 2152 | PCF to Coil 166 | H2O | 0.000 | 399.6 | 302.00 | 175.8 | −673.4 |
| 2153 | PCF to Coil 163 | H2O | 0.000 | 399.6 | 302.00 | 33.5 | −128.3 |
| 2154 | PCF ex Coil 166 | H2O | 1.000 | 412.1 | 301.00 | 175.8 | −659.3 |
| 2155 | PCF ex Coil 163 | H2O | 1.000 | 409.8 | 301.50 | 33.5 | −126.0 |

TABLE 7

Sample Energy Balance and Stream Summary for FIG. 20 at Half Power
"Hot Pinch"

| | | | |
|---|---|---|---|
| PCF Inlet Temperature | 550° C. | 1st Reheat Temperature | 550° C. |
| 2nd Reheat Temperature | 550° C. | HP Turbine Inlet Pressure | 300 bar |
| Overall Cycle Efficiency | 44.01% | Assumed Heat Loss | 1.0% |

Energy Streams

| | | | |
|---|---|---|---|
| Molten Salt Including Heat Loss | 170.4 MW | Gross Turbine Power | 81.4 MW |
| Cooling Water Heat Rejection | 91.3 MW | BFW Pump Power | 2.2 MW |
| EGR Blower Power | 1.9 MW | Other House Loads | 2.4 MW |
| Net Power | 75.0 MW | | |

| Stream No. (—) | Description (—) | Composition (—) | Frac Vap. (—) | Temperature (° C.) | Pressure (bara) | Mass Flow Rate (Tonne/hr) | Heat Flow (MW) |
|---|---|---|---|---|---|---|---|
| 101 | PHTF ex Sub System 1 | Molten Salt | 0.000 | 600.0 | 10.00 | 2131.2 | −570.1 |
| 102 | PHTF to Coil 161 | Molten Salt | 0.000 | 600.0 | 10.00 | 937.4 | −250.8 |
| 103 | PCF to Coil 164 | Molten Salt | 0.000 | 600.0 | 10.00 | 611.1 | −163.5 |
| 104 | PHTF to Coil 167 | Molten Salt | 0.000 | 600.0 | 10.00 | 582.7 | −155.9 |
| 107 | PHTF ex Coil 161 | Molten Salt | 0.000 | 346.3 | 9.00 | 937.4 | −351.7 |
| 108 | PCF ex Coil 164 | Molten Salt | 0.000 | 463.1 | 9.00 | 611.1 | −199.2 |
| 109 | PHTF ex Coil 167 | Molten Salt | 0.000 | 471.6 | 9.00 | 582.7 | −187.9 |
| 112 | PHTF to Sub System 1 | Molten Salt | 0.000 | 414.1 | 9.00 | 2131.2 | −738.8 |
| 120 | IHTF to Preheater 910 | Dry Air | 1.000 | 162.1 | 1.30 | 1237.7 | 46.5 |
| 121 | IHTF to Coil 161 | Dry Air | 1.000 | 279.1 | 1.30 | 1237.7 | 88.5 |

TABLE 7-continued

Sample Energy Balance and Stream Summary for FIG. 20 at Half Power
"Hot Pinch"

| | | | | | | | |
|---|---|---|---|---|---|---|---|
| 122 | IHTF to Coil 162 | Dry Air | 1.000 | 550.1 | 1.29 | 1237.7 | 189.5 |
| 123 | IHTF to Coil 163 | Dry Air | 1.000 | 515.2 | 1.29 | 1237.7 | 176.2 |
| 124 | IHTF to Coil 164 | Dry Air | 1.000 | 456.9 | 1.28 | 1237.7 | 154.3 |
| 125 | IHTF to Coil 165 | Dry Air | 1.000 | 551.4 | 1.28 | 1237.7 | 190.0 |
| 126 | IHTF to Coil 166 | Dry Air | 1.000 | 480.5 | 1.27 | 1237.7 | 163.2 |
| 127 | IHTF to Coil 167 | Dry Air | 1.000 | 467.1 | 1.27 | 1237.7 | 158.1 |
| 128 | IHTF to Coil 168 | Dry Air | 1.000 | 551.6 | 1.26 | 1237.7 | 190.1 |
| 129 | IHTF to Coil 169 | Dry Air | 1.000 | 503.1 | 1.26 | 1237.7 | 171.7 |
| 132 | IHTF to Separator 4 | Dry Air | 1.000 | 156.8 | 1.25 | 1237.7 | 44.6 |
| 133 | IHTF to Valve 6 | Dry Air | 1.000 | 156.8 | 1.25 | 1237.7 | 44.6 |
| 134 | IHTF to Blower 7 | Dry Air | 1.000 | 156.8 | 1.25 | 1237.7 | 44.6 |
| 135 | IHTF Condensate to Pump 5 | H2O | 0.000 | 156.8 | 1.25 | 0.0 | 0.0 |
| 136 | IHTF Condensate ex Pump 5 | H2O | 1.000 | 29.6 | 1.30 | 0.0 | 0.0 |
| 150 | PCF to Pump 11 | H2O | 0.000 | 35.8 | 0.06 | 143.8 | −630.0 |
| 151 | PCF to Coil 169 | H2O | 0.000 | 79.4 | 302.50 | 206.3 | −892.2 |
| 152 | PCF ex Coil 169 | H2O | 1.000 | 422.0 | 302.00 | 206.3 | −765.1 |
| 155 | PCF to Coil 162 | H2O | 1.000 | 491.4 | 301.00 | 206.3 | −738.1 |
| 156 | PCF to HP Turbine | H2O | 1.000 | 550.0 | 300.00 | 206.3 | −724.8 |
| 158 | PCF to Coil 165 | H2O | 1.000 | 340.0 | 79.06 | 171.7 | −618.3 |
| 159 | PCF to MP Turbine | H2O | 1.000 | 550.0 | 78.56 | 171.7 | −591.5 |
| 161 | PCF to Coil 168 | H2O | 1.000 | 340.0 | 18.99 | 143.8 | −511.4 |
| 162 | PCF to LP Turbine | H2O | 1.000 | 550.0 | 18.49 | 143.8 | −493.0 |
| 164 | PCF to Condenser | H2O | 0.946 | 35.8 | 0.06 | 143.8 | −538.6 |
| 180 | CWS to Condenser | H2O | 0.000 | 19.2 | 4.00 | 6749.4 | −29706.5 |
| 181 | CWR from Condenser | H2O | 0.000 | 30.8 | 3.50 | 6749.4 | −29615.2 |
| 801 | 1st PCF Turbine Extraction | H2O | 1.000 | 445.0 | 162.51 | 17.3 | −61.6 |
| 802 | 2nd PCF Turbine Extraction | H2O | 1.000 | 340.0 | 79.06 | 17.3 | −62.4 |
| 803 | 3rd PCF Turbine Extraction | H2O | 1.000 | 445.0 | 40.49 | 16.4 | −57.3 |
| 804 | 4th PCF Turbine Extraction | H2O | 1.000 | 340.0 | 18.99 | 11.5 | −41.1 |
| 805 | 5th PCF Turbine Extraction | H2O | 1.000 | 440.6 | 17.00 | 0.0 | 0.0 |
| 820 | PCF Extraction Return | H2O | 0.000 | 173.1 | 302.50 | 62.5 | −263.7 |
| 2152 | PCF to Coil 166 | H2O | 1.000 | 422.0 | 302.00 | 43.3 | −160.7 |
| 2153 | PCF to Coil 163 | H2O | 1.000 | 422.0 | 302.00 | 163.0 | −604.5 |
| 2154 | PCF ex Coil 166 | H2O | 1.000 | 480.5 | 301.00 | 43.3 | −155.6 |
| 2155 | PCF ex Coil 163 | H2O | 1.000 | 494.6 | 301.50 | 163.0 | −582.5 |

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for generating power, comprising:
a) providing four or more discreet heat transfer devices, arranged in series, and confined within a contained housing;
b) circulating an intermediate heat transfer fluid through the housing and about the four or more discreet heat transfer devices;
c) heating a primary heat transfer fluid using an external heat source to provide a heated primary heat transfer fluid;
d) circulating a first portion of the heated primary heat transfer fluid through a first of the four or more discreet heat transfer devices within the housing and circulating a second portion of the heated primary heat transfer fluid through a second of the four or more discreet heat transfer devices within the housing, whereby the intermediate heat transfer fluid is indirectly heated by the heated primary heat transfer fluid from both the first and second discreet heat transfer devices;
e) circulating at least a portion of a power cycle fluid through a third of the four or more discreet heat transfer devices within the housing and circulating the at least a portion of the power cycle fluid through a fourth of the four or more discreet heat transfer devices within the housing to provide a heated power cycle fluid, whereby the power cycle fluid is indirectly heated within the third and fourth discreet heat transfer devices by the intermediate heat transfer fluid; and
f) generating power using the heated power cycle fluid exiting the housing.

2. The method of claim 1, wherein the power cycle fluid is heated within the third of the four or more discreet heat transfer devices by transferring heat from the intermediate heat transfer fluid within the housing after the intermediate heat transfer fluid is heated by the first portion of the primary heat transfer fluid.

3. The method of claim 1, further comprising introducing the heated power cycle fluid to a first turbine stage at a first pressure, after exiting the housing and then extracting the at least a portion of the power cycle fluid from the first turbine stage at a second, lower pressure.

4. The method of claim 1, further comprising heating the intermediate heat transfer fluid by transferring heat from the second portion of the primary heat transfer fluid after the intermediate heat transfer fluid heats the power cycle fluid within the third of the four or more discreet heat transfer devices.

5. The method of claim 1, further comprising heating the intermediate heat transfer fluid by transferring heat from the second portion of the primary heat transfer fluid after the intermediate heat transfer fluid heats the power cycle fluid within the fourth of the four or more discreet heat transfer devices.

6. The method of claim 1, further comprising heating the at least a portion of the power cycle fluid by transferring heat from the intermediate heat transfer fluid after the intermediate heat transfer fluid is heated by the second portion of the primary heat transfer fluid.

7. The method of claim 1, further comprising introducing at least a portion of the heated pressure power cycle fluid to a second turbine stage at a first pressure, after that portion has been heated by the intermediate heat transfer fluid; and then extracting the at least a portion of the heated power cycle fluid from the second turbine stage at a second, lower pressure.

8. The method of claim 1, further comprising extracting at least a portion of the power cycle fluid from at least one turbine stage and heating the intermediate heat transfer fluid using the extracted power cycle fluid.

9. The method of claim 1, further comprising introducing a third portion of the pressure power cycle fluid to a fifth discreet heat exchange device to reject residual heat to an external system.

10. The method of claim 1, further comprising extracting at least two portions of the power cycle fluid from the first turbine stage or second turbine stage and directing them to an intermediate heat transfer fluid preheater thereby heating the intermediate heat transfer fluid and cooling the said at least two portions of the power cycle fluid.

11. The method of claim 1, wherein the intermediate heat transfer fluid is circulated using any one or more of a blower, compressor, pump and fan.

12. The method of claim 11, further comprising adjusting the flow rate of the intermediate heat transfer fluid through the housing by (i) adjusting the position of a damper within the intermediate heat transfer loop, (ii) by adjusting the operating speed of the blower, compressor, pump or fan or (iii) by adjusting the position, openness or angle of at least one inlet guide vane, stator vane or rotating vane of the blower, compressor, pump or fan.

13. A method for generating power, comprising:
a) providing four or more discreet heat transfer devices, arranged in series, and confined within a contained housing
b) circulating an intermediate heat transfer fluid through the housing and about the four or more discreet heat transfer devices;
c) heating a primary heat transfer fluid using an external heat source to provide a heated primary heat transfer fluid;
d) circulating a first portion of the heated primary heat transfer fluid through a first of the four or more discreet heat transfer devices within the housing and circulating a second portion of the heated primary heat transfer fluid through a second of the four or more discreet heat transfer devices within the housing, whereby the intermediate heat transfer fluid is indirectly heated by the heated primary heat transfer fluid from both the first and second discreet heat transfer devices;
e) circulating at least a portion of a power cycle fluid through a third of the four or more discreet heat transfer devices within the housing and circulating the at least a portion of the power cycle fluid through a fourth of the four or more discreet heat transfer devices within the housing to provide a heated power cycle fluid, whereby the power cycle fluid is indirectly heated within the third and fourth discreet heat transfer devices by the intermediate heat transfer fluid;
f) generating power using the heated power cycle fluid exiting the housing; and
g) determining a temperature of the intermediate heat transfer fluid and the power cycle fluid at two or more locations throughout the housing and adjusting a flow rate of the intermediate heat transfer fluid at least in part based on a temperature difference of the intermediate heat transfer or the power cycle fluid as determined at the two or more locations.

14. The method of claim 13, wherein the flow rate of the intermediate heat transfer fluid or the power cycle fluid or both is adjusted until the temperature difference of the intermediate heat transfer or the temperature difference of the power cycle fluid is approximately equal to a predetermined setpoint.

15. The method of claim 14, wherein the predetermined setpoint is about between −50° C. to about +50° C.

16. The method of claim 14, wherein the predetermined setpoint is about zero.

17. The method of claim 14, further comprising adjusting the predetermined setpoint based at least in part on the flow rate of at least one of the primary heat transfer fluid, the intermediate heat transfer fluid and the power cycle fluid.

* * * * *